(12) United States Patent
Torgerson et al.

(10) Patent No.: US 11,540,484 B2
(45) Date of Patent: Jan. 3, 2023

(54) SAFETY VALVE FOR A DAIRY SYSTEM COMPONENT

(71) Applicant: GEA Farm Technologies, Inc., Naperville, IL (US)

(72) Inventors: Kevin L. Torgerson, Holmen, WI (US); Nathan Hedlund, Lewiston, MN (US); Matthew J. Stuessel, Alma Center, WI (US)

(73) Assignee: Gea Farm Technologies, Inc., Naperville, IL (US)

( * ) Notice: Subject to any disclaimer, the term of this patent is extended or adjusted under 35 U.S.C. 154(b) by 236 days.

(21) Appl. No.: 17/092,481

(22) Filed: Nov. 9, 2020

(65) Prior Publication Data

US 2021/0051914 A1 Feb. 25, 2021

Related U.S. Application Data

(60) Division of application No. 15/887,573, filed on Feb. 2, 2018, now Pat. No. 10,874,084, which is a division
(Continued)

(51) Int. Cl.
*A01J 7/02* (2006.01)
*A01J 7/04* (2006.01)
(Continued)

(52) U.S. Cl.
CPC ............... *A01J 7/04* (2013.01); *A01J 5/047* (2013.01); *A01J 7/00* (2013.01); *A01J 7/02* (2013.01); *A01J 7/022* (2013.01); *A01J 7/025* (2013.01); *Y10T 137/2546* (2015.04); *Y10T 137/4245* (2015.04); *Y10T 137/4252* (2015.04); *Y10T 137/8593* (2015.04); *Y10T 137/87684* (2015.04)

(58) Field of Classification Search
CPC .... A01J 7/04; A01J 7/025; A01J 7/022; A01J 7/00; A01J 7/02
USPC ............. 119/14.47, 670, 14.18, 14.03, 14.02
See application file for complete search history.

(56) References Cited

U.S. PATENT DOCUMENTS

| | | |
|---|---|---|
| 1,365,665 A | 1/1921 | Davies |
| 2,012,031 A | 8/1935 | Woodruff |
| (Continued) | | |

FOREIGN PATENT DOCUMENTS

| | | |
|---|---|---|
| AU | 641229 | 9/1993 |
| AU | 2013294747 B2 | 11/2016 |
| (Continued) | | |

OTHER PUBLICATIONS

"Grade A pasteurized milk ordinance" 2003 Revision; U.S. Department Health and Human Services, Public Health Service; Food and Drug Administration.
(Continued)

*Primary Examiner* — Yvonne R Abbott-Lewis
(74) *Attorney, Agent, or Firm* — BainwoodHuang

(57) ABSTRACT

A system for cleaning a dairy animal milker unit and applying dip to a dairy animal, the system includes a main control, an air supply, a water supply, a backflush fluid supply, a dip supply, a stall control for receiving the air, water, backflush fluid and dip supplies, and a safety valve that is adjacent to a downstream portion of the milker unit to control backflush and dip fluids being fed to the milker unit.

19 Claims, 52 Drawing Sheets

Related U.S. Application Data of application No. 15/366,858, filed on Dec. 1, 2016, now Pat. No. 9,883,652, which is a division of application No. 14/588,094, filed on Dec. 31, 2014, now Pat. No. 9,510,556, which is a division of application No. 13/269,835, filed on Oct. 10, 2011, now Pat. No. 9,072,273, which is a continuation of application No. 12/584,475, filed on Sep. 4, 2009, now Pat. No. 8,033,247.

(51) Int. Cl.
*A01J 7/00* (2006.01)
*A01J 5/04* (2006.01)

(56) References Cited

U.S. PATENT DOCUMENTS

| | | |
|---|---|---|
| 2,532,088 A | 11/1950 | Cordis |
| 2,747,544 A | 5/1956 | Thomas |
| 3,014,455 A | 12/1961 | Olander |
| 3,099,246 A | 7/1963 | Beskow |
| 3,119,401 A | 1/1964 | Merritt et al. |
| 3,285,297 A | 11/1966 | Duft et al. |
| 3,417,763 A | 12/1968 | Fjermestad et al. |
| 3,461,845 A | 8/1969 | Peterson |
| 3,474,760 A | 10/1969 | Siddall et al. |
| 3,482,547 A | 12/1969 | Maier |
| 3,500,839 A | 3/1970 | Bender |
| 3,630,081 A | 12/1971 | Nelson |
| 3,648,696 A | 3/1972 | Keith |
| 3,688,783 A | 9/1972 | Owens |
| 3,696,790 A | 10/1972 | Albright |
| 3,713,423 A | 1/1973 | Sparr, Sr. |
| 3,726,253 A | 4/1973 | Duncan |
| 3,762,371 A | 10/1973 | Quayle et al. |
| 3,789,798 A | 2/1974 | Reisgies et al. |
| 3,797,525 A | 3/1974 | Lieser |
| 3,861,335 A | 1/1975 | Przewalski |
| 3,861,355 A | 1/1975 | Johnson et al. |
| 3,957,018 A | 5/1976 | Barrett |
| 3,971,512 A | 7/1976 | Duncan |
| 3,973,520 A | 8/1976 | Flocchini |
| 3,989,009 A | 11/1976 | Robar et al. |
| 4,034,714 A | 7/1977 | Umbaugh et al. |
| 4,061,504 A | 12/1977 | Zall et al. |
| 4,149,489 A | 4/1979 | Umbaugh et al. |
| 4,168,677 A | 9/1979 | Brown |
| 4,175,514 A | 11/1979 | Souza et al. |
| 4,177,760 A | 12/1979 | Slater |
| 4,222,346 A * | 9/1980 | Reisgies .......... A01J 7/025 119/14.08 |
| 4,253,421 A | 3/1981 | Slater et al. |
| 4,254,754 A | 3/1981 | Takada et al. |
| 4,295,490 A | 10/1981 | Boudreau |
| 4,305,346 A | 12/1981 | Sparr, Sr. |
| 4,332,215 A | 6/1982 | Larson |
| 4,333,387 A | 6/1982 | Seitz |
| 4,333,421 A | 6/1982 | Schluckbier |
| 4,344,385 A | 8/1982 | Swanson et al. |
| 4,372,345 A | 2/1983 | Menus |
| 4,378,757 A | 4/1983 | Hamann |
| 4,393,811 A | 7/1983 | Bodmin |
| 4,395,971 A | 8/1983 | Happel et al. |
| 4,403,568 A | 9/1983 | Fukuhara et al. |
| 4,403,569 A | 9/1983 | Benneii |
| 4,459,938 A | 7/1984 | Noorlander |
| 4,462,425 A | 7/1984 | Mehus |
| 4,485,762 A | 12/1984 | Sutton et al. |
| 4,498,419 A | 2/1985 | Flocchini |
| 4,516,530 A * | 5/1985 | Reisgies .......... A01J 5/017 119/14.08 |
| 4,572,105 A | 2/1986 | Chowdhury et al. |
| 4,586,462 A | 5/1986 | Icking |
| 4,593,649 A | 6/1986 | Britten |
| 4,903,639 A | 2/1990 | Kessel |
| 4,907,535 A | 3/1990 | Matsuzawa et al. |
| 4,924,809 A | 5/1990 | Verbrugge |
| 4,936,254 A | 6/1990 | Marshall |
| 5,052,341 A | 10/1991 | Woolford et al. |
| 5,101,770 A | 4/1992 | Stevenson |
| 5,134,967 A | 8/1992 | Marshall |
| 5,161,482 A | 11/1992 | Griffin |
| 5,166,313 A | 11/1992 | Archibald et al. |
| 5,167,201 A | 12/1992 | Peles |
| 5,178,095 A | 1/1993 | Mein |
| 5,218,924 A | 6/1993 | Thompson et al. |
| 5,255,628 A | 10/1993 | Kristoffer |
| 5,379,722 A | 1/1995 | Larson |
| 5,386,799 A | 2/1995 | Dietrich |
| 5,390,627 A | 2/1995 | van der Berg et al. |
| 5,403,005 A | 4/1995 | Avila-Valdez |
| 5,493,995 A | 2/1996 | Chowdhury |
| 5,568,788 A | 10/1996 | van den Berg et al. |
| 5,572,947 A | 11/1996 | Larson et al. |
| 5,673,650 A | 10/1997 | Mottram et al. |
| 5,697,325 A | 12/1997 | Gehm et al. |
| 5,722,343 A | 3/1998 | Aurik et al. |
| 5,769,025 A | 6/1998 | van der Lely et al. |
| 5,778,820 A | 7/1998 | van der Lely et al. |
| 5,850,845 A * | 12/1998 | Pereira .......... A01J 7/022 137/239 |
| 5,881,669 A | 3/1999 | van den Berg et al. |
| 5,896,828 A | 4/1999 | Kronschnabel et al. |
| 5,909,716 A | 6/1999 | van der Lely |
| 5,934,220 A | 8/1999 | Hall et al. |
| 5,957,081 A | 9/1999 | van der Lely et al. |
| 5,960,736 A | 10/1999 | Ludington et al. |
| 5,992,347 A | 11/1999 | Innings et al. |
| 6,009,833 A | 1/2000 | van der Lely |
| 6,079,359 A | 6/2000 | van den Berg |
| 6,089,242 A | 7/2000 | Buck |
| 6,098,570 A | 8/2000 | Aurik et al. |
| 6,202,593 B1 | 3/2001 | Maier et al. |
| 6,234,110 B1 | 5/2001 | Xavier |
| 6,244,215 B1 | 6/2001 | Oosterling |
| 6,267,077 B1 | 7/2001 | van den Berg et al. |
| 6,276,297 B1 | 8/2001 | van den Berg et al. |
| 6,308,655 B1 | 10/2001 | Oosterling |
| 6,318,299 B1 | 11/2001 | Birk |
| 6,321,682 B1 | 11/2001 | Eriksson et al. |
| 6,367,416 B1 | 4/2002 | van der Lely |
| 6,371,046 B1 | 4/2002 | Petterson et al. |
| 6,435,132 B1 | 8/2002 | Milbrath et al. |
| 6,546,893 B1 | 4/2003 | Happel et al. |
| 6,550,420 B1 | 4/2003 | Bjork |
| 6,561,126 B2 | 5/2003 | Forsen et al. |
| 6,584,930 B2 | 7/2003 | Buecker |
| 6,591,784 B1 | 7/2003 | Eriksson |
| 6,598,560 B1 | 7/2003 | van den Berg |
| 6,619,227 B1 | 9/2003 | Berger et al. |
| 6,626,130 B1 | 9/2003 | Eriksson |
| 6,644,240 B1 | 11/2003 | Dietrich |
| 6,752,102 B2 | 6/2004 | Dahl et al. |
| 6,755,153 B1 | 6/2004 | Chowdhury |
| 6,935,270 B2 | 8/2005 | Wipperfurth et al. |
| 6,997,135 B1 | 2/2006 | Dewaard |
| 6,997,136 B1 | 2/2006 | Coates |
| 7,036,981 B2 | 5/2006 | Veenstra et al. |
| 7,128,020 B2 | 10/2006 | Björk et al. |
| 7,143,718 B2 | 12/2006 | Bosma et al. |
| 7,162,970 B2 | 1/2007 | Maier, Jr. |
| 7,174,848 B2 | 2/2007 | Brown et al. |
| 7,178,480 B2 | 2/2007 | Dahl et al. |
| 7,237,694 B2 | 7/2007 | Freudinger |
| 7,263,948 B2 | 9/2007 | Ericsson et al. |
| 7,281,493 B2 | 10/2007 | Dietrich |
| 7,290,497 B2 | 11/2007 | Rottier et al. |
| 7,299,766 B2 | 11/2007 | van den Berg et al. |
| 7,350,478 B2 | 4/2008 | Fernandez |
| 7,377,232 B2 | 5/2008 | Holmgren et al. |
| 7,401,573 B2 | 7/2008 | Torgerson |
| 7,412,943 B2 | 8/2008 | Ericsson et al. |
| 7,484,474 B2 | 2/2009 | van den Berg et al. |

(56) References Cited

U.S. PATENT DOCUMENTS

| | | | |
|---|---|---|---|
| 7,536,975 B2* | 5/2009 | Denes | A61L 2/14 119/14.47 |
| 7,575,022 B2 | 8/2009 | Higgins | |
| 7,578,260 B2 | 8/2009 | Shin | |
| 7,707,966 B2 | 5/2010 | Torgerson et al. | |
| 7,765,951 B2 | 8/2010 | Dietrich | |
| 7,793,614 B2 | 9/2010 | Ericsson et al. | |
| 7,926,449 B2 | 4/2011 | Stellnert et al. | |
| 7,963,249 B2 | 6/2011 | Duke | |
| 8,025,029 B2 | 9/2011 | Torgerson et al. | |
| 8,033,247 B2 | 10/2011 | Torgerson et al. | |
| 8,117,989 B2 | 2/2012 | Forgerson et al. | |
| 8,210,123 B2 | 7/2012 | Duke | |
| 8,240,272 B2 | 8/2012 | Duke | |
| 8,342,125 B2 | 1/2013 | Forgerson et al. | |
| 8,590,486 B2 | 11/2013 | Forgerson et al. | |
| 8,677,937 B2 | 3/2014 | Shin | |
| 8,770,146 B2 | 7/2014 | Buck et al. | |
| 8,925,483 B2 | 1/2015 | Torgerson et al. | |
| 8,991,335 B2 | 3/2015 | Torgerson et al. | |
| 9,016,238 B2 | 4/2015 | Duke | |
| 9,049,835 B2 | 6/2015 | Duke | |
| 9,072,272 B2 | 7/2015 | Bosma et al. | |
| 9,072,273 B2 | 7/2015 | Torgerson et al. | |
| 9,332,726 B2 | 5/2016 | Bosma et al. | |
| 9,468,189 B2 | 10/2016 | Torgerson et al. | |
| 9,468,190 B2 | 10/2016 | Duke | |
| 9,510,556 B2 | 12/2016 | Torgerson et al. | |
| 9,526,224 B2 | 12/2016 | Balkenhol et al. | |
| 9,545,079 B2 | 1/2017 | Torgerson et al. | |
| 9,686,958 B2 | 6/2017 | Sellner et al. | |
| 9,763,421 B2 | 9/2017 | Torgerson et al. | |
| 9,770,006 B2 | 9/2017 | Torgerson et al. | |
| 9,883,652 B2 | 2/2018 | Torgerson et al. | |
| 9,930,862 B2 | 4/2018 | Torgerson et al. | |
| 10,123,506 B2 | 11/2018 | Bosma | |
| 10,426,128 B2 | 10/2019 | Balkenhol et al. | |
| 10,499,610 B2 | 12/2019 | Torgerson et al. | |
| 10,502,330 B2 | 12/2019 | Balkenhol | |
| 10,514,316 B2 | 12/2019 | Enicki | |
| 10,681,895 B2 | 6/2020 | Sellner et al. | |
| 2002/0185071 A1 | 12/2002 | Guo | |
| 2003/0226520 A1 | 12/2003 | Dietrich | |
| 2004/0089242 A1 | 5/2004 | Verstege et al. | |
| 2004/0231603 A1 | 11/2004 | Bjork et al. | |
| 2005/0274327 A1 | 12/2005 | Johnsson et al. | |
| 2006/0016399 A1 | 1/2006 | Torgerson | |
| 2006/0037542 A1* | 2/2006 | Denes | A61L 2/14 119/14.47 |
| 2006/0049212 A1 | 3/2006 | Freudinger | |
| 2006/0112887 A1* | 6/2006 | Brown | A01J 5/007 119/14.08 |
| 2007/0070803 A1 | 3/2007 | Urquhart | |
| 2007/0157887 A1* | 7/2007 | Fernandez | A01J 5/08 119/14.49 |
| 2007/0186860 A1 | 8/2007 | Dietrich | |
| 2007/0215053 A1 | 9/2007 | Duke | |
| 2007/0277737 A1 | 12/2007 | Maier et al. | |
| 2008/0022932 A1 | 1/2008 | Rottier et al. | |
| 2008/0202433 A1 | 8/2008 | Duke | |
| 2008/0276871 A1 | 11/2008 | Auburger et al. | |
| 2008/0314322 A1 | 12/2008 | Stellnert et al. | |
| 2009/0050061 A1* | 2/2009 | Duke | A01J 7/04 119/14.08 |
| 2009/0050062 A1 | 2/2009 | Auburger et al. | |
| 2009/0064937 A1 | 3/2009 | Rottier et al. | |
| 2009/0151641 A1 | 6/2009 | Schulze Wartenhorst et al. | |
| 2009/0165724 A1 | 7/2009 | Mader et al. | |
| 2009/0320760 A1 | 12/2009 | Torgerson et al. | |
| 2010/0132626 A1 | 6/2010 | Torgerson et al. | |
| 2010/0154900 A1 | 6/2010 | Torgerson et al. | |
| 2010/0236487 A1 | 9/2010 | Stellnert et al. | |
| 2010/0326360 A1 | 12/2010 | Duke et al. | |
| 2011/0220028 A1 | 9/2011 | Duke | |
| 2011/0220160 A1 | 9/2011 | Bosma | |
| 2011/0232575 A1 | 9/2011 | Duke | |
| 2012/0017836 A1 | 1/2012 | Torgerson et al. | |
| 2012/0111275 A1 | 5/2012 | Torgerson et al. | |
| 2012/0118237 A1 | 5/2012 | Torgerson et al. | |
| 2012/0118238 A1 | 5/2012 | Torgerson et al. | |
| 2012/0272911 A1 | 11/2012 | Duke | |
| 2013/0199449 A1 | 8/2013 | Daniel | |
| 2014/0283751 A1 | 9/2014 | Buck et al. | |
| 2015/0173320 A1 | 6/2015 | Balkenhol et al. | |
| 2015/0201577 A1* | 7/2015 | Duke | A01J 7/04 119/14.47 |
| 2015/0260302 A1 | 9/2015 | Peterson et al. | |
| 2016/0319947 A1* | 11/2016 | Balkenhol | A01J 7/022 |
| 2017/0014837 A1 | 1/2017 | Duke | |
| 2017/0164576 A1 | 6/2017 | Balkenhol et al. | |
| 2017/0359995 A1* | 12/2017 | Sellner | A01J 5/06 |
| 2018/0064056 A1 | 3/2018 | Torgerson et al. | |
| 2018/0220616 A1 | 8/2018 | Torgerson et al. | |
| 2019/0133067 A1* | 5/2019 | Stuessel | A01J 5/007 |
| 2019/0133069 A1 | 5/2019 | Stuessel et al. | |
| 2019/0145531 A1 | 5/2019 | Balkenhol et al. | |
| 2020/0088310 A1 | 3/2020 | Balkenhol | |
| 2020/0352129 A1 | 11/2020 | Torgerson et al. | |

FOREIGN PATENT DOCUMENTS

| | | |
|---|---|---|
| AU | 2015227478 B2 | 6/2018 |
| DE | 1801758 | 6/1970 |
| DE | 1582939 | 7/1970 |
| DE | 2622794 | 12/1977 |
| DE | 3540058 | 5/1987 |
| DE | 261300 | 10/1988 |
| DE | 4006785 | 9/1990 |
| DE | 10160161 A1 | 6/2003 |
| DE | 102013114595 A1 | 6/2015 |
| EP | 0277396 A1 | 8/1988 |
| EP | 0313109 A1 | 4/1989 |
| EP | 0319523 A2 | 6/1989 |
| EP | 0332235 A2 | 9/1989 |
| EP | 0459817 A1 | 12/1991 |
| EP | 0479397 A2 | 4/1992 |
| EP | 0527509 A2 | 2/1993 |
| EP | 0543463 A1 | 5/1993 |
| EP | 0583166 A2 | 2/1994 |
| EP | 0630557 A2 | 12/1994 |
| EP | 0728412 A2 | 8/1996 |
| EP | 0801893 A2 | 10/1997 |
| EP | 0945057 A1 | 9/1999 |
| EP | 1001199 A2 | 5/2000 |
| EP | 1219167 A2 | 7/2002 |
| EP | 1222853 A2 | 7/2002 |
| EP | 1089615 B1 | 3/2003 |
| EP | 1520469 A1 | 4/2005 |
| EP | 1543720 A1 | 6/2005 |
| EP | 1790217 A2 | 5/2007 |
| EP | 1795069 A1 | 6/2007 |
| EP | 1679956 B1 | 12/2008 |
| EP | 2113169 A1 | 11/2009 |
| EP | 1933616 B1 | 1/2011 |
| EP | 2277373 A2 | 1/2011 |
| EP | 1737291 B1 | 11/2013 |
| GB | 918766 | 2/1963 |
| GB | 1160900 | 8/1969 |
| GB | 1440901 | 6/1976 |
| GB | 0324647.7 | 10/2003 |
| GB | 0402119.2 | 1/2004 |
| GB | 0408968.6 | 4/2004 |
| GB | 0417392.8 | 4/2004 |
| JP | 2002345955 | 12/2002 |
| JP | 2002354958 | 12/2002 |
| JP | 2005192404 | 7/2005 |
| NL | 1016237 | 3/2002 |
| NL | 1021950 C | 5/2004 |
| SU | 1676538 | 9/1991 |
| WO | 1993/13651 | 7/1993 |
| WO | 1998/28969 | 7/1998 |
| WO | 1999/27775 | 6/1999 |
| WO | 1999/46978 | 9/1999 |

(56) References Cited

FOREIGN PATENT DOCUMENTS

| | | |
|---|---|---|
| WO | 1999/66767 | 12/1999 |
| WO | 1999/66787 | 12/1999 |
| WO | 01/17337 | 3/2001 |
| WO | 01/17338 | 3/2001 |
| WO | 02/07506 | 1/2002 |
| WO | 02/23976 | 3/2002 |
| WO | 03/030630 | 4/2003 |
| WO | 03/077645 | 9/2003 |
| WO | 03/098998 | 12/2003 |
| WO | 04/032608 | 4/2004 |
| WO | 2004/030445 A2 | 4/2004 |
| WO | 05/022986 | 3/2005 |
| WO | 05/043986 | 5/2005 |
| WO | 05/072516 | 8/2005 |
| WO | 05/102035 | 11/2005 |
| WO | 2006/029797 | 3/2006 |
| WO | 2006/091710 A2 | 8/2006 |
| WO | 2006/110079 A1 | 10/2006 |
| WO | 2006/117019 | 11/2006 |
| WO | 2006/135917 | 12/2006 |
| WO | 2007/31783 | 3/2007 |
| WO | 2007/129884 | 11/2007 |
| WO | 2007/129888 | 11/2007 |
| WO | 2008/102567 | 8/2008 |
| WO | 2008/138862 | 11/2008 |
| WO | 2009/077607 | 6/2009 |
| WO | 2009/158000 | 12/2009 |
| WO | 2010/053577 | 5/2010 |
| WO | 2011/28292 | 3/2011 |
| WO | 2011/28293 | 3/2011 |
| WO | 2011/28294 | 3/2011 |
| WO | 2011102911 | 8/2011 |
| WO | 2014/016588 A1 | 1/2014 |
| WO | 2015/118336 A1 | 2/2015 |
| WO | 2015/145116 A1 | 10/2015 |
| WO | 2015/150807 A1 | 10/2015 |
| WO | 2017/191057 A1 | 11/2017 |
| WO | 2019/090044 A1 | 5/2019 |
| WO | 2019/090136 A9 | 5/2019 |

OTHER PUBLICATIONS

"3-A® Accepted Practices for Permanently Installed Product and Solution Pipelines and Cleaning Systems Used in Milk and Milk Product Processing Plants, No. 605-04," Section N; Aug. 20, 1994.
Akam, D.N., "The Development of Equipment for the Mechanization of Manual Operations in Milking Machine," 17th Annual Meeting, National Mastitis Counsel, Inc., Feb. 21-23, 1978, pp. 417-426.
Grindal; et al., "Automatic application of teat disinfectant through the milking machine cluster" Journal of Dairy Research, 56:579-585 (1989).
International Search Report and Written Opinion from PCT/US2011/00322, dated Dec. 20, 2011.
Letter to Alex Ferguson from Jeffry W. Smith dated Dec. 22, 2006, 2pp.
Neijenhuis; et al., "Health of dairy cows milked by an automatic milking system; Effects of milking interval on teat condition and milking performance with whole-udder take off", Oct. 2003, 23 pages.
Office Action for U.S. Appl. No. 10/576,744 dated Jun. 3, 2010, 8pp.
May 17, 2018 EPO Communication; Details and minutes of the oral proceedings, Opposition of EP Patent 1737291, 9 pages.
May 31, 2018 Interlocutory Decision in Opposition Proceedings, Opposition of EP Patent 1737291, 49 pages.
Sep. 27, 2018 Statement of Grounds for Appeal, Opposition of EP Patent 1737291, 29 pages.
International Search Report and Written Opinion from PCT/US2018/058897, dated Feb. 25, 2019, 19 pages.
International Search Report and Written Opinion from PCT/US2018/059041, dated Mar. 8, 2019, 20 pages.
International Search Report for PCT/EP2017/060232, dated Aug. 3, 2017, 2 pages.
German Search Report for DE Application No. 10 2016 108 300.3, dated Mar. 10, 2017, 7 pages.
Feb. 4, 2019 Reply to Grounds for Appeal, Opposition of EP Patent 1737291, 32 pages.
Mar. 20, 2020 Examination Report for Australian Application No. 2018211343, 7 pages.
European Search Report dated Jan. 30, 2020 for European Application No. 19204875.9, 6 pages.
International Preliminary Report on Patentability for International Application No. PCT/US2018/059041, dated May 5, 2020, 12 pages.
International Preliminary Report on Patentability for International Application No. PCT/US2018/058897, dated May 5, 2020, 10 pages.
Oct. 15, 2020 Communication Regarding Oral Proceedings in Opposition to EP Patent 1737291, 10 pages.
Office Action for U.S. Appl. No. 11/652,372 dated Feb. 11, 2008, 14pp.
Office Action for U.S. Appl. No. 11/662,454 dated Aug. 16, 2010, 20 pp.
Office Action for U.S. Appl. No. 16/178,996 dated Jun. 24, 2021.
Office Action for U.S. Appl. No. 11/904,769 dated Feb. 20, 2008, 9pp.
Office Action for U.S. Appl. No. 12/712,787 dated Jun. 27, 2011.
PCT/GB04/004343—Written Opinion of ISA & IPRP dated Feb. 3, 2005, 5pp.
"PCT/US06/023075—ISR & Written Opinion dated Oct. 16, 2006".
PCT/US09/006026—IPRP, Written Opinion of ISA & ISR dated Mar. 6, 2010, 9pp.
"PCT/US09/03770—IPRP and Written Opinion dated Jan. 13, 2011, and ISR dated Oct. 7, 2009".
Preliminary Amendment for U.S. Appl. No. 10/576,744, filed Apr. 21, 2006, 16pp.
Preliminary Amendment for U.S. Appl. No. 10/576,744, filed Aug. 7, 2008, 10 pp.
Shearn; et al., "Reduction of bacterial contamination of teat cup liners by an entrained wash system," Veterinary Record (1994), 134, 450, 1p.
Thompson; et al. "The End-of-Milking Sequence and its Mechanization" 1976 Winter Mtg., Dec. 14-17, 1976, Anima Physiology and Genetics Inst., Beltsville, MD, 15pp.
U.S. Appl. No. 60/566,313, filed Apr. 29, 2004, J.R.J. Duke.
U.S. Appl. No. 60/566,314, filed Apr. 29, 2004, J.R.J. Duke.
U.S. Appl. No. 60/578,997, filed Jun. 12, 2004, Kevin L. Torgerson (510).
Notice of Opposition and Opposition brief for EP Patent 1737291, Filed on Aug. 26, 2014 by GEA Farm Technologies GmbH, 74 pages.
Response filed Feb. 2, 2015 by An Udder IP Company in the Opposition of EP Patent 1737291, 53 pages.
European Search Report dated Sep. 24, 2015 for EP Application No. 15171008.4, 6 pages.
Reply filed on Dec. 16, 2015 by GEA Farm Technologies GmbH in the Opposition of EP Patent No. 1737291, 75 pages (English Translation).
Wildbrett et al., "Über Reinigung und Desinfektion von Tanks" Materials and Corrosion 12(12):759-764. Nov. 1961.
European Patent Office Preliminary Opinion and Summons to Attend Oral Proceedings dated Jan. 18, 2016, Opposition of EP Patent 1737291, 12 pages.
European Search Report dated Aug. 13, 2014, EP Application No. 14159588.4, 5 pages.
International Search Report and Written Opinion from PCT/EP2014/0//684, dated Apr. 10, 2015, 10 pages.
Amendments and Observations filed Oct. 24, 2016 by An Udder IP Company Ltd in the Opposition of EP Patent 1737291, 47 pages.
Amendments and Observations filed Oct. 25, 2016 by GEA Farm Technologies GmbH in the Opposition of EP Patent 1737291,13 pages.

(56) References Cited

OTHER PUBLICATIONS

Nov. 10, 2016 EPO Communication re: the Proprietor, An Udder IP Company Ltd's request concerning the staying/postponement of the opposition proceedings, Opposition of EP Patent 1737291, 1 page.
Nov. 25, 2016 EPO Communication re: results of the oral proceedings, Opposition of EP Patent 1737291, 5 pages.
Dec. 8, 2016 EPO Communication; Details and minutes of the oral proceedings, Opposition of EP Patent 1737291, 13 pages.
Mar. 30, 2017 EPO Communication, State of the Opposition Procedure and Invitation to File Observations, Opposition of EP Patent 1737291, 10 pages.
Response filed by Udder IP Company LTD on Jun. 2, 2017, Opposition of EP Patent 1737291, 4 pages.
Response filed by GEA Farm Technologies GmbH on May 29, 2017, Opposition of EP Patent 1737291, 5 pages.
Jul. 27, 2017 EPO Communication; State of the Opposition Procedure and Summons to Attend Oral Proceedings, Opposition of EP Patent 1737291, 10 pages.
European Search Report dated Oct. 13, 2017, for European Application No. 17171229.2, 6 pages.
Mar. 13, 2018 Letter from the Proprietor, An Udder IP Company Ltd, Regarding the Opposition Procedure for Opposition of EP Patent 1737291, 23 pages.

\* cited by examiner

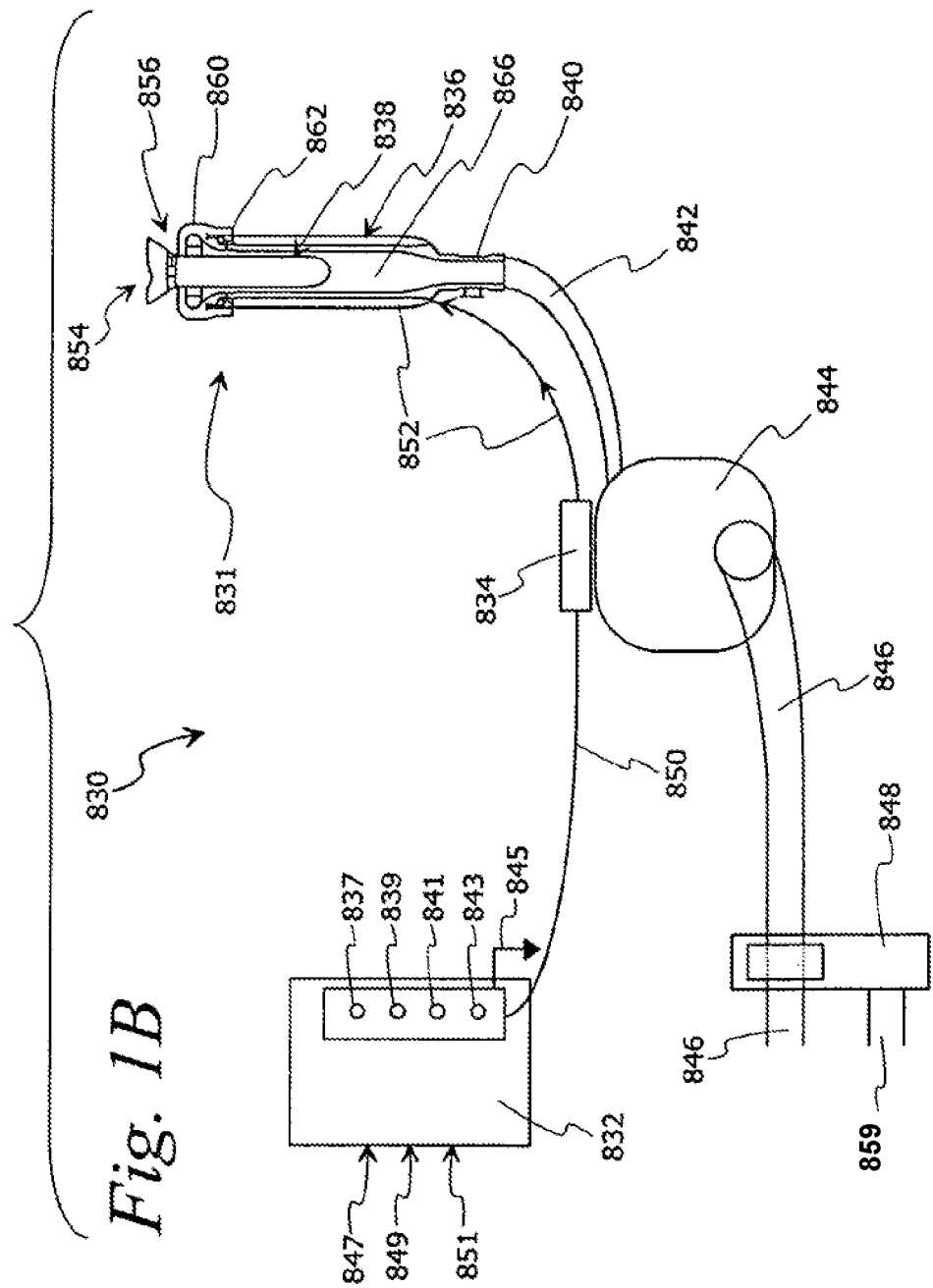

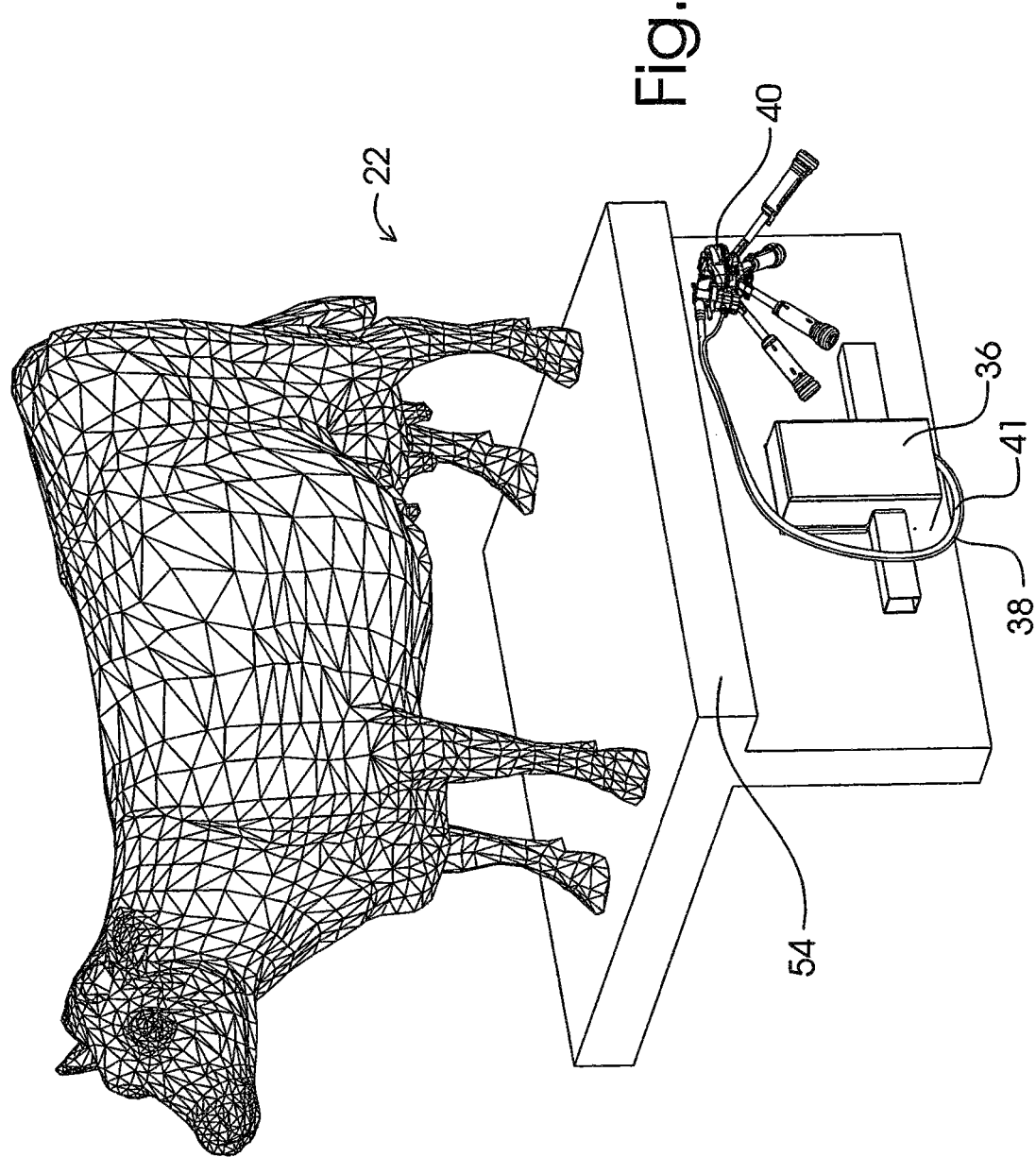

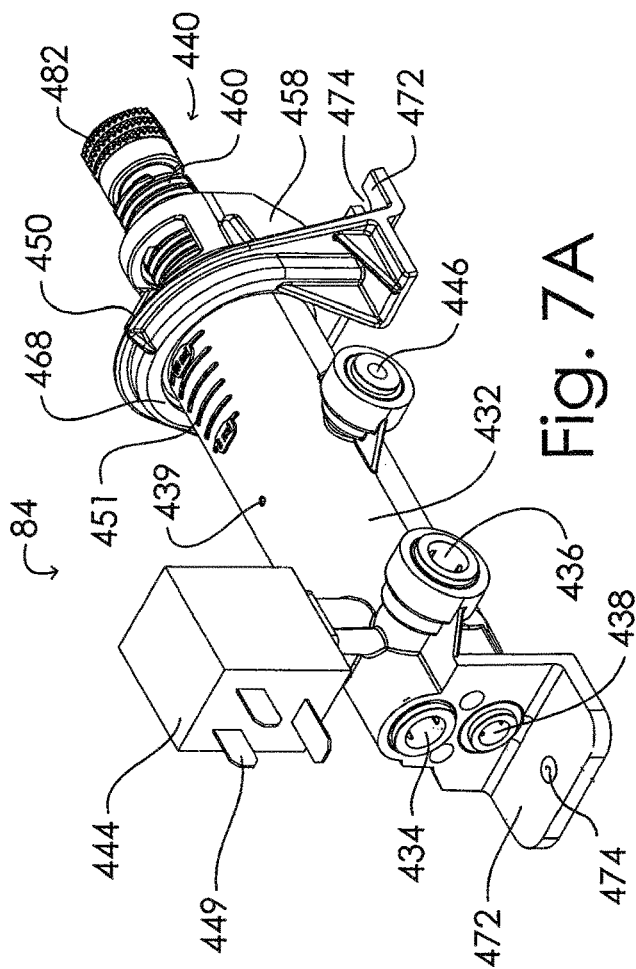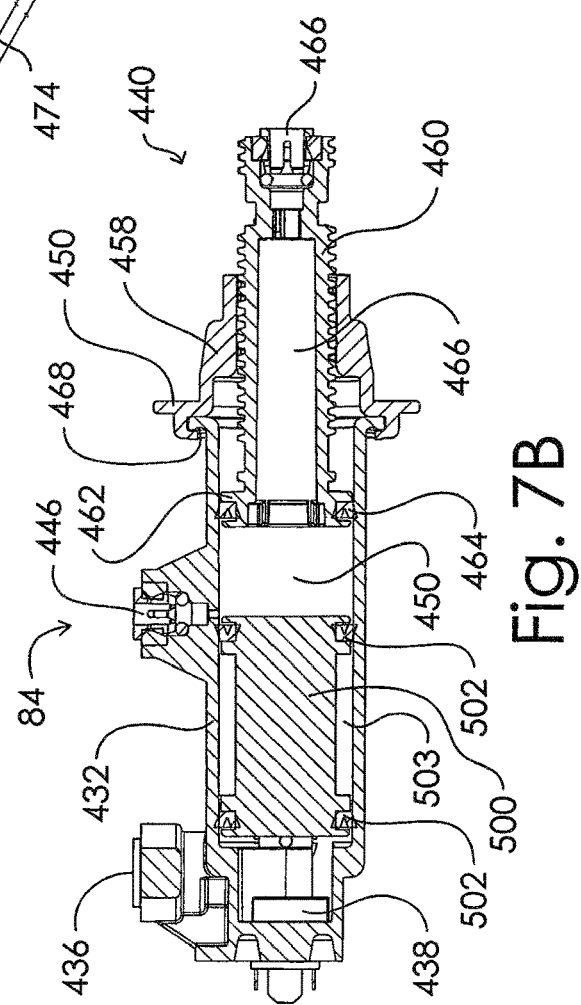

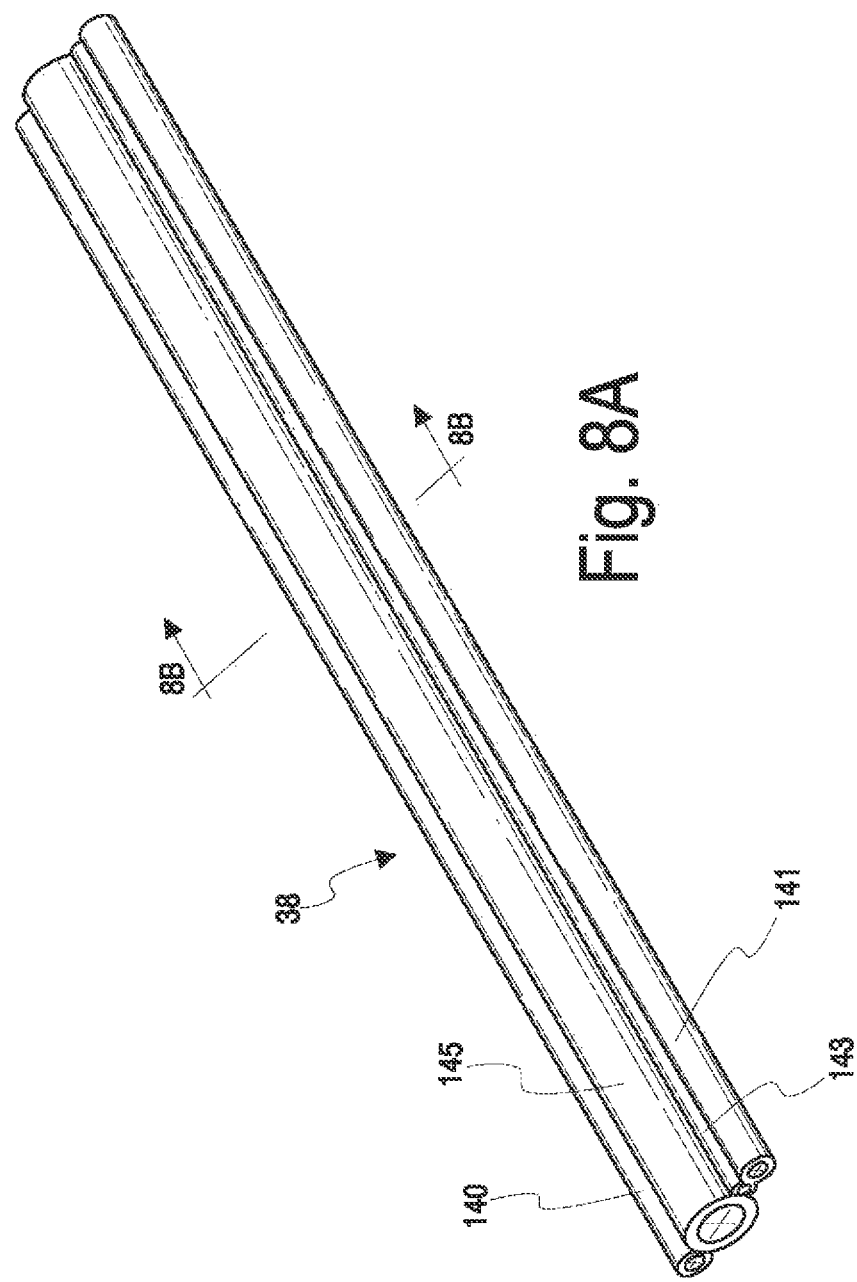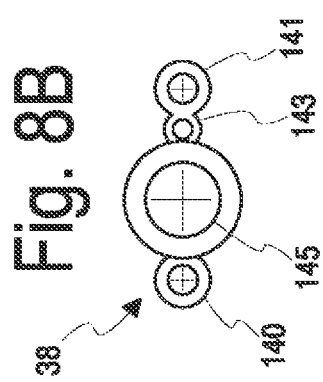

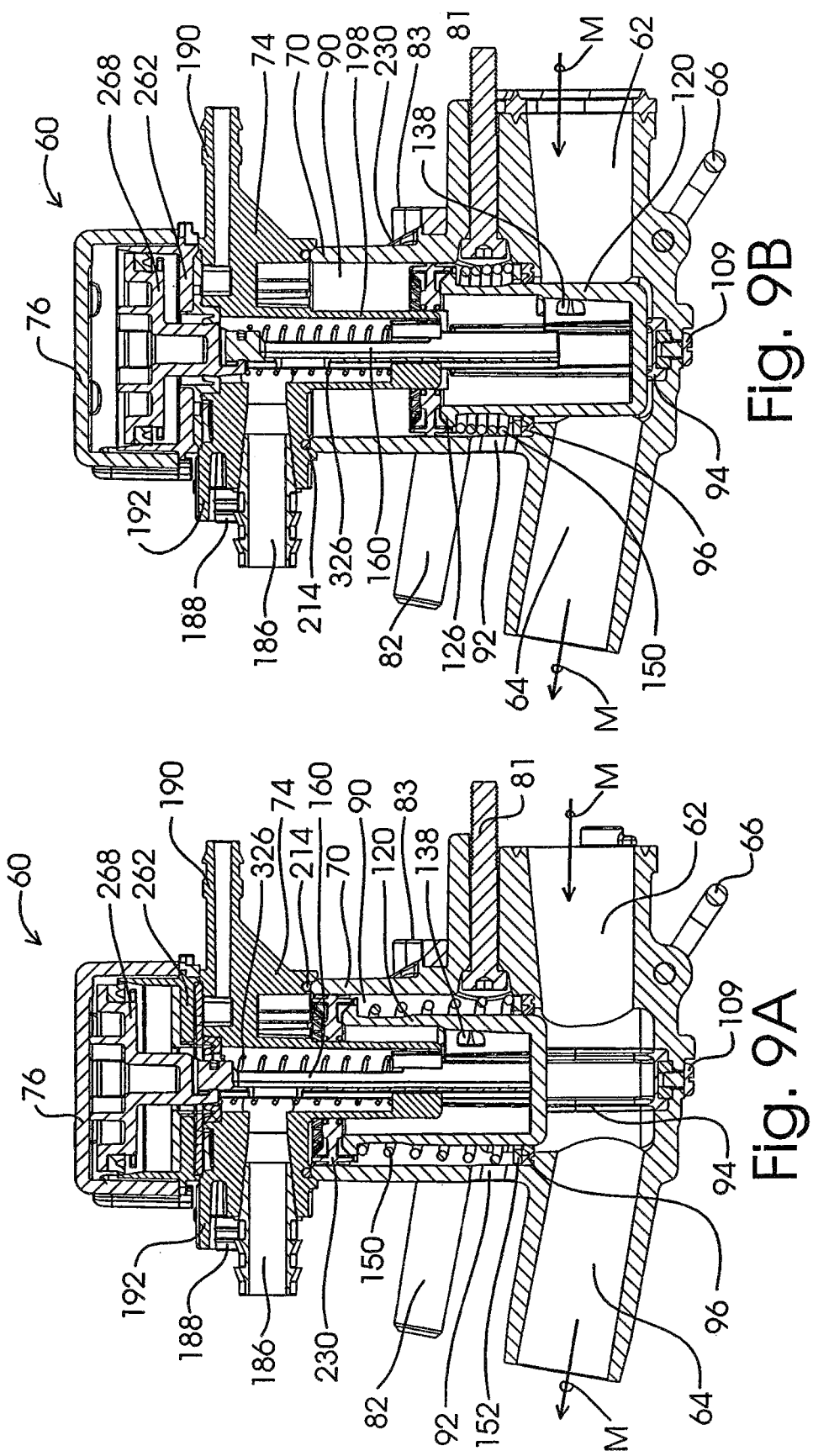

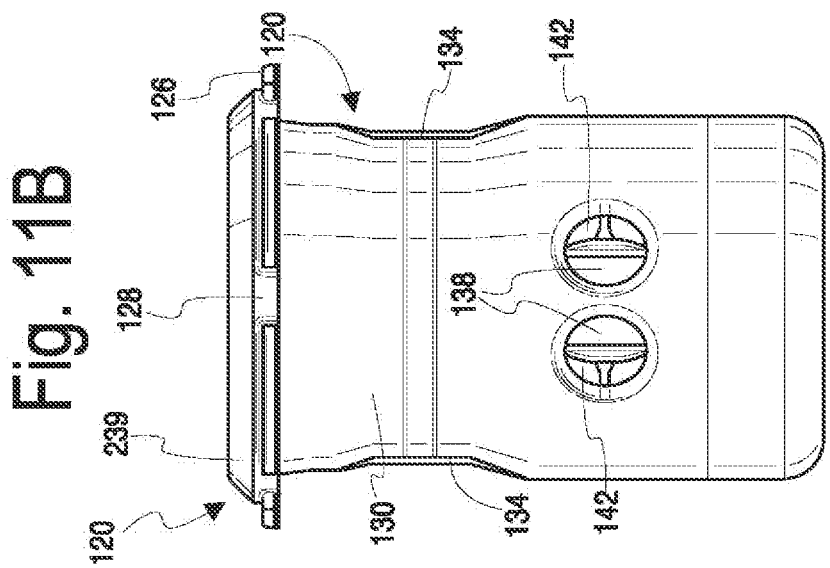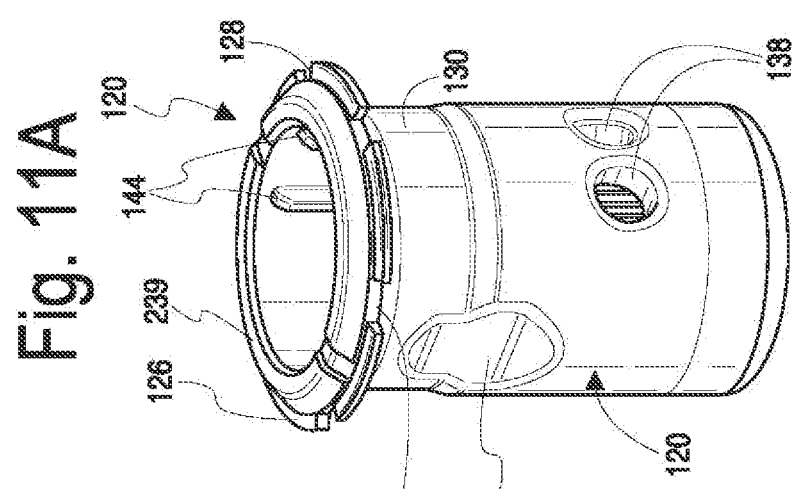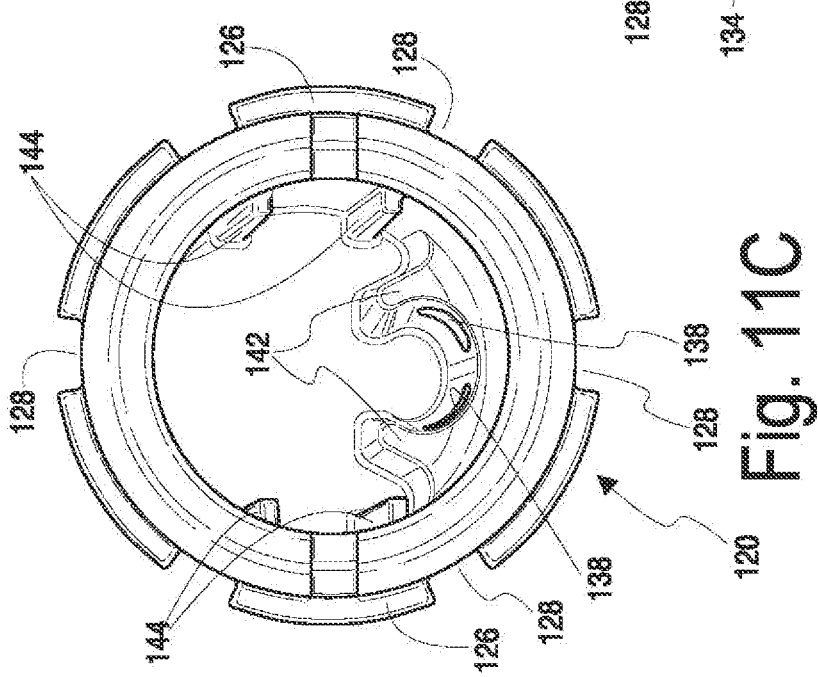

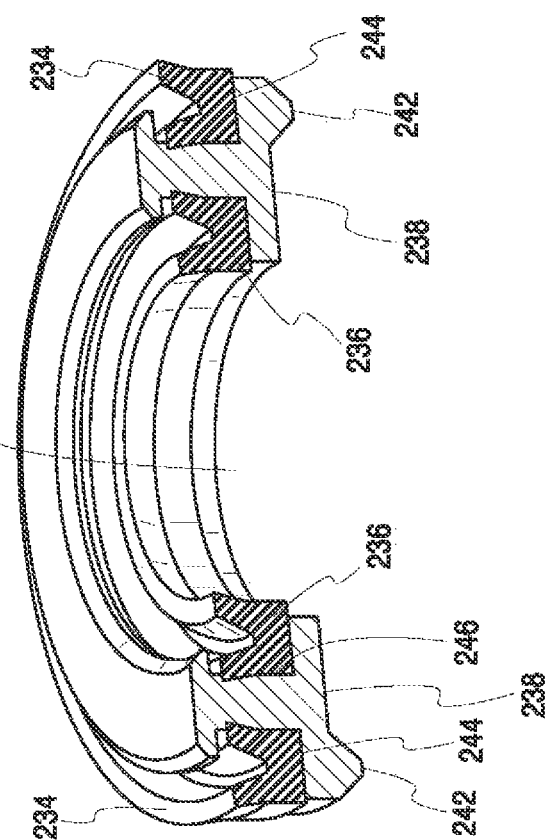
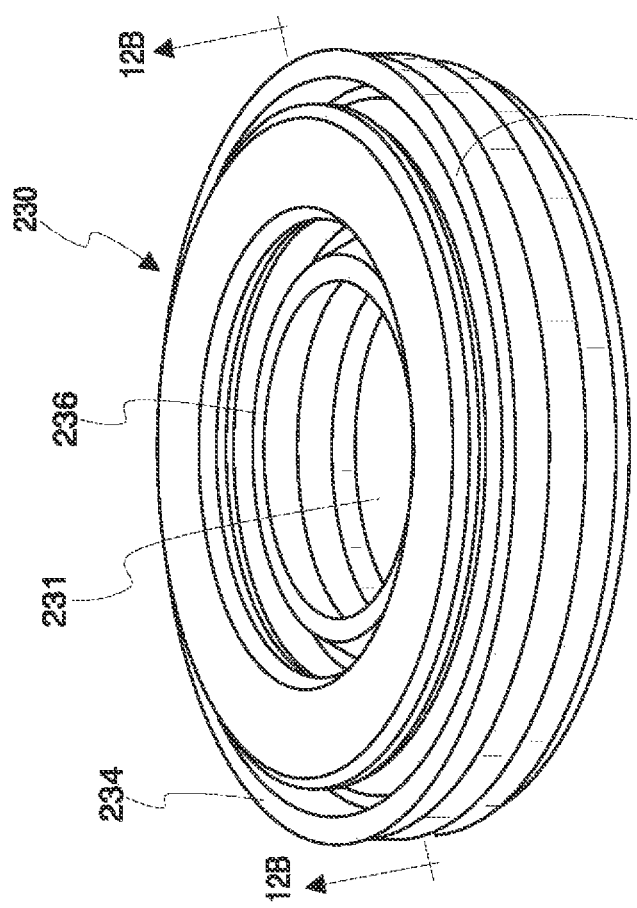

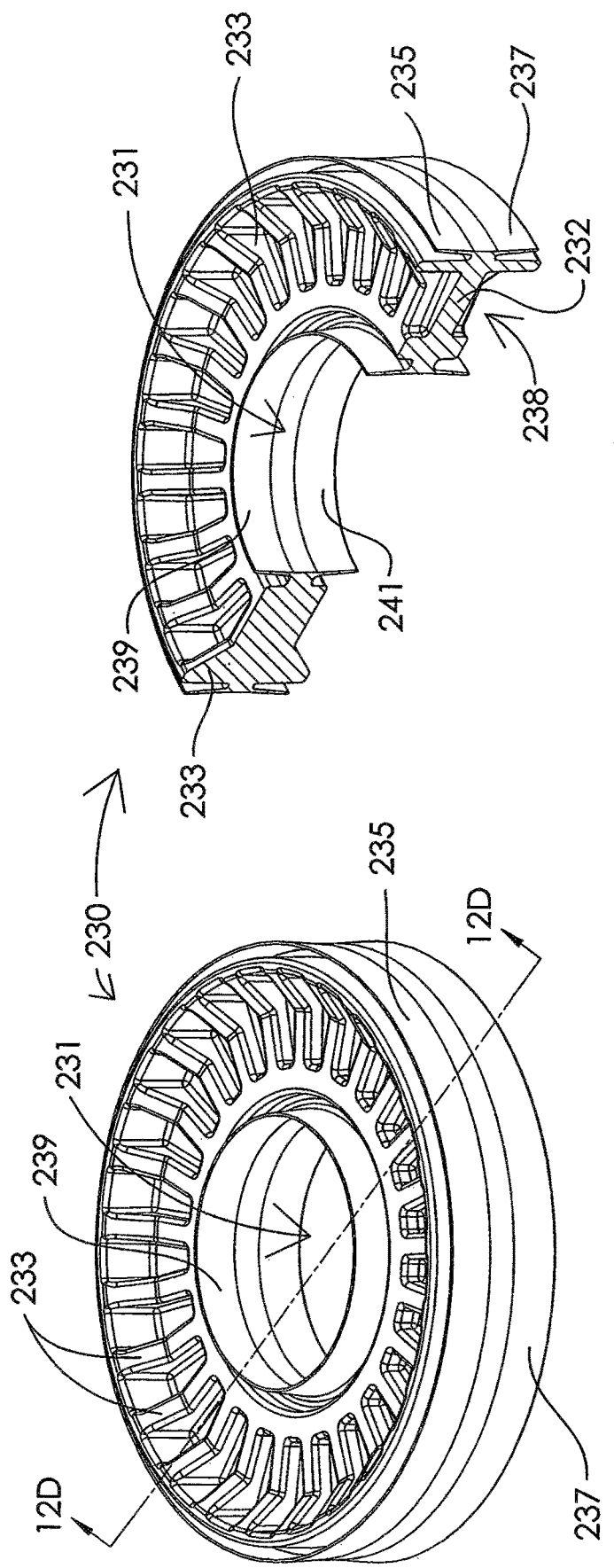

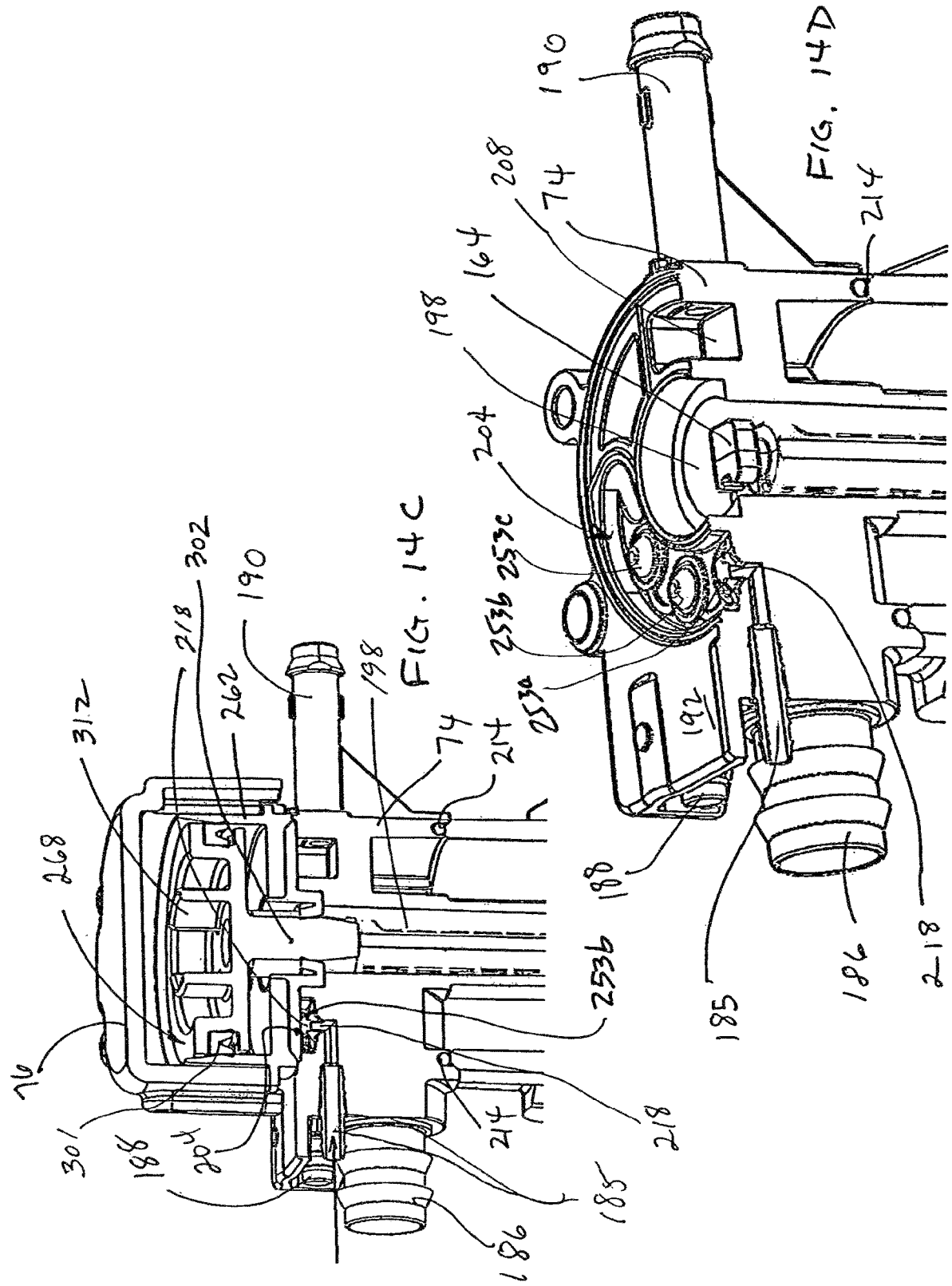

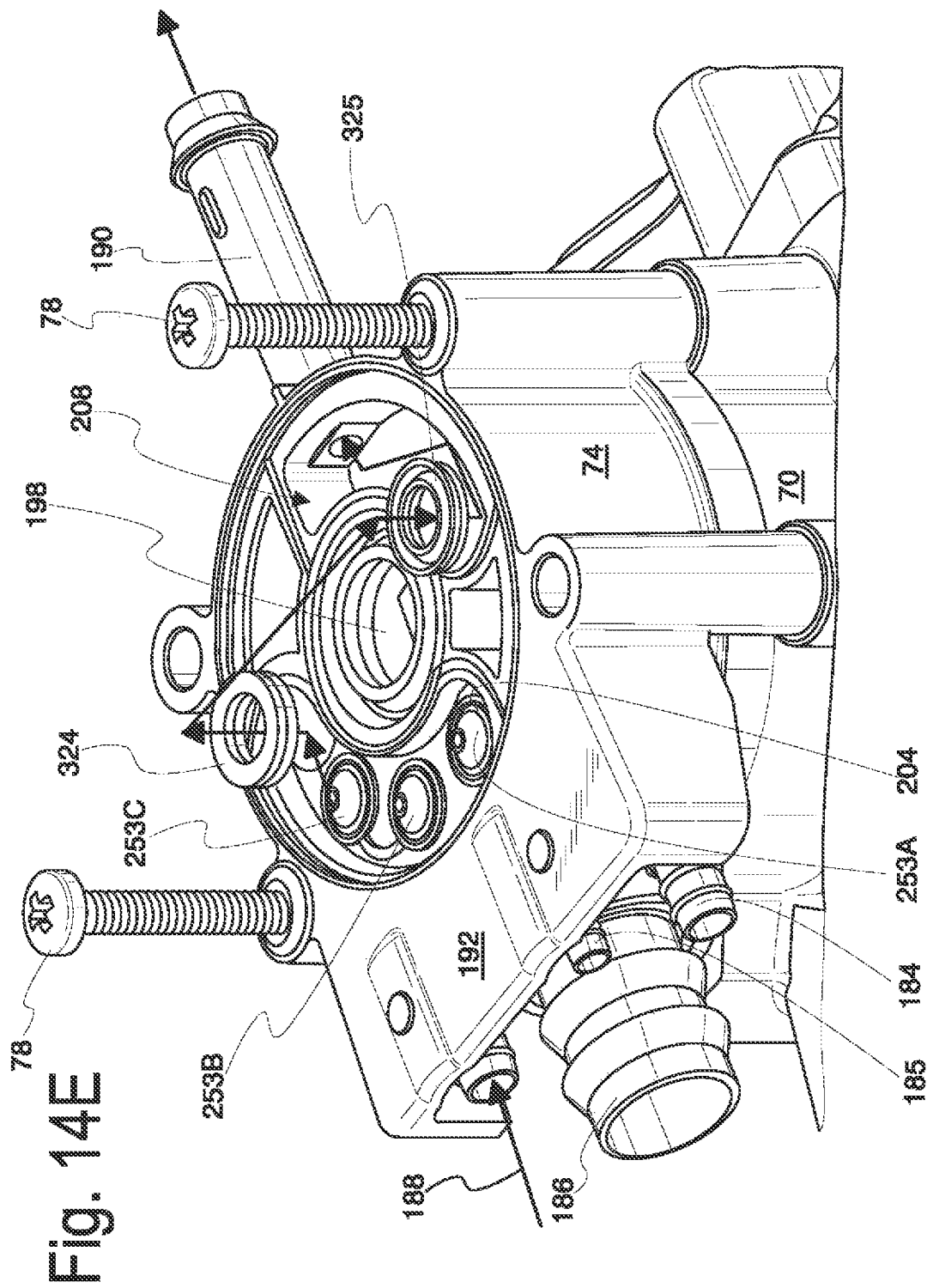

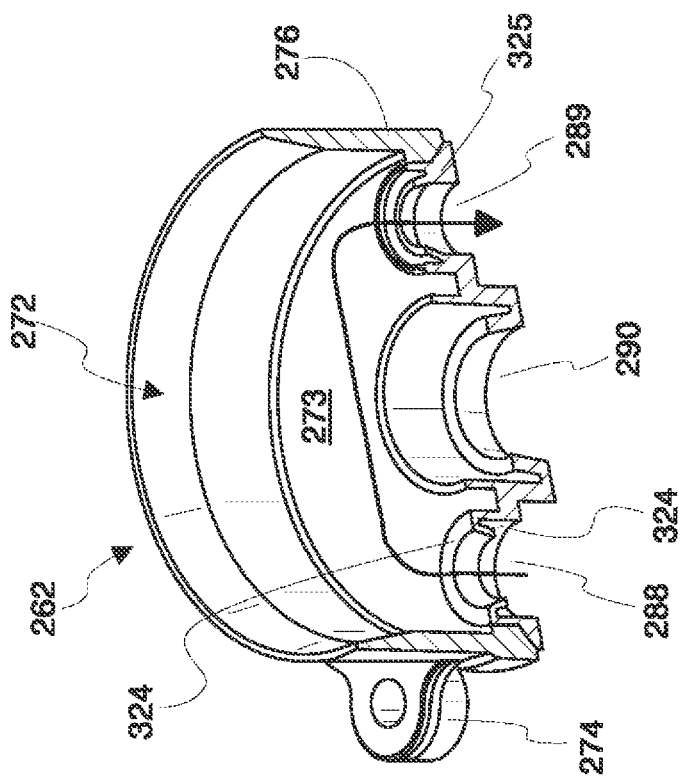
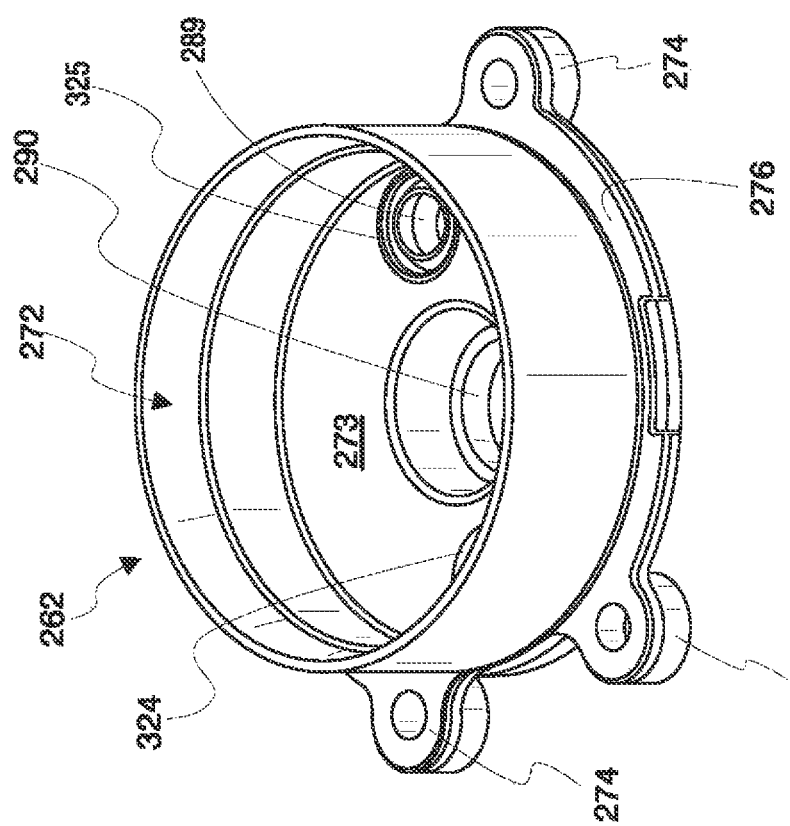

Fig. 22

Control Operation

| Typical cycle | | Notes | Safety Valve Isolates | Dip cow | | Rinse milk out of milker unit | | | Apply backflush chemical | | |
|---|---|---|---|---|---|---|---|---|---|---|---|
| Step | | 1 | 2 | 3 | 4 | 5 | 6 | 7 | 8 | 9 | 10 | 11 |
| Default Time (sec) | | idle | 1 | 0.1 | 10 | 3 | 1 | 3 | 1 | 0 | 3 | 1 |
| Range | | | | 0-5 | 0-2 | 0-10 | 0-10 | 0-10 | 0-10 | 0-10 | 0-10 | 0-10 | 0-10 |
| Increment | | | | 0.1 | 0.1 | 0.1 | 0.1 | 0.1 | 0.1 | 0.1 | 0.01 | 0.1 | 0.1 |
| Cycle | Milking | | | | | | | | | | | |
| Detach Input | End of Milk--> | <-Detach | | | | | | | | | | |
| Output | | | | | | | | | | | | |
| Milker Unit Safety Valve | | | | | | | | | | | | |
| Water valve | | | | | | | | | | | | |
| BF Air Purge valve | | | | | | | | | | | | |
| Dip valve | | | | | | | | | | | | |
| BF Chemical Valve | | | | | | | | | | | | |
| Stall Control block valve | | | | | | | | | | | | |
| Running time | | start | 1.1 | 11.1 | 14.1 | 15.1 | 18.1 | 19.1 | 19.1 | 22.1 | 23.1 | program reference...case  7

3 possible BF Options      +  Backflush solution, iodine or water only.

Reattach Option:

Reattach routine = steps 13-19                    Cycles to be performed immediately upon input for reattach.

If invention cycle has been initiated and program is on steps 1-12, advance program to Step 13 and stop after step 19.

If program is on step 13-19, continue and then stop after step 19.

If program has already advanced to step 20 or beyond, continue to process all the way through step 25.

Fig. 23

Control Operation

| Output # | Typical cycle | Disinfection time | repeat x 7 | | | repeat x 2 | | |
|---|---|---|---|---|---|---|---|---|
| | Step | 12 | 13 | 14 | 15 | 16 | 17 | 18 |
| | Default Time (sec) | 20 | 2 | 1 | 1 | 1 | 0.5 | 3 |
| | Range | 0-60 | 0-10 | 0-10 | | 0-10 | 0-10 | 0-10 |
| | Increment | 1 | 0.1 | 0.1 | | 0.1 | 0.1 | 0.1 |
| | Cycle | Kill time | Rinsing | | | | | Done |
| | Detach Input | | | | | | | |
| | Output | | | | | | | |
| | Milker Unit Safety Valve | | | | | | | |
| | Water valve | | | | | | | |
| | BF Air Purge valve | | | | | | | |
| | Dip valve | | | | | | | |
| | BF Chemical Valve | | | | | | | |
| | Stall Control block valve | | | | | | | |
| | Running time | 43.1 | | 64.1 | 65.1 | | 68.1 | 71.1 |
| | program reference...case | 10 | 11 | | 25 | | | 30 |

Fig. 24

Control Operation

| | Typical cycle | Fill Accumulator for next milking | repeat x 3 | | | repeat x 4 | | |
|---|---|---|---|---|---|---|---|---|
| | Step | 19 | 20 | 21 | 22 | 23 | 24 | 25 |
| | Default Time (sec) | 3 | 1 | 0.5 | 1 | 0.5 | 0.5 | |
| | Range | 0-10 | 0-10 | 0-10 | | 0-10 | 0-10 | |
| | Increment | 1 | 0.1 | 0.1 | | 0.1 | 0.1 | |
| | Cycle | Charge | Home Rinse | | | | | End |
| | Detach Input | | | | | | | |
| Output # | Output | | | | | | | |
| | Milker Unit Safety Valve | | | | | | | |
| | Water valve | | ▓ | | | | | |
| | BF Air Purge valve | | | ▓ | | ▓ | | |
| | Dip valve | ▓ | | | | | | |
| | BF Chemical Valve | | | | | | | |
| | Stall Control block valve | | ▓ | ▓ | ▓ | ▓ | ▓ | |
| | Running time | 74.1 | | 75.6 | 76.6 | | 80.6 | |
| program reference...case | | 31 | 32 | | 36 | 37 | | 45 |

Fig. 25

| Steps | Change | Function |
| --- | --- | --- |
| 1 | Idle | Milking |
| 2 | Detach signal + delay | Output from detacher initiates a detach delay before dipping. |
| 3 | Move safety valve | Moves safety valve into bf position and creates path for dip to flow to liners. |
| 4 | Dip | Air pressure to stall control: 1) moving stall control safety valve into place. 2) pushes dip out of dosing valve to liner. |
| 5-8 | Rinse | Perform rinsing of milker unit before introducing backflush solution. |
| 9-11 | Backflush chemical | Push backflush solution into milker unit and distribute onto all surfaces. |
| 12 | Delay/kill time | Pause to allow chemicals to kill bacteria. |
| 13-15 | Rinse | Perform several rinse cycles to purge all chemicals from milker unit. |
| 16-17 | Blow dry | Pulse air several times to remove all remaining rinse water from milker unit. |
| 18 | Backflush complete | Return safety valves to milk position. |
| 19 | Charge chemical | Resupply dosing valve with dip by turning on dip valve at valve block. |
| 20-22 | Home rinse | Pulse rinse water through safety valve cap to clean out any residue or foreign materials. |
| 23-24 | Home rinse purge | Pulse air through cap to purge any remaining water. |
| 25 | Done | Ready to milk again. All safety valves are in position. |
| Return to step 1 | | |
| Outputs | Power | Function |
| Air valve | | Operates safety valve |
| Water valve | | Rinse water |
| Air valve | | Provides air to push and agitate BF solution; purges line at end of cycles |
| Dip valve piston in safety valve | | Provides dip to unit |
| Chemical valve | | Used to provide alternate BF solution when dip is not mixed with water for BF solution |
| Safety valve | | Isolates water and BF supply lines from milker unit or milk system lines |

SAFETY VALVE FOR A DAIRY SYSTEM COMPONENT

CROSS-REFERENCE TO RELATED APPLICATIONS

This application is a divisional of U.S. application Ser. No. 15/887,573 filed Feb. 2, 2018, which is a divisional of U.S. application Ser. No. 15/366,858 filed Dec. 1, 2016, issued Feb. 6, 2018 under U.S. Pat. No. 9,883,652, which is a divisional of U.S. application Ser. No. 14/588,094 filed Dec. 31, 2014, issued Dec. 6, 2016 under U.S. Pat. No. 9,510,556, which is a divisional of U.S. application Ser. No. 13/269,835 filed Oct. 10, 2011 issued Jul. 7, 2015 under U.S. Pat. No. 9,072,273, which is a continuation of U.S. application Ser. No. 12/584,475 filed Sep. 4, 2009 issued Oct. 11, 2011 under U.S. Pat. No. 8,033,247, is incorporated herein by reference in their entireties.

FIELD AND BACKGROUND OF THE INVENTION

This invention relates generally to teat dip applicators and backflushing systems for dairy animal milker units, and more particularly to automatic milker unit backflushing systems, teat dip applicators, related components, and methods for safely and efficiently applying dips and backflushing milker units.

Dairy milking systems as they relate to the present invention include a cluster of teat cups, each of which is matched with a flexible teat cup liner that is attached to a teat of a dairy animal with a vacuum. Vacuum is applied in pulses between the shell and liner to facilitate movement of the flexible liner to milk the dairy animals. Milk flows from the cow through each flexible liner and then through a short milk tube to a milker unit collecting bowl assembly, which collects milk from all of the animal's teats. This combination of elements is known as a milker unit and can be used to milk cows, sheep, goats and other dairy animals. Each milker unit is used to milk multiple animals so it must be sanitized, at least periodically, to prevent transmission of dirt and germs into the milk, and to help prevent transmission of diseases from animal to animal.

Milk from individual animals flows from each collecting bowl assembly through a long milk tube and into a milk line that receives milk from all of the milker units in the dairy. The milk is then chilled and stored in a milk tank. The milk lines and storage systems must not be contaminated with dirt, debris, chemicals, pathogens, or contaminated milk.

Various methods have been used to clean milker units. For example, milker units have been immersed into a bucket filled with a disinfectant solution for cleaning. In a simple automated variation, milker units are pulled through a so-called "disinfection trough" or multiple troughs filled with disinfectant solution. Other systems include automatic rinsing that is usually done from the downstream end of the long milk tube and cleans the entire length of the long milk tube as well as the milker unit. This latter method involves very high consumption of water and cleaning chemicals, and can waste milk that is in the long milk tube that is otherwise salable. In all cases, a practically complete removal of the disinfectant solution from the milker unit must take place before it is applied to the next cow, so thorough rinsing and/or backflushing are necessary.

In addition, dairy animal teats have broadened milk ducts after milking that make them especially susceptible to new infection from mastitis pathogens. To combat these pathogens, the teats can be treated with a disinfectant solution that adheres well to the teats and which usually also contains a skin-care component. The application of this disinfectant solution is called dipping and can be done with a hand-held dipping cup into which the individual teats are introduced. Dip can also be applied using manual spray devices and foam applicators. Dipping with a cup is especially labor-intensive, but generally has a better success rate and a lower consumption of dipping solution than manual spraying methods.

Some spraying methods are automated to spray dip from a dipping arm or dipping bar. Automated sprayers are not precise and tend to consume much more dipping solution than manual dipping methods. Other early automatic teat dipping applicator systems applied dip upward from the short milk tube toward the bottom of a teat at the end of milking, but before detachment from the milker unit. This arrangement provided some protection, but it did not coat the entire teat uniformly. See U.S. Pat. No. 7,290,497. Others have suggested automated systems that apply dip to an upper teat portion, but most of these failed to provide: uniform dip coverage on teats; consistent volumes of dip application over time; and protection of downstream milk system components from being contaminated by dip and other chemicals.

In particular, most prior automatic teat dip applicators and milker unit cleaner systems fail to adequately ensure that teat dip compositions and backflushing fluids do not enter the long milk tube and contaminate the dairy milk lines. This problem can be caused by a number of factors, but one possible cause for contamination results from differential pressures that develop in dipping and backflushing devices that are connected to milk lines. Differential pressures between the milk lines, and dipping and backflushing devices can cause seepage even through closed valves and tight seals, so it is difficult to design, build, install, maintain, and use automated teat dip applicators and milker unit backflushing systems that are safe and prevent contamination of dairy systems.

Thus, there is a need to provide backflushing and teat dip application automatically and in a conveniently arranged system that also ensures that the dip solutions and backflushing fluids do not contaminate the dairy system and milk supply.

SUMMARY OF THE INVENTION

The present invention is directed to systems and methods that automatically backflush milker units and can automatically apply teat dip to dairy animal teats. Generally, when dip application is to be performed with the present invention, it occurs automatically near the end of milking, when milk flow through the milker unit diminishes and vacuum is about to be shut off to detach the milker unit from a dairy animal. Before detachment from the animal, the invention isolates the milker unit from the rest of the dairy system and delivers teat dip near the top of an animal's teats. A dip applicator in accordance with the invention can include; a dip supply, a pump, suitable conduits, valves, and a manifold that directs substantially uniform volumes of dip to each animal teat. The invention can be adjusted to properly time dip delivery, teat coverage, and dip rinsing for most types of teat dips.

After dip application, backflushing is performed by the present invention by continuing to seal off the milker unit from the downstream dairy system components. Valves are operated and backflushing chemicals, water, and air are used to sanitize the milker unit. The backflushing operation begins near a downstream portion of the milker unit and is directed upstream toward the teat cups and liners. Cleaning the milker unit with the invention is more thorough than cleaning just the cup liner and yet it does not waste milk in the long milk tube. The milker unit and the invention itself can be rinsed with clean water after backflushing.

Automatically backflushing milker units cleans out milk and teat dipping solution and prepares the milker unit for the next animal with minimal or no operator effort. Reduced operator effort results in more consistent dipping and milker unit cleaning and improved dairy herd health.

In accordance with the invention, the synchronization of the dipping and backflushing operations and the protection of downstream milk system components can be performed by a system that includes; a main control, delivery hoses, an air supply, a water supply, a backflushing fluid supply, a dip supply, a stall control, and a safety valve to seal the downstream end of a milker unit from the rest of the dairy system. The system can also include valve and controls to deliver backflushing fluids, water, and air through the safety valve and into the milker unit. The dairy system downstream from the milker unit includes the long milk tube and the rest of the dairy milk collecting, chilling, and storage devices, and these are protected from contamination by the safety valve and other system components.

One main control per milking parlor can be used and comprises an electronic control, storage units and preparation of the dipping and disinfectant solution. The main control can also monitor overall system safety and can generate appropriate warning signals or shut-down signals. There can also be more than one main control, where each controls a number of stalls within the overall dairy.

A stall control unit controls the system at each related milking station. It can control the time and sequence of the dipping, backflushing, and rinsing operations for individual milking stations. The stall control can also store dipping solution in a dosing valve in preparation for each dipping process. The dip amount to be applied can be adjusted to accommodate variations in teat dips, weather conditions, herd health, and any other relevant conditions using a dosing valve in accordance with the present invention.

A safety valve in accordance with the invention can be formed integrally with a milker unit collection bowl or be mounted on or near a downstream portion of the milker unit. The safety valve automatically isolates the milker unit and dairy system from the dipping and backflushing devices during milking. The safety valve also automatically isolates the milker unit from the rest of the milking system during the dipping and backflushing processes to ensure that no dip or backflush fluids can flow into the milking system downstream from the milker unit. The safety valve and a dip valve can be formed in a single valve unit. The invention can be installed as an automatic backflush system or dip applicator only, or it can include both. Also, an automatic backflush system can be installed initially and later have an automatic teat dip applicator added. The safety valve can also be added to most existing milker unit types and styles.

As stated above, the teat dip applicator applies dipping solution after milking and before the milker unit is released from the animal. Dip travels from the dip valve components in the safety valve to the liners through dip channels that are mounted either inside or outside of the teat cups (or shells). Consumption of teat dip with the present invention is comparable to the low consumption realized during manual dipping with a dipping cup. The dip can be distributed through the head of the teat shell liner, whereby the disinfectant solution can be distributed all around by dome flow controllers formed in the inside of the head of the shell liners such as those disclosed in U.S. application Ser. No. 12/215,706 and Ser. No. 12/157,924, U.S. Pat. No. 7,401,573, and Provisional Application 60/578,997 the disclosures of which are incorporated herein by reference. In this way, a single introduction of teat dip to the shell liner is sufficient to distribute the dip uniformly in the area inside the liner head and onto the teat, and then it is wiped on the length of the teat as the teat cup is removed. Gravity, pressure differential, and the wiping action of the liner during detach all ensure full coverage of the teat from top to bottom. Controlling dip flow this way also reduces dip spray out of the milker liner as the milker unit falls from an animal.

The milker unit safety valve ensures that disinfectant and teat dip cannot flow downstream from the safety valve and into the milk line, despite differential pressures in the milk lines and safety valve. To prevent seepage past valves and seals, a safety valve in accordance with the invention can include a type of valve arrangement known as "block-bleed-block." Standard valves and seals can fail or allow seepage due to differential pressure on opposite sides of seals used in milk, teat dip, and backflushing lines. The block-bleed-block function of the invention prevents migration of disinfectant and teat dip through valves and seals into the milk lines by supplying a pair of spaced apart valves and a vent or "bleed" to atmosphere, with the vent being disposed between two seals. Multiple block-bleed-block arrangements can be used in the invention to provide redundancy and added safety.

Also in accordance with the invention, there is provided a valve block that joins air, water, and backflushing supply lines and channels them to a common outlet for efficiency. The valve block also provides a pressure bleeding vent between a pair of seals to further protect milk lines from contamination.

Also, in accordance with the invention, a teat dip manifold can be used to ensure more equal and consistent distribution of the dipping solution to individual teat cups. The manifold can be disposed on or near the milker unit or safety valve The teat dip manifold can also include a valve arrangement that isolates each liner head dip tube or pairs of liner head dip tubes from the others in the milker unit to prevent adverse pressure differentials in the various tubes during milking. Adverse pressure differentials in these tubes can affect critical milking vacuum levels in the milker unit liner head, and the present invention eliminates or reduces these pressure differentials.

A method for backflushing a milker unit, in accordance with the present invention, includes the steps of: closing a safety valve to substantially seal off a downstream portion of the milker unit from a dairy pipeline system; pumping backflush fluid through a safety valve and the milker unit; pumping water through the safety valve and milker unit; forcing air through the safety valve and the milker unit; and opening the safety valve so that the milker unit is in fluid communication with the dairy pipeline system.

The step of closing the safety valve can include the step of: moving a backflushing piston from a milking position to a backflushing position, which can include the step of: forcing air into the safety valve to move a backflush piston from a milking position to a backflushing position.

The method for backflushing a milker unit can also include the step of: bleeding the safety valve at a safety valve vent, wherein the vent is disposed between an upstream seal and a downstream seal when the safety valve is in the milking position and/or the backflushing position, and the vent can be disposed between a backflush fluid supply in fluid communication with the safety valve and the downstream portion of the milker unit when the safety valve is in a milking position.

The present invention can perform the above steps for backflushing a milker unit in conjunction with a method for dipping dairy animal teats is performed. The method for dipping dairy animal teats can include the steps of: moving the backflushing piston to a backflushing position; and moving a dip valve piston to a dipping position to allow dip to flow from a supply of pressurized dip to a dip channel that is in fluid communication with an upper portion of a teat shell liner, and this step is performed before and/or during detachment of a milker unit from an animal.

The present invention can accomplish one or more of the following: automate the dipping process to increase operator efficiency and reduce operator fatigue; provide safe, individual disinfection of the teats to reduce pathogenic organisms on the teat; prevent transfer of infection from animal to animal, and thus improvement of udder health of the entire herd; reduce or minimize chemical consumption (as opposed to spray or other automated dipping systems); improve uniformity of teat dip application; prevent chemical contamination of the milk and of the downstream milk system lines; reduce water consumption during backflushing of the milker unit; and be retrofitted to nearly any available milking unit.

BRIEF DESCRIPTION OF THE DRAWINGS

FIG. 1B is a perspective schematic view of an alternate embodiment of a dip applicator and backflushing system in accordance with the present invention;

FIG. 4B is a perspective view of the milking stall and milker unit of FIG. 4A, with the milker unit in a backflushing position;

FIG. 7A is a perspective view from the lower right of a dosage valve in accordance with the present invention;

FIG. 7B is a side cross sectional right view of a dosage valve in accordance with the present invention;

FIG. 8A is a perspective view of a hose combination for communicating multiple fluids between components of the present invention and computer that can program and reprogram the stall control;

FIG. 8B is a cross sectional view of the hose combination of FIG. 8A;

FIG. 9A is a cross sectional view of a dosing valve in accordance with the present invention in a milking position;

FIG. 9B is a cross sectional view of the dosing valve of FIG. 9A in a backflush position;

FIG. 11A is a perspective view of a backflush piston in accordance with the present invention;

FIG. 11B is a side view of the backflush piston of FIG. 11A;

FIG. 11C is a top view of the backflush piston of FIG. 11A;

FIG. 12A is a perspective view of a backflush valve operation plate, in accordance with the present invention;

FIG. 12B is a cross section of the plate taken along line 12B-12B in FIG. 12A;

FIG. 12C is a perspective view of an alternate embodiment of a backflush operation plate in accordance with the present invention;

FIG. 12D is a cross section of the backflush operation plate taken along line 12D-12D in FIG. 12C;

FIG. 14C is a partial cross sectional and perspective view of the safety valve, and illustrating an air inlet through with pressurized air enters the safety valve to purge cleaning fluids from the safety valve and related components;

FIG. 14D is a partial cross sectional and perspective view of the safety valve, and illustrating an air inlet through with pressurized air enters the safety valve to purge cleaning fluids from the safety valve and related components;

FIG. 14E is a partial perspective view of the upper housing and illustrating a dip flow path through the safety valve;

FIG. 16B is a perspective view of a top plate, in accordance with the present invention;

FIG. 16C is a cross sectional perspective view of the top plate of FIG. 16B;

FIG. 22 is a chart illustrating a typical cycle of a dipping and backflushing portion of the operation of a safety valve in accordance with the present invention;

FIG. 23 is a chart illustrating a backflush operation in accordance with the present invention;

FIG. 24 is a chart illustrating a dosage valve recharging cycle in accordance with the present invention; and FIG. 25 is a chart illustrating a backflushing operation in accordance with the present invention.

DETAILED DESCRIPTION OF THE DRAWINGS

Figure 1A:
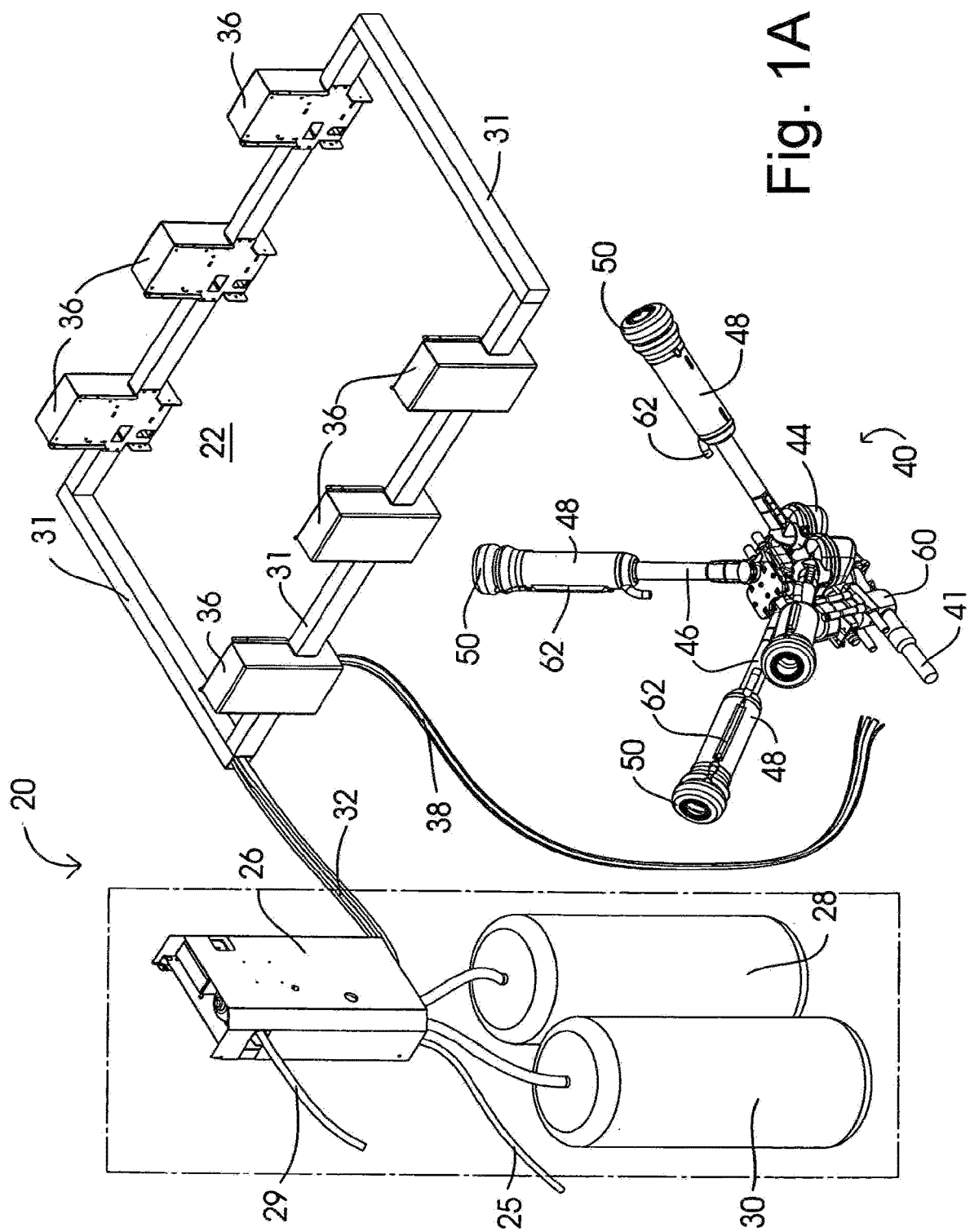
FIG. 1A is a perspective schematic view of a dairy harvesting facility including a milker unit backflushing and teat dip applicator system in accordance with the present invention.

FIGS. 1A, and 2A through 5B generally illustrate an automatic teat dip applicator and milker unit backflushing system 20 disposed in a dairy harvesting facility 22, in accordance with the present invention.

The teat dip applicator and milker unit backflushing system 20 is referred to herein as "the system 20" and preferably includes: a main control 26; a compressed air supply 25; a backflush chemical supply 28; a water supply 29; a teat dip supply 30; a conduit 31 for housing appropriate hoses and piping 32; stall controls 36 for each milking stall; a stall supply hose 38; a milker unit 40 for each stall, and a safety valve 60 for each milker unit 40. The main control 26 and other controls are connected to an appropriate electrical power supply (not illustrated).

The milker unit 40 (FIGS. 1A, 2A, 2B, and 2C) includes: a milker bowl collector 44; four short milk tubes 46; four teat cups 48; four teat cup liners 50 disposed in the teat cups 48; a milker unit safety valve 60 for controlling fluid flow for teat dipping and backflushing operations; and teat dip delivery channels 62 (FIG. 2A) for delivering teat dip to upper portions of an animal's teats. The teat cups 48 with liners 50 are attached to a dairy animal's teats and alternating vacuum (pulsation) through hoses (not illustrated) is applied to milk the animal. Milk flows from the liners 50, through the short milk tubes 46, into the bowl and claw collector 44, and through the long milk tube 41 to the main dairy milk lines.

The system 20 preferably combines teat dipping and backflushing processes, but the system 20 can be within the scope of the present invention by including only a milker unit backflushing feature without a teat dip applicator or vice versa. Having only a backflushing feature is useful for automatically backflushing each milker unit 40 after each milking or at least periodically to ensure optimum hygiene of the milker units 40. In a preferred embodiment, the teat dip applicator is a part of the same unit as the backflusher, but the teat dip applicator components can be added to the backflusher even after the safety valve 60 has been installed on a milker unit 40. The system 20 of the present invention can be used in dairy harvesting facilities of any configuration including rotary milking parlors.

FIG. 1B illustrates another teat dip and backflushing system that includes an applicator 831 that applies dip to a cow or other dairy animal teat. The applicator 831 includes a control panel 832 and a dip manifold 834. A teat cup shell 836, a liner 838, a first backflush valve 840, a short milk tube 842, a milker unit collection bowl 844, milk line 846, and a second backflush valve 848 are also provided to work as part of or in conjunction with the applicator 831.

The control panel 832 remotely controls operation of the teat dip application system 830. It can be automated with suitable manual overrides or it can be operated by manually engaging various control buttons in response to audible and/or visual signals reflecting the stage of a milking and backflush operation.

The control panel 832 controls the flow of air 837, water 839, teat dip 841, and any appropriate three-way valve ventilation that may be necessary. A vent 845 is also provided. The control panel 832 can remotely control valves elsewhere within the system 830 or it can incorporate valves and hose connections for controlling air, water, teat dip, and valve ventilation.

The control panel 832 is in fluid communication with the dip manifold 834 via a manifold hose 850. The dip manifold 834 is illustrated as feeding a single teat dip applicator and milker unit combination, but the manifold 834 preferably serves a number of liners 838 and milker unit combinations. The dip manifold 834 is in fluid communication with each teat dip liner 838 via a dip hose 852.

The dip hose 852 preferably tracks along the short milk tube 842, the first backflush valve 840, and passes into the teat cup shell 836 where it is protected from damage. Alternatively, the dip hose 852 could travel an alternate route to the teat cup shell 836. The dip hose 852 can also be routed on the exterior of the teat cup shell 836, or be part of an integral duct (not illustrated) formed in the teat cup shell 836. The dip hose 852 forms part of a fluid conduit through which teat dips, air, and water pass.

Once a sufficient amount of dip is applied, the dip manifold 834 shuts off the flow of dip. Dip cannot be left inside the liner 838 because it may contaminate milk from the next cow. Backflushing of the liner 838 is therefore desirable. There are at least two options to backflush the liner 838. In one option, the second backflush valve 848 is opened to deliver a backflushing fluid 859 such as water or a suitable chemical into the milk line 846, through the milker unit 844, the short milk tube 842, the first backflush valve 840 (if present), and out of the liner 838. In a second option, the first backflushing valve 840 is used, and only the liner 838 is backflushed while the milk line 846 is isolated by the backflushing valve 840.

Automatic operation of the system 830 relies on an end-of-milking signal from a milk sensor (not illustrated) that activates the control panel 832 to shut off vacuum to the milker unit 844. The first backflush valve 840 is then closed to isolate the liner head nozzle 864 from the milker line 846 to protect the milk line 846 from being exposed to dip and backflushing fluid 859. Preferably, only the second backflush valve 848 is used, and it is activated by the control panel 832 to shut off the milk line 846 from the milker unit collection bowl 844.

The control panel 832 then operates a three-way valve to connect the control panel 832 to the manifold hose 850 and delivers dip into the manifold hose 850, manifold 834, dip hose 852, liner head chamber 862, and liner head opening 864. The amount and pressure of the dip 851 is controlled by the valves and the pressure of the source of dip.

Air is then forced through the manifold hose 850, manifold 852, dip hose 852, and liner head chamber 862 to force dip out of the liner head opening 864. As the milker unit 844 then begins detachment via a standard detacher mechanism (not illustrated), the liner head 860 mouth wipes dip down the teat sides and deposits an excess dip amount on the teat end.

Next, normal backflush cycles are used as described above to sanitize the liner between milkings and rinse out any teat dip residue. The system 830 is now ready to repeat the cycle.

Main Control

Figure 3:
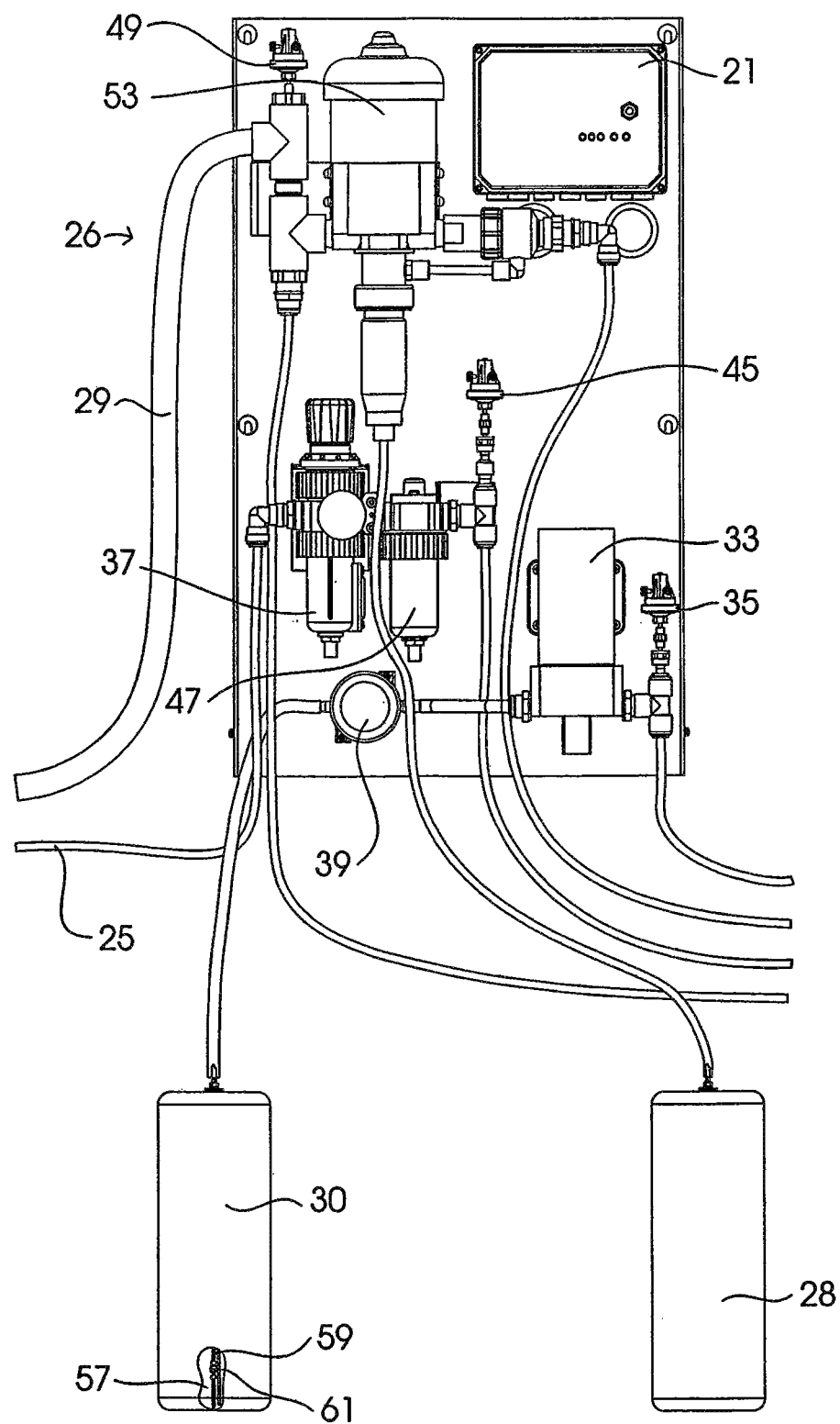
FIG. 3 is a front view of a main controller and supply tanks for a backflushing and teat dip applicator system in accordance with the present invention.

Referring to the system 20 in more detail, as illustrated in FIGS. 1 and 3, the main control 26, the air supply 25, the water supply 29, the dip supply 30, and the backflush chemical container 28 are preferably in a room separate from where the milker units 40 and milking operations are located. This is a preferred arrangement for safety and hygiene considerations, but other system configurations are possible.

FIG. 3 illustrates more details of the main control 26 that delivers air, water, dip (when included as part of the system), and backflush solution in a precise controlled manner to the stall controls 36 located in the dairy parlor 22. The main control 21 is preferably contained within a housing or cabinet for protection against harsh dairy conditions. The main control 26 includes a programmable device 21 that can, for example, store information, control operation sequences, monitor operations, receive data regarding the condition of the system 20, analyze possible problems, generate maintenance prompts, and provide critical control in case of problems. If such problems arise, the main control 26 can be programmed to generate an appropriate signal, such as sound, light or written display.

The main control programmable device 21 is preferably programmed to monitor and control all of the functions of the devices associated with the main control 26, as well as, communicate with, respond to and/or control; stall controls 36, computers, other data input devices, including sensors and manual controls. For example, the main control 26 can monitors a number of system parameters such as: 1) dip application pressure; 2) water pressure; and 3) air pressure of one or more air supplies, and adjust these parameters by modifying operational controls or adjust one or more pressure regulators 68. The programmable device 21 is preferably an I/O 88 PCB circuit board used as an electronic monitoring device, but other types of devices can be used to accommodate particular dairy installations and needs. There can also be mounted on the main control an on/off switch, indicator lights, signal lights, sound alarms, key pads, other input devices, signaling devices and/or any other type of interactive device. Grommets for wire/cable connectors can be part of a housing for the programmable device 21, as well.

The dip application pressure should be kept relatively constant to maintain a consistent dipping process with minimum lag time, air bubbles, or other inconsistencies. Dip from dip supply 30 (not to scale in FIG. 3) is pumped by a dip pump 33 and controlled by a regulator 35. Dip pressure can be monitored at various locations and adjusted to account for pressure drops/increases through the dip application components, including a dip filter 39, mounted on the main control 26. The dip supply 30 can store a premixed dip, a dip concentrate, dry dip ingredient, or other dip ingredient, to be mixed automatically by the main control 26. It can include more than one container and can include a water source for in situ mixing of dip.

Backflush fluids can be drawn from multiple sources including the backflush chemical container 28 which is not shown to scale, but is representative of a single chemical supply either premixed or concentrated, a liquid or solid chemical mixer, multiple chemical supplies or any other source of chemicals that may be desired for use in backflushing milker units. A backflushing flow or dosing meter and/or pump 53 is preferably used to mix a concentrate from chemical container 28 with water and to control flow of backflushing chemicals to the stall control or directly to a safety valve 60. When concentrates are used, mixing with water or other fluids can take place at or be controlled by the main control 26. Various types of mixing controls and vessels can be used, but a Dosatron, Model D25RE2 available from Dosatron International Inc. of Clearwater, Fla. 33765, U.S.A, is preferred. Appropriate filters, sensing devices, and sampling devices for all of the supplies can be used as well.

Air and water pressures should not be allowed to drift outside of predetermined ranges because insufficient air and water pressures can result in ineffective valve operations and inconsistent cleaning and/or teat dip application. If an unacceptable condition occurs, normal operation of the invention can be shut down and/or alarms can be initiated.

Air pressure is generated by one or more compressors (not illustrated) and regulated by a regulator 37, controlled by an air monitoring switch 45, and filtered by an air coalescing filter 47. The air supply 25 is set at an appropriate outlet pressure, preferably between about 50 to 70 psi, to operate related components. Optimum air pressure will depend on a number of factors, including the number of milker units 40 being served and hose length from the air compressor 28 to the milker units 40. More than one air supply line can be used and controlled by the main control 26.

Water inlet pressure can be generated by local sources or a pump used as part of the system 20. Water inlet pressure is monitored by switch 49 and be filtered. The water supply 29 can be any suitable source of water with temperatures, pH, and chemical properties that are compatible with the system 20 and related chemical solutions such as teat dip concentrates, backflushing chemical concentrates, or simply as a final rinse of milker units 40 after a backflushing operation. A conditioning system (not illustrated) can be included if the pH or other properties of the local water source is incompatible with the necessary chemical solutions and/or to minimize corrosion of system components.

In a preferred embodiment, one dip line, one water line and one backflush solution line extend between the main control 26 and the stall control 36 and can be combined as depicted with the hose combination such as the hose combination 38 illustrated in FIGS. 8A and 8B. Two air lines are preferred because one air supply is used for reliable safety valve, valve block, and dosing valve, and the second air supply is used for slugging backflushing fluids through the safety valve and milker unit. A single air line can communicate pressurized air from the main control 26 to a convenient location in the dairy before splitting that line into two separate lines. The split should be at a location that results in each air supply line having pressurized air that is not adversely influenced by pressure fluctuations in the other air supply line. The lines are preferably "pass through" types that allow for arrangement of the stall controls in "series" to reduce the number of hoses leaving the main control 26.

A liquid level assembly 57 is preferably used for the dip and backflush solution supply drums to provide information to the main control 26 regarding status of liquid levels. The assembly 57 preferably includes a draw tube 59 with inlet screen/filter, a standard drum interface connector, and a reed switch 61. The reed switch 61 provides a signal to the main control 26 and to parlor management software, if desired, indicating when the supply drum is nearly empty. An example of such an assembly is illustrated in the drum 30 in FIG. 3.

Supply Conduits

The pipelines and hoses 32 are sized and configured to meet the requirements of individual dairy harvesting facility. They may be routed together through the conduit 31 for protection and efficiency and to accommodate the pass through supplies described above. The conduit 31 can be plastic, such as PVC, metal or other suitable material.

Stall Control

Figure 4A:
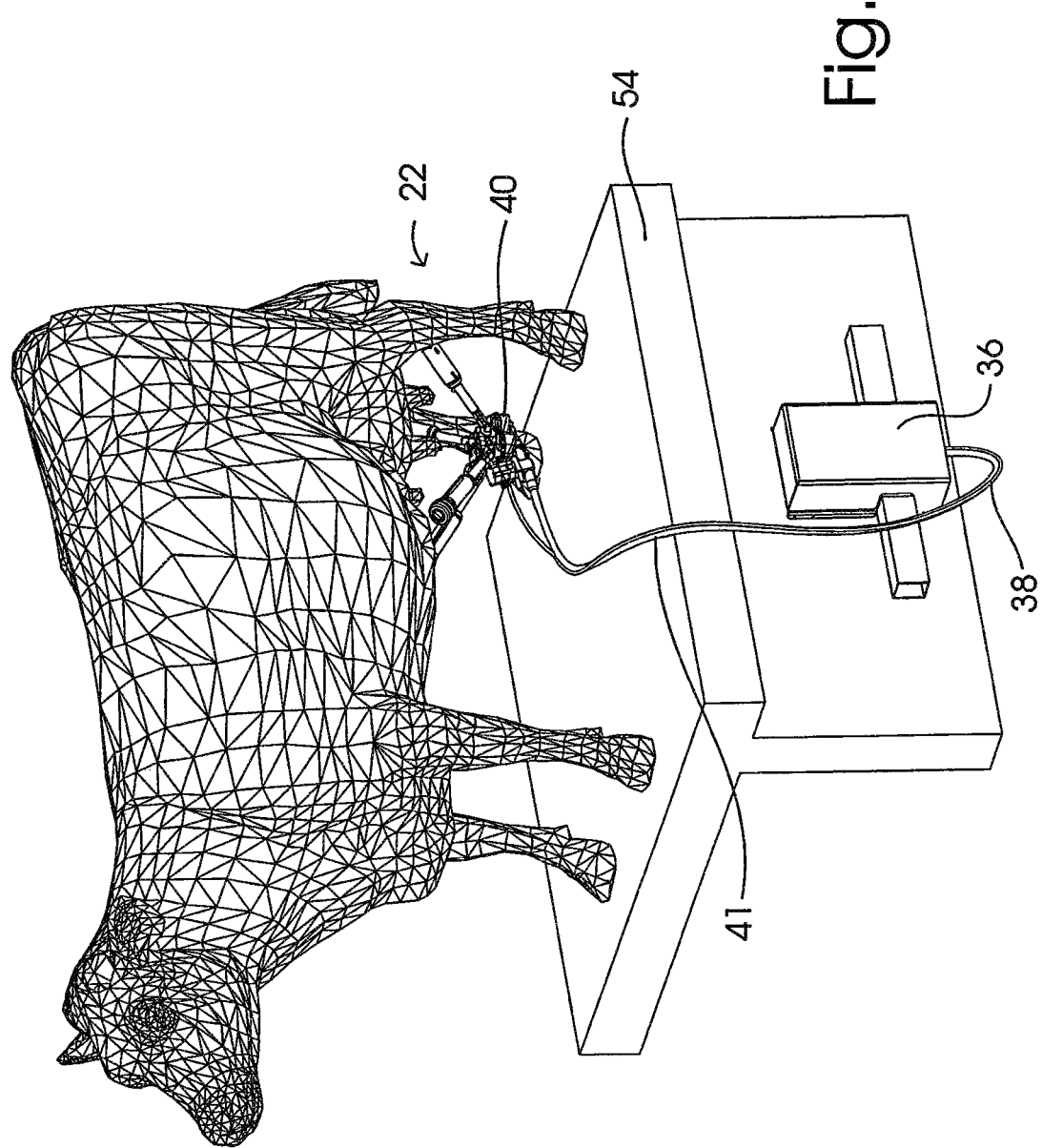
FIG. 4A is a perspective view of a stall control and a milker unit in the milking position, the milker unit having the backflushing and teat dip applicator unit of the present invention.

A stall control 36 is dedicated to each milking stall (See FIGS. 4A, 4B, 5A, and 5B) in the dairy harvesting facility 22. The stall control 36 can be mounted using a base unit 101 in any convenient location near its respective stall, including under a platform in a milking parlor as depicted in FIGS. 4A and 4B. Visual confirmation of the physical safety features within the safety valve 60 and other components is preferred, and appropriate positioning of the components is, therefore, desired. The stall control 36 can also be mounted to a wall, under the curb 54 or on top of the vacuum lines in swing-over parlor applications.

The stall control 36 is responsible for initiating a teat dip application and/or backflushing at the end of milking. Other milking operations can also be controlled at each stall control 36. Electrical power is supplied through a separate conduit (not illustrated). FIG. 4A illustrates a milking position and FIG. 4B illustrates a backflushing position. The stall control 36 is preferably located under the parlor curb 54 (in FIGS. 4A and 4B) where it is out of the way, yet readily visible to an operator.

Preferably, the electronic control 80 includes a protective housing or cabinet and a stall control card 86 such as a programmable circuit board ("PCB") for storing control parameters, monitoring, and signaling is provided. A suitable control card 86 is an I/O 88 PCB circuit board. Other types of programmable controls can also be used. The stall control 36 preferably includes an interface for a computer 55 or other programming device, sensors or monitoring devices. The computer 55 can also be used to program and monitor data from the main control 26. The electronic control 80 can also include grommets for connecting wires and cables, and it can include signaling lights, key pads, or other interactive components.

Figure 5A:
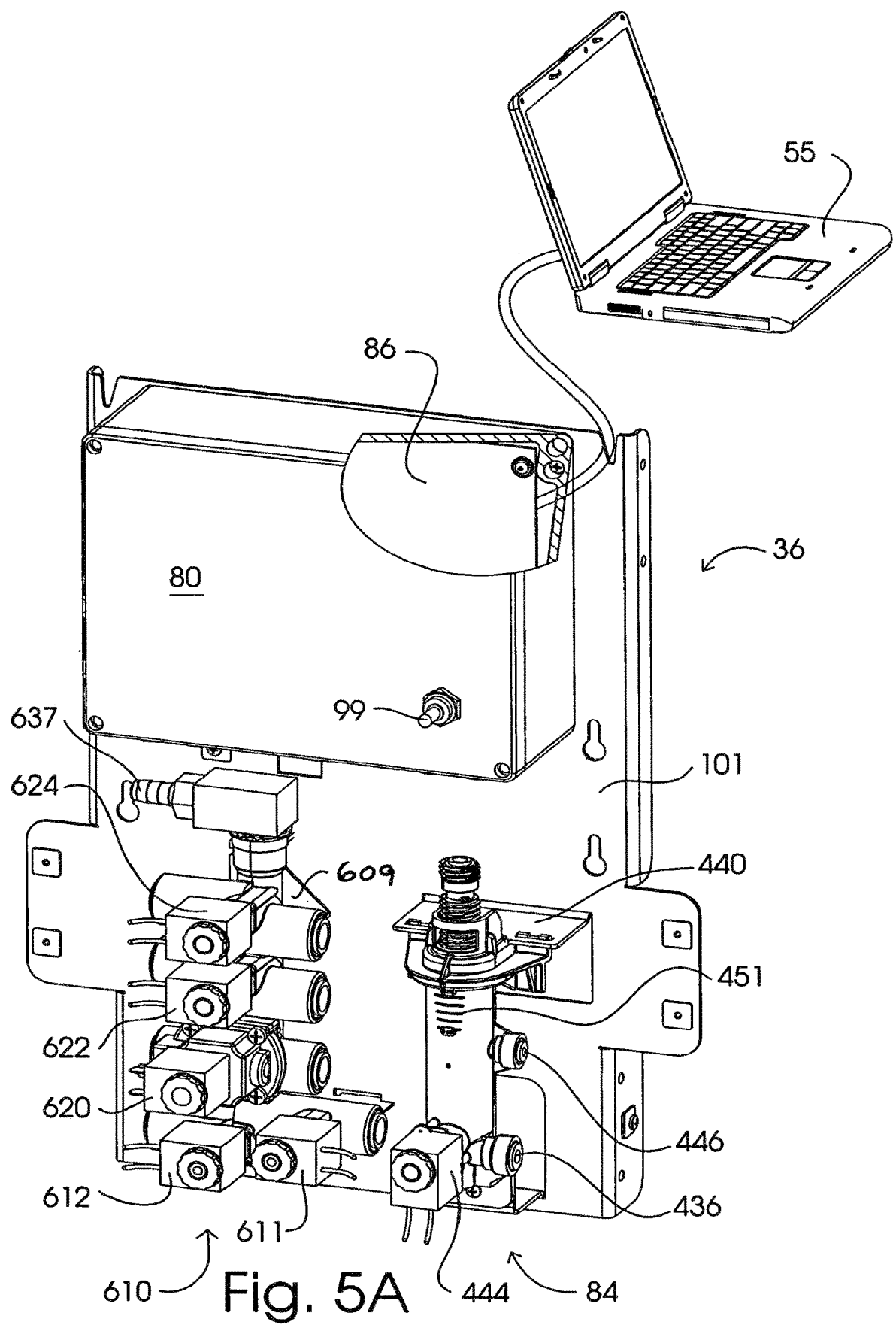
FIG. 5A is perspective view of a stall controller that can be used to control backflushing and teat dipping at an associated milking stall in accordance with the present invention.
Figure 5B:
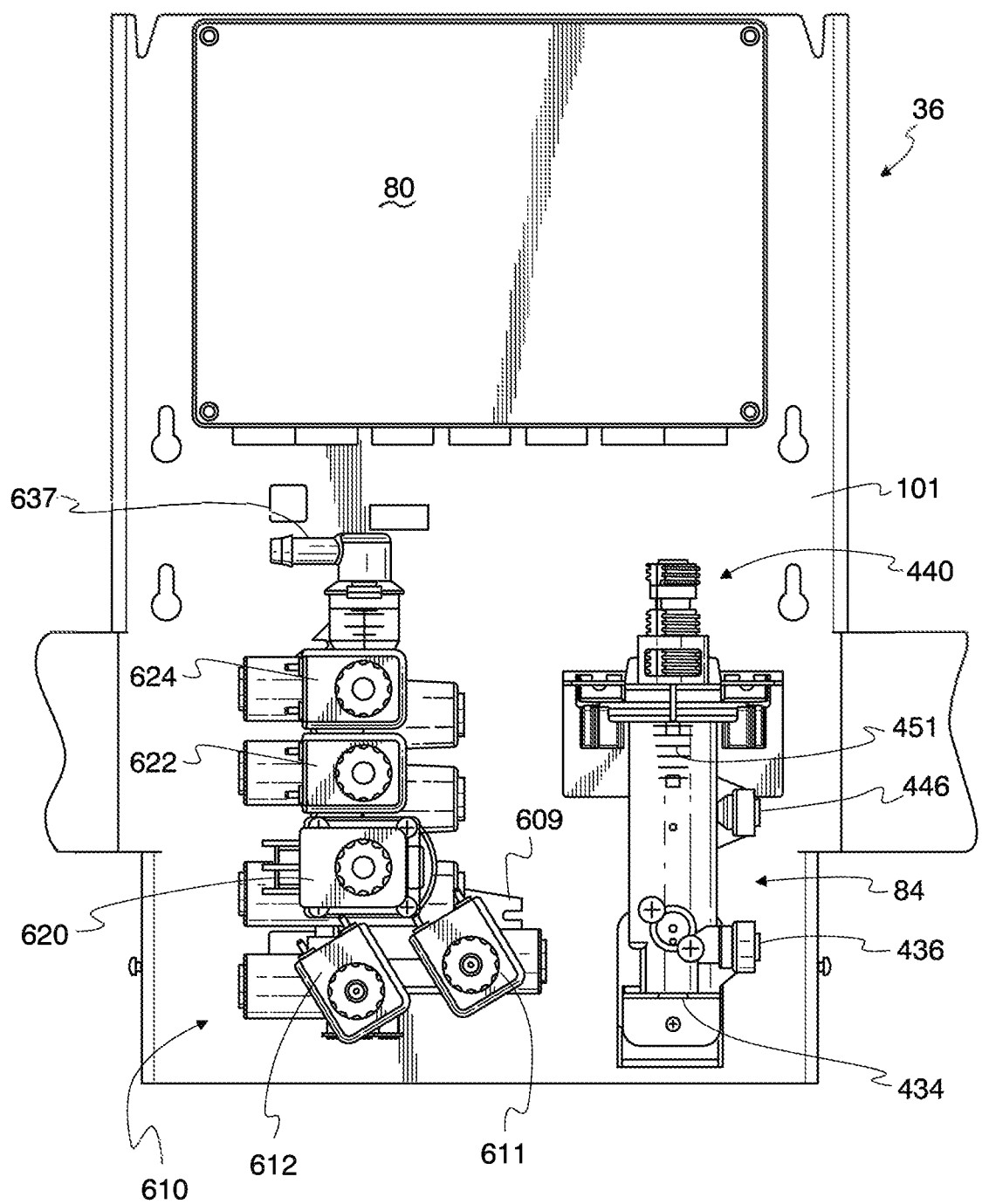
FIG. 5B is front view of the stall controller of FIG. 5A.

Referring to FIGS. 5A and 5B, the stall control 36 activates the backflushing and/or dipping operations after sensing that milk flow from the animal has ended or after a detacher is activated to remove the milker unit 40 from an animal. The operations begin with the safety valve 60 being activated to close downstream milk lines, such as the long milk tube 41 and protect the milk supply. A dose of teat dip will be pushed preferably with an air operated piston for speed, reliability and reduced foaming from a dosing valve 84 through a manifold 540, delivery channels 62 and a dome of a milker unit liner 50, and applied to an animal's teats.

The stall control 36 illustrated in FIGS. 5A and 5B preferably includes three primary components: an electronic control 86, a valve block 610, and a dosing valve 84 (when a dip applicator is included). Each stall has a control 86 and all are preferably programmed identically to provide a sequence of safety valve operation that is necessary to perform dipping and backflush or backflush only functions. The electronic control 80 can include a circuit board such as a standard eight input eight output circuit board at each stall to interface with a milking control (not illustrated) so the dipping and backflush processes are performed at a proper time and in a proper sequence. There are several variables that allow the sequence of operation to be varied within predetermined safe ranges, including: dip viscosity and composition, backflush chemical viscosity and composition, the amount of available time to perform each task, and ambient conditions.

Further, some variables can be adjusted to customize the sequence based on particular equipment or operation needs, however all stalls are preferably set similarly within any particular operation to ensure uniform treatment of all milker units 40 and all dairy animals. Variables such as hose size, hose length, distance of stalls from the main control 26, dip types, individual animal needs, condition of the equipment, ambient conditions, and many other variables can be considered and programmed into the electronic control 80 to provide consistent operation and optimum dairy animal health. Further, monitoring devices can be used at various points in the system 20 to signal the stall control cards 86 to adjust appropriate parameters. "Fuzzy logic" controllers can be used to continually adjust parameters as conditions change in a dairy and/or with the dairy animals.

The valve block 610, programmable device 86, and the adjustable dosing valve 84 ensure that equal and consistent amounts of backflush fluids and dip are used in each operational cycle. The manifold 540 is attached to a milker unit 40 and is desirable to ensure that each dose of dip is divided equally for each animal teat.

The stall control 36 controls delivery of air, water, and chemicals to the milker unit 40 through a hose or hoses 38. These hoses 38 are of any suitable size and length and are preferably made of a material that is suitable for use in a harsh dairy environment, yet flexible enough to not influence the milker unit 40 while on a dairy animal. Using combined hoses 38 minimizes the number of hose assemblies necessary to operate the system and facilitates a flexible bundling of hoses. A notch can be made in a hose bundle web for joining of all hoses using a standard plastic tie or other suitable means in an organized yet flexible way. Further, the hoses 38 are preferably arranged next to a long milk tube 41 through which milk flows from the milker unit 40 to the dairy harvesting facilities main milk lines. This arrangement reduces the chances of the hose 38 from being damaged by a dairy animal and it makes attachment of the milker unit 40 easier because the hoses 38 will not interfere a with an operator's movements.

The stall control 36 can be equipped with a manual ON/OFF-Reset switch 99 which can shut down the dipping and/or backflush processes for a given stall in case of problem. Power for the stall control 36 can be wired directly from a source or be relayed from the main control 26.

Valve Block

Figure 6A:
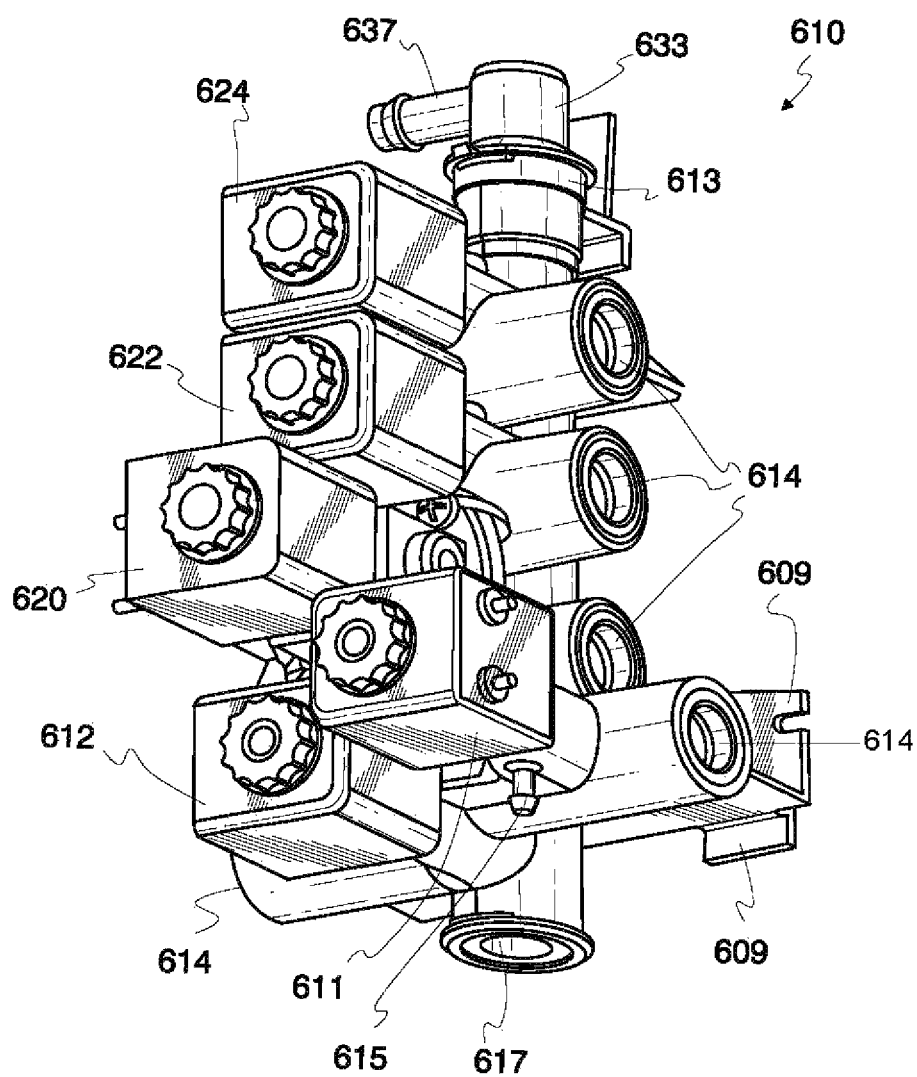
FIG. 6A is a perspective view of a valve block in accordance with the present invention.
Figure 6B:
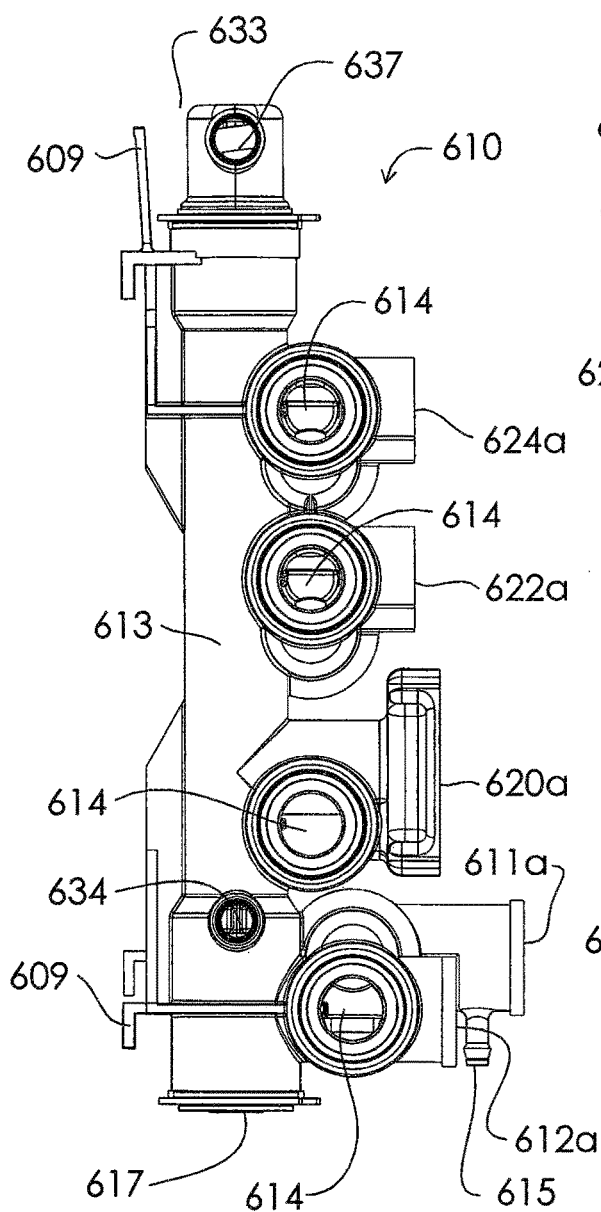
FIG. 6B is a left side view of the valve block of FIG. 6A with solenoid valves removed.
Figure 6C:
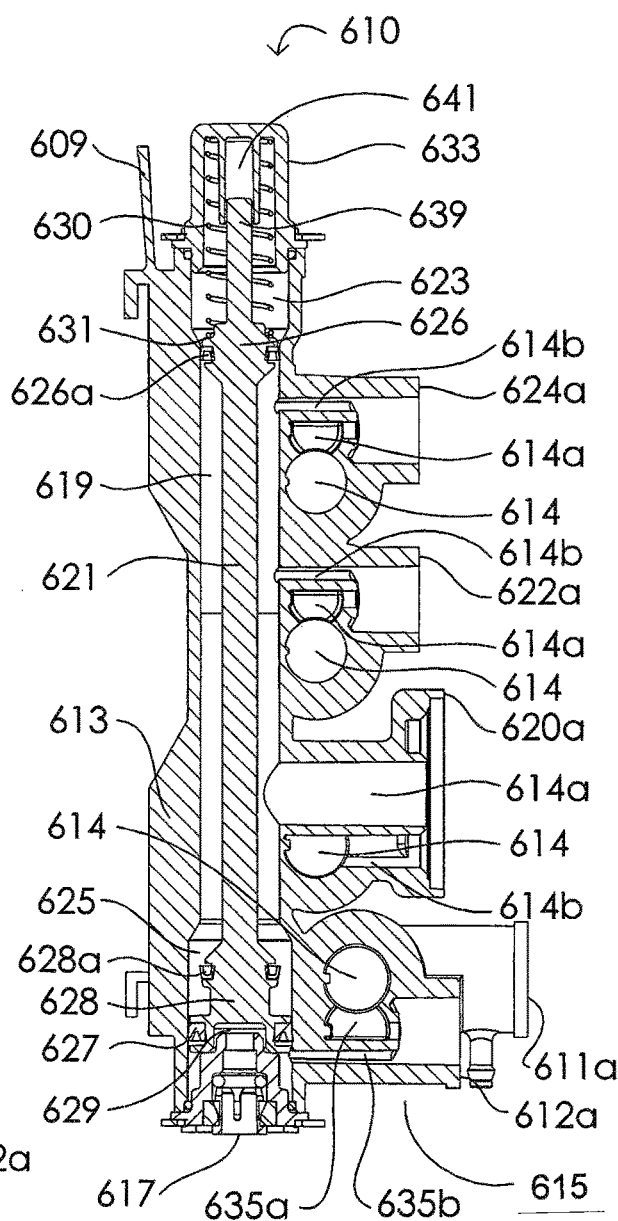
FIG. 6C is a side sectional left side view of the valve block of FIG. 6A with solenoid valves removed.
Figure 6D:
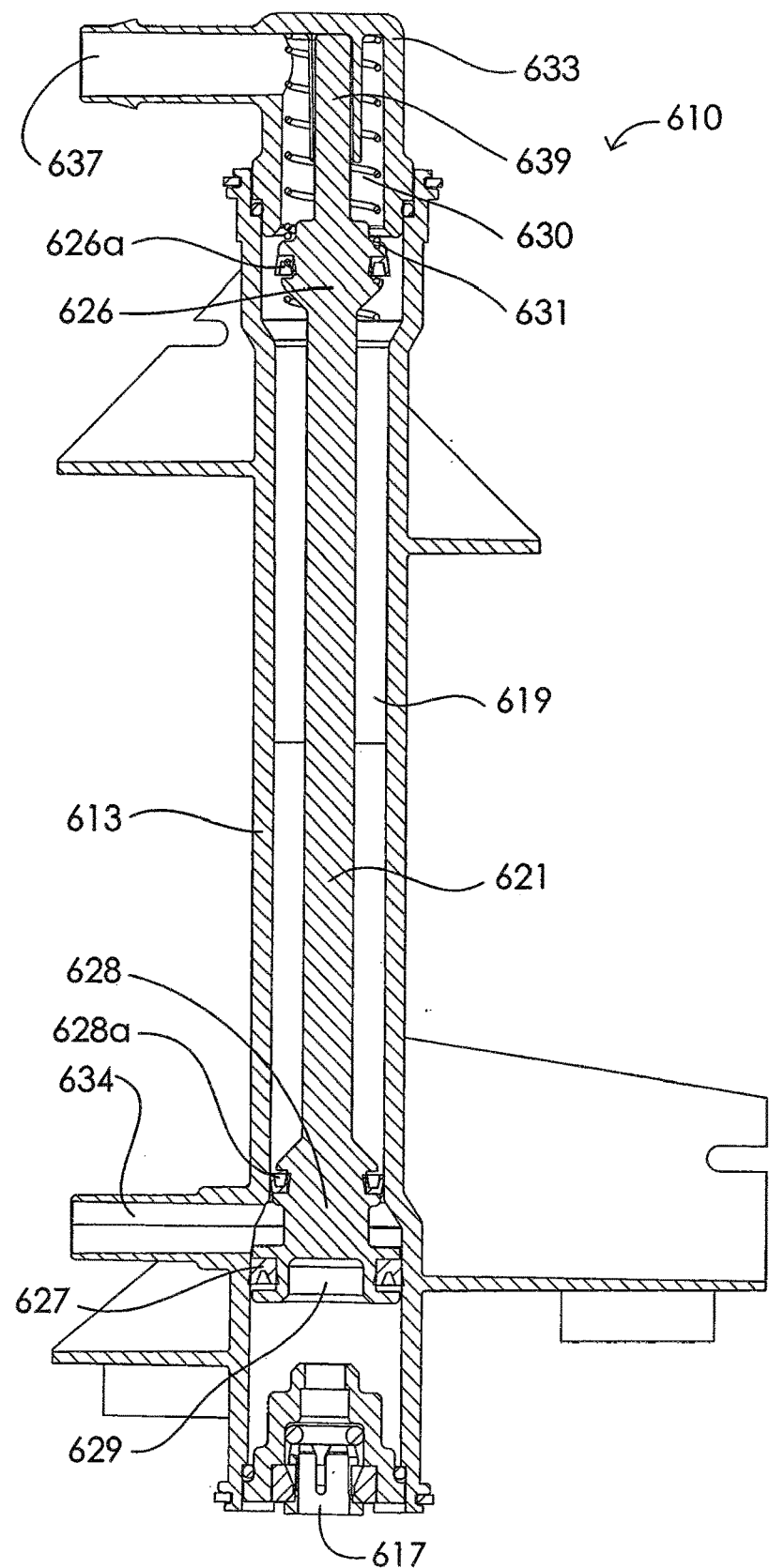
FIG. 6D is a side cross sectional front view of the valve block of FIG. 6A with solenoid valves removed.
Figure 14A:
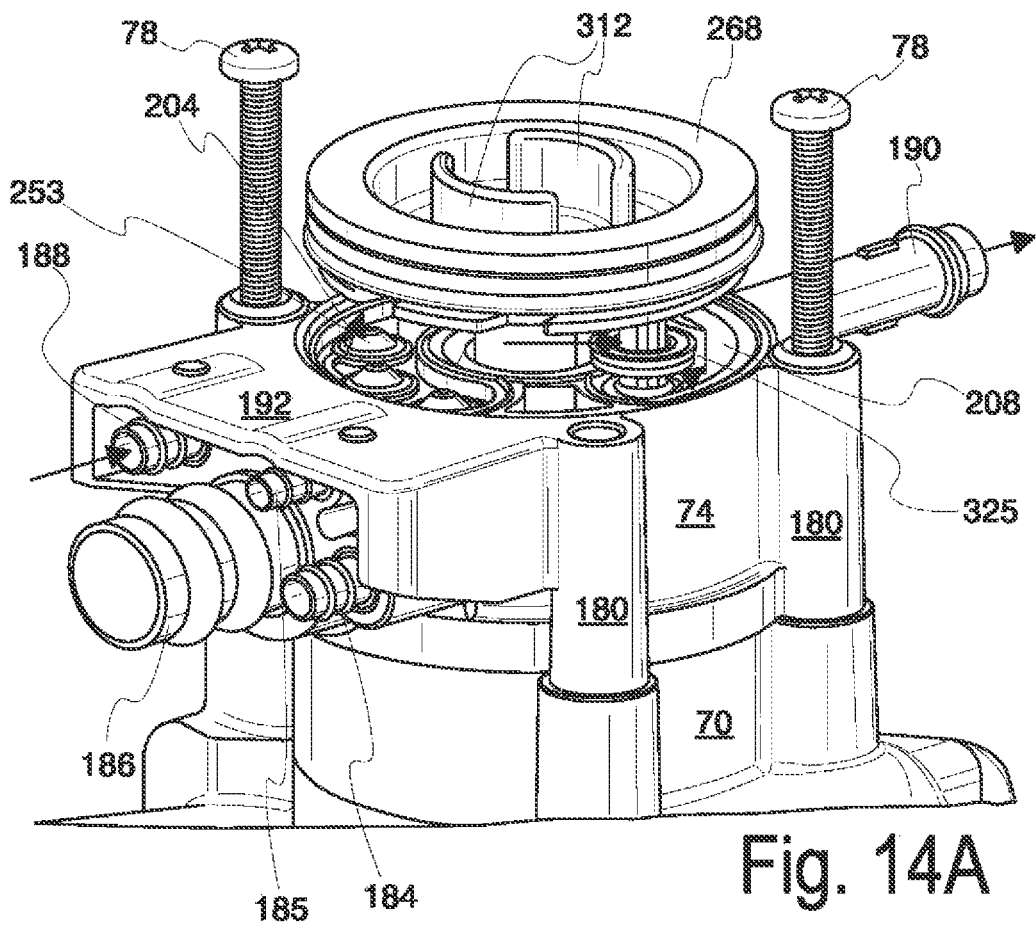
FIG. 14A is a partial perspective view of an upper housing and related components in accordance with the present invention.

FIGS. 6A through 6D illustrate a valve block 610 in which a number of valves are provided for supplying multiple medias (air, water, and backflush fluids) through a common outlet 637 to a backflush inlet 186 on the safety valve 60 (FIG. 14A). The valve block 610 includes a housing 613 that defines an axial chamber 619 in which a spool 621 is disposed to slide between a milking position (FIG. 6C) and a backflushing position (FIG. 6D). The axial chamber 619 includes an upper bell portion 623 and a lower bell portion 625.

The housing 613 is preferably oriented vertically, as depicted, to provide drainage of fluids through a drain 634 (FIG. 6B), but other orientations can be used. Preferably, the valve block 610 housing 613 is made of Radel R5000 from Piedmont Plastics, Inc. of Charlotte, N.C. and available from distributors throughout the United States, or other translucent plastic or glass material to provide superior chemical resistance and clarity for operation and maintenance inspections. The valve block 610 housing 613 is preferably arranged and molded as an integral piece as depicted. Other materials can be used for the valve block 610 and related components, and the valve block 610 can be formed from one or more parts. Flanges 609 or other connectors can be joined to or molded integrally with the valve housing 613 to permit convenient mounting with snap-in features, screws, or other suitable fasteners.

The valve block housing 613 includes several passthrough inlets 614 though which air, water or backflushing fluids flow. Pass though inlets 614 are used so that a number of valve blocks can be arranged in series and supplied with air, water, or backflushing fluids from a common source. Other arrangements can be used, but arranging valve blocks in series requires fewer hoses for air, water, and backflushing fluids and less demand on pumps and other supply components. Flow through the pass through inlets 614 can be in either direction to accommodate a variety of dairy layouts.

Most of the pass-through inlets 614 communicate with a corresponding and dedicated block inlet 614a that is controlled by its respective valve to permit entry of a predetermined fluid into a chamber 619 through conduits 614b. One exception is the pass through inlet 614 for the second air valve 612, which communicates with the lower bell portion 625 of the axial chamber 619 at a position under the spool 621 via passages 635a and 635b so that pressurized air can force the spool 621 into the backflushing position (FIG. 6D), when desired.

Preferably, the valve block 610 includes five valves, as depicted in FIG. 6A including: a first air valve 611 that provides air directly to operate the milker unit milk safety valve 60 for dipping and backflushing; a second air valve 612 that moves a valve block safety spool 621 into place and provides air pressure to push dip in the teat dip delivery tubes 62 between the safety valve 60 and the liner 50 onto a teat; a third air valve 620 provides air for slugging backflush fluids and for complete surface rinsing and vigorous scrubbing of interior safety valve 60 surfaces; a water valve 622 that provides water to be used to rinse the milker unit 40 after backflushing and the safety valve 60 in a self-rinse cycle; and a backflush solution valve 624 that provides one or more chemical solutions for backflushing the milker unit 40.

All valves are preferably solenoid valves, including the third air valve 620, which is preferably a pilot operated valve that ensures air flow for backflush slugging. Also preferably, the backflush valve 624 is made of stainless steel or other material that resists corrosion from the backflushing fluids. For ease of reference, each valve is joined to the valve block 610 at a seat and each seat is designated in FIGS. 6B and 6C with a numeral matching its respective valve and including the suffix "a", so that valve 620 is mounted on seat 620a, for example.

The first air valve 611 is reserved for only operating the safety valve 60 only to help ensure complete, independent, and safe operation of the safety valve 60. The first air valve 611 operates independently from the other backflush valves on the valve block 610 because the safety valve 60 must operate during dipping operations, and before and during backflushing operations. The independent operation also avoids pressure fluctuations that could result in from sharing air supply pressure with other system components. The air from air valve 611 exits the valve block 610 through a separate outlet 615 for this reason. The first air valve 611 could be separate from the valve block 610 and mounted elsewhere in the system because it does not use the common outlet 637. Nonetheless, the valve block 610 provides a convenient mounting location and helps keep all of the hoses for the pass-through inlets 614 organized.

The second air valve 612 supplies air to the dosing valve 84 (described below) through an outlet 617. The air inlet 614a preferably receives air from the same air source that supplies valve 611 and the safety valve 60. Air from this air supply can be supplied through suitable hoses, conduits, or the like. A single air supply for the safety valve 60, the valve block 610, and the dosing valve 84 is adequate because of the low air pressure demands of these devices.

The spool 621 (FIGS. 6C and 6D) includes an upper valve head 626 and a lower valve head 628. The upper valve head 626 and the lower valve head 628 each define an annular groove in which seals 626a and 628a are disposed, respectively. The seals 626a and 628a are preferably u-cup seals oriented as depicted to provide a sealing function in one direction each. U-cup seals provide satisfactory sealing properties and reduce friction between the seals and the central housing 613 so that the spool 621 moves relatively easily with a relatively low air pressure. The seals 626a and 628a oppose each other to seal the axial chamber 619 at their respective ends. This seal orientation can permit fluid to pass into the axial chamber 619. The spool 621 can be made of any suitable material such as stainless steel, stable plastic, or other material. The seals 626a and 628a can be made of Viton (FKM) or any rubber, silicone or other suitable material or the seals can be formed integrally with the spool 621.

A valve block spring 630 biases the spool 621 toward the milking position (FIG. 6C). The valve block spring 630 engages a seat 631 on the upper valve head 626 and is contained within cap 633. An alignment rod 639 extending from the upper valve head 626 of the spool 621 fits in socket 641 (FIG. 6C) formed in a cap 633 to maintain proper alignment of the spool 621 when moving between the milking position (FIG. 6C) and the backflushing position (FIG. 6D).

In the milking position (FIG. 6C), the spool 621 is forced by the valve block spring 630 to engage the upper valve head seal 626a with the walls of the axial chamber 619 to seal the common outlet 637 from the chamber 619 with an end seal 626a. The lower valve head 628 is forced down into the lower bell portion 625 and does not engage the walls of the axial chamber 619, but the lower valve head 628 includes a recess 629 that fits around and seals the air outlet 617 while permitting drainage of residual fluids through drain 634. In the milking position, there is a space between the spool 621 and the walls of the axial chamber 619 that extends between most of the length of the axial chamber 619. The drain (or vent) 634 is in communication with the axial chamber 619 to "bleed" any differential pressure between the valves and the milk line thereby minimizing migration of dips and backflush fluids into the milk lines. The drain 634 is preferably located near the bottom of the axial chamber 619 to provide a drain for any fluids in the axial chamber 619 when the spool 621 is in the milking position.

The valve block 610 is preferably controlled by the stall control 36 to move to the backflushing position after the dipping operation. In the backflushing position (FIG. 6D), the spool 621 is forced (upward as illustrated) against the bias of the valve block spring 630 by pressurized air entering the inlet 635 to move the lower valve head 628 seals 627 and 628a into sealing engagement with the walls of the axial chamber 619 to seal the vent 634 and open the air outlet 617 to the dosing valve 84. In the backflush position, the upper seal head 628 does not seal anything because it is disposed in the upper bell portion 623, and opens the axial chamber 619 to the common outlet 637.

The inlets for the air valve 620, the water valve 622, and the backflushing fluid valve 624 all communicate with the axial chamber 619 through inlets 614a, so that all of these fluids can flow through the axial chamber 619 and out of common outlet 637 when their respective valves are opened and the spool 621 is in the backflushing position. The fluids do not typically flow together, instead the various valves fire in a predetermined sequence to supply air, water or backflushing fluid at the specific time needed by the safety valve 60, as described below. All hose connections to the valve block 610 and other components of the system 20 can be made with any suitable connection, including a John Guest fitting, as depicted in outlet 617.

Dosing Valve

When the system 20 includes a teat dipping option, it is preferred that one or more dosing valves 84 be used at each stall. FIGS. 7A to 7E illustrate an example of a dosing valve 84 for use in the present invention is preferably pre-wired to and mounted on the stall control 36. The dosing valve 84 is filled with dip after each completed dipping operation in preparation for the next dipping operation. Each dosing valve setting should be adjusted to provide substantially the same amount of dip at each stall for consistent treatment of animals. The amount of dip desired will depend on the type of dip used and operator preference with regard to the amount of dip that will be visible on the teat after dipping.

Further, more than one dosing valve 84 can be used to apply different dips, dip concentrations, medicaments, and the like to individual teats. When this latter option is desired, the various controls, especially the stall control 36, can receive cow identification information from automated cow identification systems, and provide specialized teat dip applications to individual animals.

The dosing valve 84 includes a housing 432, a dip inlet 434, a dip feed 436, a dip outlet 438, a chamber adjustment mechanism 440, a solenoid valve 444, and an air chase outlet 446. The dosing valve 84 operates electronically and pneumatically. The housing 432 is preferably made of a translucent plastic material such as Radel R5000 or any FDA approved material, so that visual confirmation of the adjustment mechanism 440 position, the presence or absence of teat dip, and maintenance are all simplified.

The housing 432 defines a chamber 450 (FIGS. 7B, 7C, and 7D) in which teat dip is measured and stored prior to being pumped to the safety valve 60. Generally, the volume of the chamber 450 can be changed by adjusting the chamber adjustment mechanism 440 in or out of the chamber 450. The volume of the chamber 450 is preferably set by comparing the adjustment screw 440 position to embossments 451 (FIG. 7A) on the side of the housing 432, in amounts from about six to about fourteen milliliters, for example. Other types of measuring markings or devices can be used.

The dip inlet 434 is connected via a hose (not illustrated) to a pressurized source of dip at the main control panel 26. The dip outlet 438 is connected to the safety valve 60 via a hose or other suitable device. The housing 432 also defines a vent hole 439, to vent air as dip enters the chamber 450 and to prevent air from getting into dip in case an internal seal leaks, which would reduce the volume of dip delivered to teats.

The dip feed 436 is connected via a hose to an adjacent stall's dosing valve 84, so that the dosing valves 84 are arranged in series to receive pressurized dip from the main control 26. Such an arrangement reduces the number and lengths of dip hoses from the main control 26, and between stall controls 36.

The chamber adjustment mechanism 440 preferably includes a screw housing 458, a threaded shaft 460, a shaft head portion 462 FIG. 7B), a head seal 464, and a hollow conduit 466 that extends through the length of the threaded shaft 460.

The screw housing 458 has a u-shaped portion 467 (FIG. 7E) with a recess 469 that mates with an upper rim 468 of the dosing valve housing 432 to connect the two housings together. The screw housing 458 further includes flanges 472 with notches or holes 474 through which screws can be inserted to mount the dosing valve 84 to a wall or plate near the stall control 36.

The housing 432 rim 468 is inserted laterally into a back side of the screw housing 458 so that the dosing valve 84 is unable to become disconnected when the screw housing 458 is mounted to a support surface with screws. Additionally, the threaded shaft 460 itself acts to prevent disconnection because the two housings are unable to move laterally relative to one another when the threaded shaft 460 extends into the chamber 450.

A lower end of the threaded shaft 460 is formed with or joined to the head portion 462. The head portion 462 is preferably sized to mate with the chamber 450. A seal 464 is used to substantially seal an annular surface of the head portion 462 with the housing chamber 450. The seal is preferably a u-cup seal.

The threaded shaft 460 includes exterior threads that mate with interior threads in the screw housing 458. The exterior threads 480 are preferably discontinuous 480 to reduce tooling cost. The threaded shaft 460 also includes an upper knurled portion 482 to facilitate manual adjustment even when the operator is wearing gloves or the surfaces are wet. The knurl 482 also connects to an air line used to operate the dosage valve 84 to push a spool-shaped piston 500 down and the dip out of the dosing valve 84.

Figures 7C, 7D:
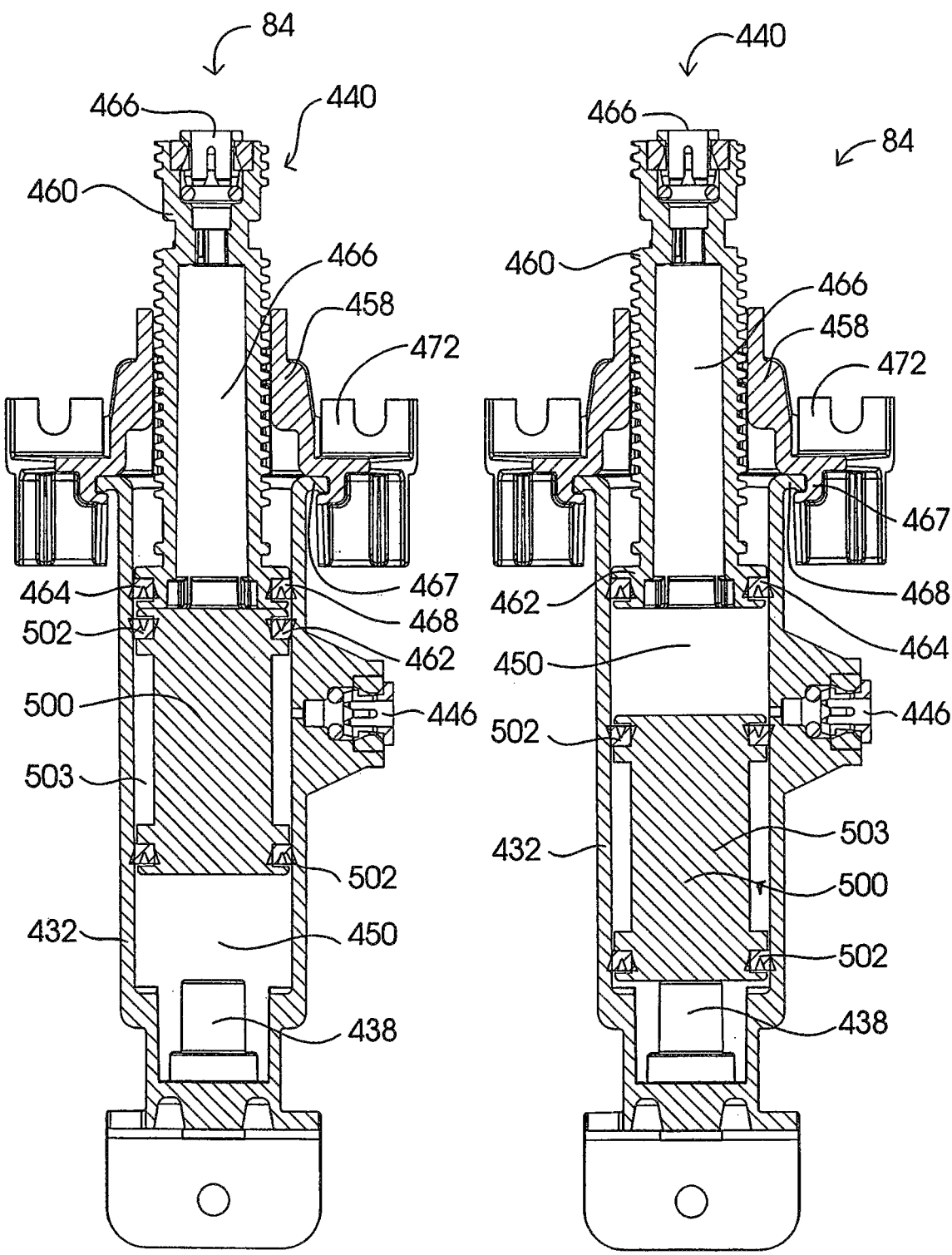
FIG. 7C is a front cross sectional right view of a dosage valve in accordance with the present invention in a dip ready position.
FIG. 7D is a front cross sectional right view of a dosage valve in accordance with the present invention in a dipping position.
Figure 7E:
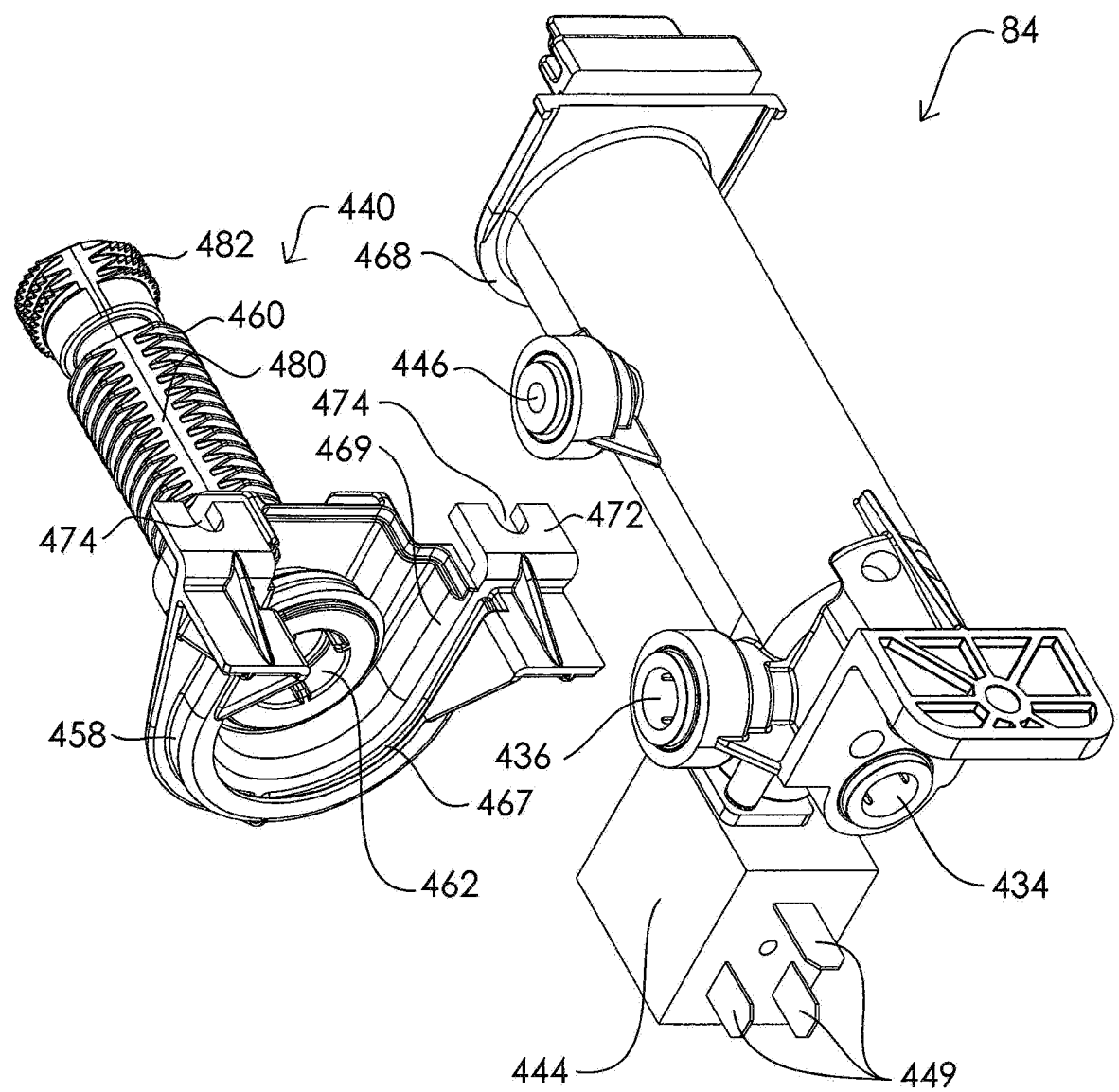
FIG. 7E is a disassembled perspective of a dosage valve in accordance with the present invention.

As illustrated in FIGS. 7C and 7D, the spool-shaped piston 500 is disposed inside the housing chamber 450. The spool-shaped piston 500 includes upper and lower seals 502 that slidably seal a central portion 503 of the spool-shaped piston 500 with the inside of the chamber 450. Pressurized dip is allowed into the chamber 450 through the dip inlet 434 by the valve 444. The pressurized dip forces the spool-shaped piston 500 to slide toward the threaded shaft 460 where it is stopped to define a predetermined volume defined in the chamber 450 between the spool piston 500 and the dip outlet 438. This is a "dip ready" position.

To apply dip, pressurized air is fed from the second air valve 612 in the valve block 610 (FIG. 6A) to enter the hollow conduit 466 and push the spool-shaped piston 500 toward the dip outlet 438 to force dip out of the outlet 438 toward the safety valve 60. The dip outlet 438 preferably extends into the chamber 450, as illustrated, to act as stop for the spool-shaped piston 500. An air hose between the second air valve 612 in the valve block 610 is not illustrated in FIGS. 6A-7E, but see FIGS. 8A and 8B for a representative hose example.

When the spool 500 reaches the bottom of the chamber 450, the dosing valve is in a "the dip empty" position. With the spool piston 500 in this position, the air chase outlet 446 is no longer blocked, and pressurized air that moved the spool 500 now exits the chamber 450 through the chase outlet 446 and moves through a hose, and enters the safety valve 60 to provide an air chase for the dip moving from the safety valve 60 to the milker unit. Thus, the same source of pressurized air used to feed a pressurized volume of dip also, in precise sequence, provides a desired air chase for that dip without using controllers, extra valves or other devices.

After an appropriate air chase interval, the solenoid valve 444 operates to allow dip to flow through the dip feed inlet 436 to fill the chamber 450 and push the spool-shaped piston 500 to a "dip ready" position (FIG. 7C). The solenoid valve 444 includes electrical contacts 449. After filling the chamber 450 with dip, the solenoid valve 444 closes to prevent pressurized dip from the main control 26 from damaging seals inside the dosing valve 84.

In the overall system of the present invention, other forms of dosing valve mechanisms can be used, and dosing valves are not absolutely necessary. Nonetheless, the above-described dosing valve 84 is particularly effective, simple, and reliable for providing a consistent amount of dip and chase air in a timely fashion.

Hose to Safety Valve

As stated above, automatic teat dip applicator installations preferably include one set (or bundle) of four hoses 38 (FIGS. 8A and 8B) to connect the stall control 36 to the safety valve 60. A backflush hose 141 provides air pressure to move the milk safety valve 60 into position during dipping and backflushing operations. The second hose 145 provides the large capacity connection for backflush solution.

A teat dip hose 140 provides dip to the milker unit 40 and a second small tube 143 for providing a fluid "dip chase" that is preferably air. As stated above, the dip chase 143 reduces the amount of dip required and more completely utilizes the dip required for each milking because once the dosing valve 84 has pushed the dip to the safety valve 60 and on to the liner 50, any dip that remains in the hose between the safety valve 60 and the liner 50 would otherwise be flushed and wasted in the backflush process. The teat dip hose 140 is preferably emptied before milking to prevent any residual dip from getting into the milk.

Milker Unit

Figure 2A:
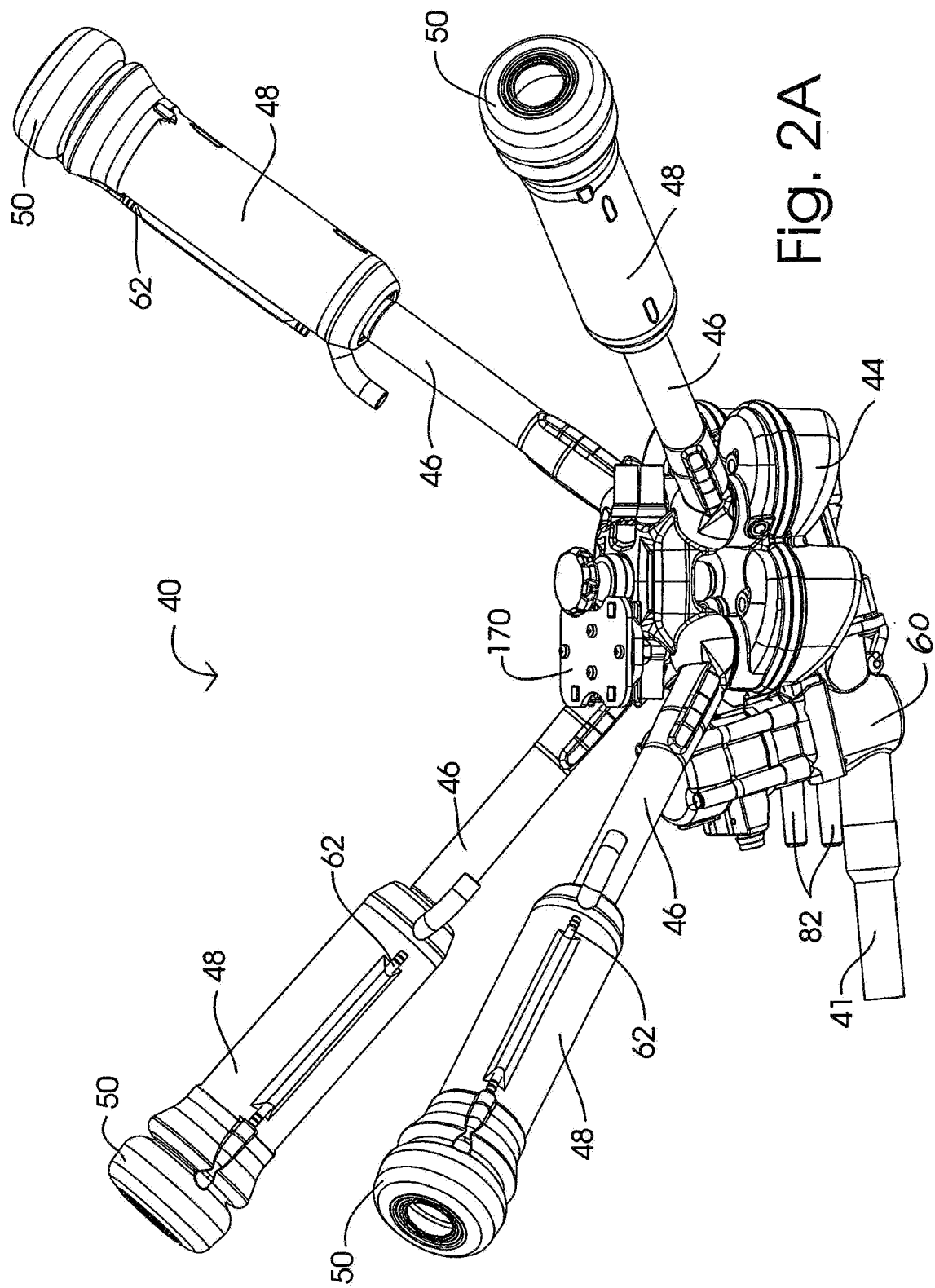
FIG. 2A is a perspective view of a milker unit and safety valve in accordance with the present invention.
Figure 2B:
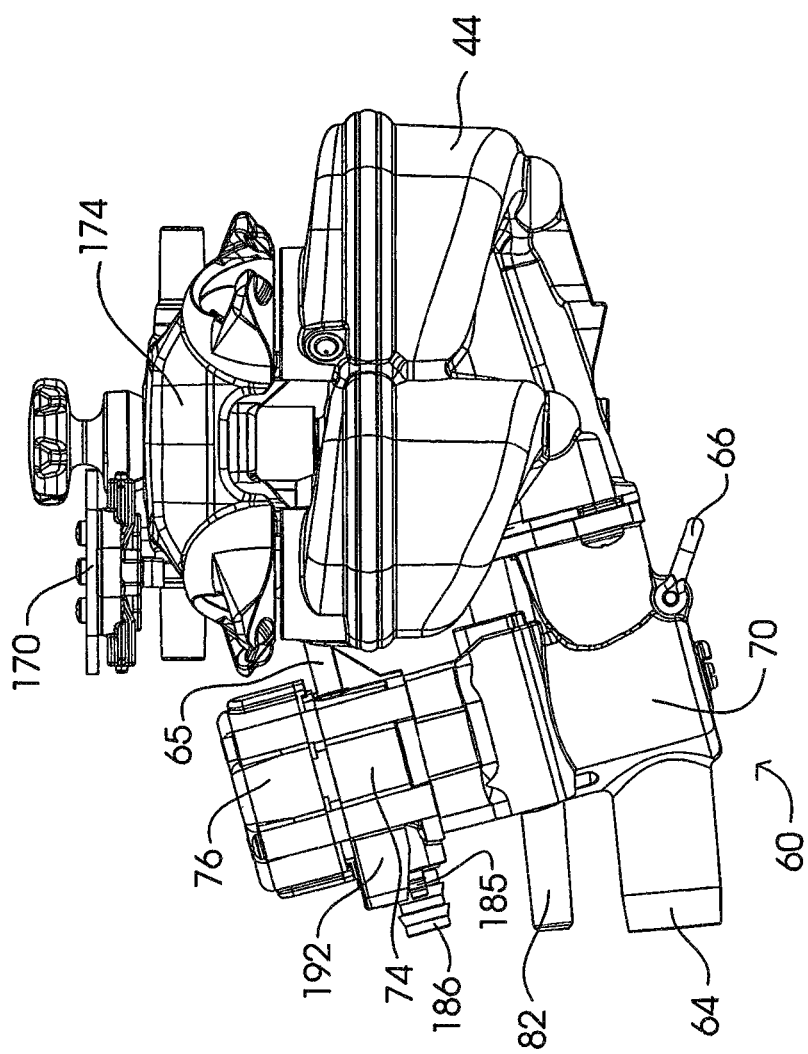
FIG. 2B is a side view of the milker unit and safety valve of FIG. 2A.
Figure 2C:
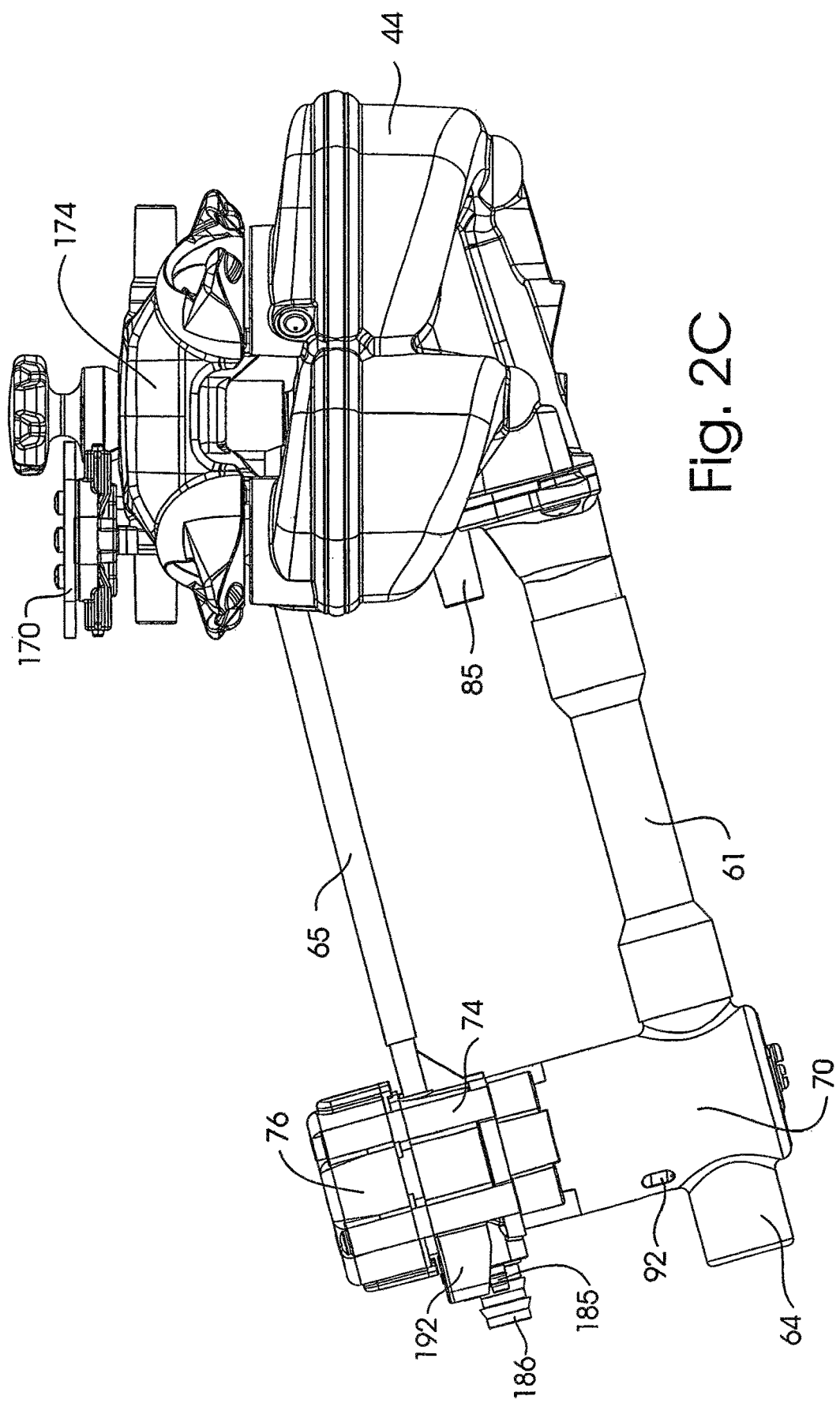
FIG. 2C is a side view of an alternate embodiment of a milker unit and safety valve arrangement in accordance with the present invention.

As depicted in FIGS. 2, 2B, and 2C, the milker unit 40 can be used with the collection bowl 44 as depicted in WO 2009/077607 A1, WO 2008/138862 A2, US 2009/0050062 A1, US 2008/0276871 A1, as well as, other bowl and claw arrangements. The system 20 and/or any of the individual components of the system can be retrofitted to existing milker units 40 by connecting the safety valve 60 downstream from the milker unit 40, and preferably near the milker unit 40 because any milk upstream from the safety valve 60 will be flushed out in the backflushing operation.

In FIGS. 1 and 4A, the milker unit 40 is depicted in a milking position with the bowl 44 on the lower portion and the teat cups 48 and liners 50 directed upwardly. This is the position of the milker unit 40 during automatic teat dip application. The backflushing operation will take place when the milker unit 40 is disconnected from a dairy animal (FIG. 4B) and the teat cups 48 and liners 50 are opened sideways or downward for draining backflushing fluids. It is preferred that the entire milker unit 40 be upside down during backflushing for complete drainage. Alternatively, a vacuum purge method may be employed whereby the remaining backflush solution in the milk bowl 44 is drawn back through the backflush supply circuit to the stall control 36 with vacuum and then retained for future use or purged from the system 20.

Safety Valve

Safety Valve Overview

The safety valve 60 of the present invention is situated on or near a milker unit to seal and protect downstream dairy milk lines from teat dip and cleaning fluids that are fed through the safety valve to upstream milker unit components. All of the fluids, including dip, cleansers, water, and air pass through the safety valve 60.

The safety valve 60 has a housing with various inlets, outlets, and vents through which the fluids flow. These fluid flows are controlled by several moving parts including two pistons and a connector between the two pistons, all of which are moved by springs and an air-actuated operation plate. A set of three umbrella valves is also used inside the housing to control the flow of some of the fluids. A number of special seal and vent arrangements are used in the housing to prevent unwanted seepage of fluids through the safety valve.

Safety Valve Detailed Description

The milker unit safety valve 60 is placed at or near the downstream end of the milker unit 40, milk remaining in the long milk tube will not be flushed.
In new milker units 40, the safety valve 60 can be joined to or molded integrally with the milker unit collection bowl so that the backflushing operation flushes out the milker unit 40 including the collection bowl 44, the short milk tubes 46, and the liners 50. (FIGS. 2A, 2B.) Further, a system 20 installed with only a backflushing function can later have an automatic teat dipping feature added, as described in more detail below.

Short milk tubes 46 are also flushed and they can be of any design because none of the system 20 components connects to or passes through the short milk tubes 46. Nonetheless, the backflushing operation begins downstream from the short milk tubes 46, so any milk or other material in the short milk tubes 46 will be cleaned out in the backflushing operation.

The safety valve 60 is depicted separate from any milker unit in FIGS. 9A through 9F. Generally, the safety valve 60 ensures that backflushing fluids and teat dip do not contaminate milk in the dairy components downstream from the milker unit 40. The safety valve 60 also dispenses backflushing fluid and teat dip at appropriate intervals, and is capable of flushing and rinsing itself to ensure proper hygiene at all points in the system. The safety valve 60 can be made integrally with the collection bowl 44 of a milker unit 40 or be a separate unit connected to an outlet of the milker unit 40 or be joined with a short section of milk tube 61 between the milker unit 40 and the safety valve 60. (See: FIG. 2C.) Dip passes through a tube 65 to the manifold 170.

The safety valve 60 must move between a milking position (FIG. 9A) and a backflushing position (FIG. 9B) to prevent contamination of the milk supply. It is noted that the terms "milking position" and "backflushing position" are used to designate the position of a backflush piston 120, and that functions other than milking and backflushing can take place when the backflush piston 120 is in these positions.

Due to pressure differentials between milk lines, backflush lines, dip lines, and atmospheric pressure, it is desirable to do more than simply seal such lines from the milk supply because fluids can seep or migrate past valves and seals when seals are used alone. With the present invention, the pressure differentials are avoided with vents exposed to atmospheric pressure to "bleed off" any pressure differential that may cause unwanted seepage past a seal. In this manner, pressures on each side of the safety valve 60 are isolated from one another and migration of chemicals, air, and other fluids into the milk supply is prevented.

Generally in the present invention, the vents that "bleed" the pressure differentials are disposed between pairs of seals. This arrangement results in a block at one seal, a bleed at the vent, and another block at the other seal for a "block-bleed-block" feature that prevents seepage and ensures safety of the milk supply from backflushing and dipping fluids.

As depicted in FIGS. 9A through 9F, the safety valve 60, a preferred embodiment generally includes a housing that is assembled from a lower housing 70, and an upper housing 74, and the upper housing 74 is covered by a cap 76. These elements are secured to one another with screws 78 (FIG. 9F), or any other suitable connectors, including but not limited to snap fittings, threaded housing components or being molded integrally with one another. Separate housing portions are preferred for ease of manufacture and assembly, but other housing arrangements are possible. Also, the safety valve 60 can be joined to the milker unit 40 with a suitable connector such as a screw 81.

Preferably, the lower housing 70, upper housing 74, and cap 76 are made of a translucent material such as Radel R5000 formulation poly-phenylsulfone material, or FDA and 3A approved material to provide for visual inspection without disassembly of the safety valve 60. Further, translucent materials provide visual indication of a leak and/or if the leaked material exits a vent. It is preferred that any leakage will exit a vent that an operator can see.

The lower housing 70 includes a milk inlet 62, a milk outlet 64, a pair of pulsation conduits 82, a pulsation outlet 83, and a hanger 66. The milk inlet 62 is sized and shaped as necessary to mate with and be secured by a screw 81 to a milker unit 40's downstream outlet. Alternatively, the milk inlet 62 of the safety valve 60 can be connected to a short section of tube 61 (FIG. 2C) disposed between the safety valve 60 and the milker unit 40. The short tube section 61 in such an embodiment is preferably short so that the safety valve 60 is close to the milker unit 40. This arrangement places the safety valve 60 downstream from the milker unit 40 so that the milker unit 40 is backflushed after each milking operation, but the long milk tube 41 or only a small portion of the long milk tube 41 is backflushed to minimize the quantity of milk that will be rinsed out of the long milk tube. The safety valve 60 can also be an integral part of the milker unit 40 by molding, bolting, screwing, gluing or otherwise attaching the safety valve 60 to the milker unit 40.

It is noted that the terms "upstream" and "downstream" refer to the direction milk flows (right to left and identified as "M" in FIGS. 9A and 9B), from the dairy animal to the milker unit 40, through the long milk tube 41, and to the dairy milk's collecting, chilling, and storing facilities. During backflushing operations, backflushing and rinsing fluids flow upstream in the opposite direction of the milk flow. Dip does not pass through the path M because dip travels through a separate tube toward the dip manifold.

The pulsation conduits 82 and outlets 83 mate with a pulsation port on the milker unit 40 to provide vacuum pulsation for the milking operation. This pass through of vacuum is not necessary in the FIG. 2c embodiment because there is adequate clearance between the milker unit 40 and the safety valve 60 to feed vacuum lines directly to the vacuum port 85 on the milker unit 40. The hanger 66 can be secured to a milker unit detacher mechanism (not illustrated) so that the milker unit 40 is supported above the floor or deck when not attached to a dairy animal. The hanger 66 may be unnecessary if the milker unit 40 includes such a feature.

The lower housing 70 generally defines a chamber 90 that is preferably shaped as a cylindrical cavity, but other shapes could be used to ensure proper arrangement of parts. Milk flows through a lowermost portion of the chamber 90 during a milking operation, from the milk inlet 62 to the milk outlet 64.

The lower housing 70 also defines one or more (preferably three laterally spaced apart) holes 92 to vent from the chamber 90 to atmosphere. The holes 92 should be large enough to ensure adequate drainage and venting. The holes 92 are depicted as being on a downstream side of the lower housing 70, but can be other places as well. Positioning the holes 92, as depicted, on the downstream side of the lower housing 70 prevents alignment with piston holes that are used to dispense backflushing fluids.

Figure 10A:
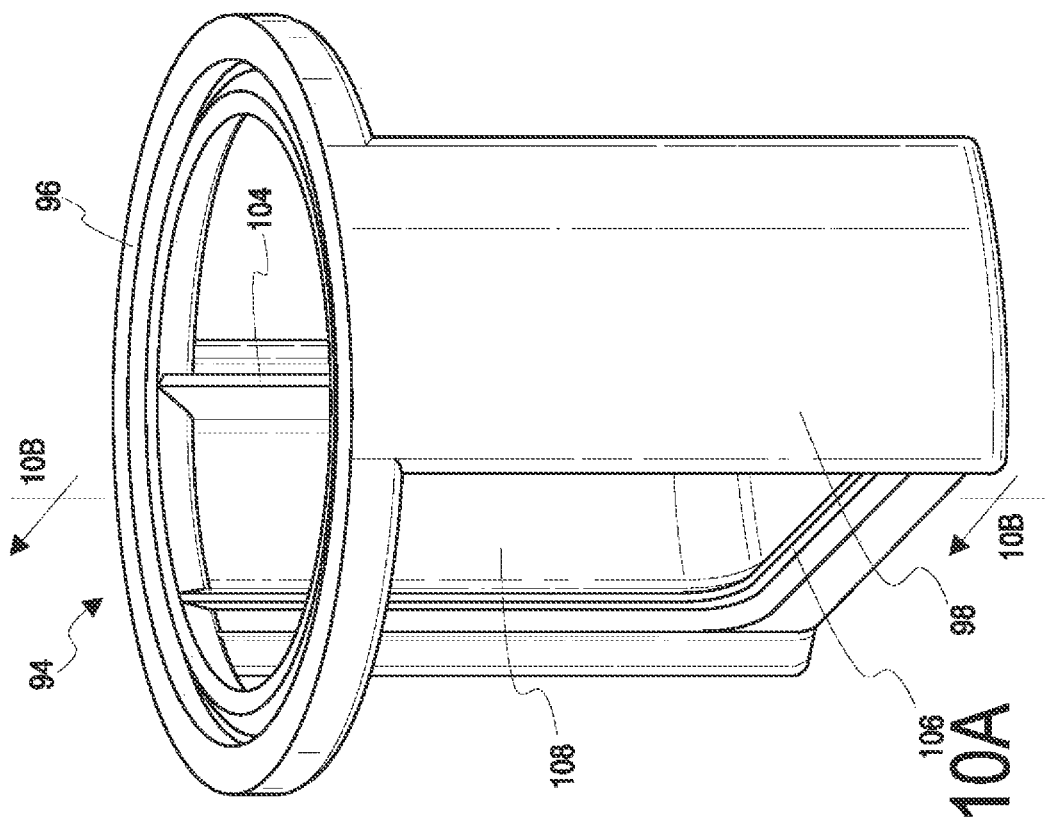
FIG. 10A is a perspective view of a seal insert in accordance with the present invention.

Disposed in the lowermost portion of the chamber 90 is a seal insert 94. (See FIGS. 10A and 10B) In a preferred embodiment, the seal insert 94 includes an upper ring-shaped portion 96 and a lower u-shaped portion 98. The upper ring-shaped portion 96 and lower u-shaped portion 98 are preferably formed as an integral unit made of silicone or other elastomeric material such as (EPDM), but they could be separate seals, if desired.

The upper ring-shaped portion 96 is disposed against an interior chamber 90 surface, and is preferably supported by a seat 102 f (FIGS. 9G and 9H) formed in the interior of the lower housing 70. When in the milking position, the upper ring-shaped portion 96 forms a seal with a lower portion of the backflush piston 120 to seal the milk flow outlet 64 from backflushing and dip valve components. See FIGS. 9A and 9G, for example.

The lower u-shaped portion 98 of the seal insert 94 is disposed transversely to the flow of milk from the milk inlet 62 to the milk outlet 64. As best seen in FIGS. 9G and 10B, an interior surface of the lower u-shaped portion 98 includes an upstream flange 104 and a downstream flange 106 joined to and spaced apart by a web 108. The lower u-shaped portion 98 can be supported by a mating recess in the lower housing 70 chamber 90 wall (FIG. 9E). The functions of these components are explained in detail below in connection with the operation of the backflush piston 120, but the space defined between the upstream flange 104, the downstream flange 106, the web 108, the backflush piston 120, and necked-down portion 130 (when in the backflush position) is a vent that communicates with one or more of the vent holes 92 to provide a double seal or "block" and a space between for "bleeding" to atmosphere.

In addition, the use of seal flanges 104 and 106 as the only contact with the backflush piston 120 reduces sticking to one another in a way that would impede operation. Also, debris such as bedding material, dirt, and sand that moves through the milker unit 40 is less likely to prevent the backflush piston 120 forming a seal with the seal insert 94. It also provides clearance for the backflush piston 120 which helps reduce damage to the backflush piston 120.

The seal insert 94 is preferably secured to the lower housing 70 with a screw 109 and a reinforcing plate 110, which is preferably molded integrally with the seal insert 94.

Figure 9C:
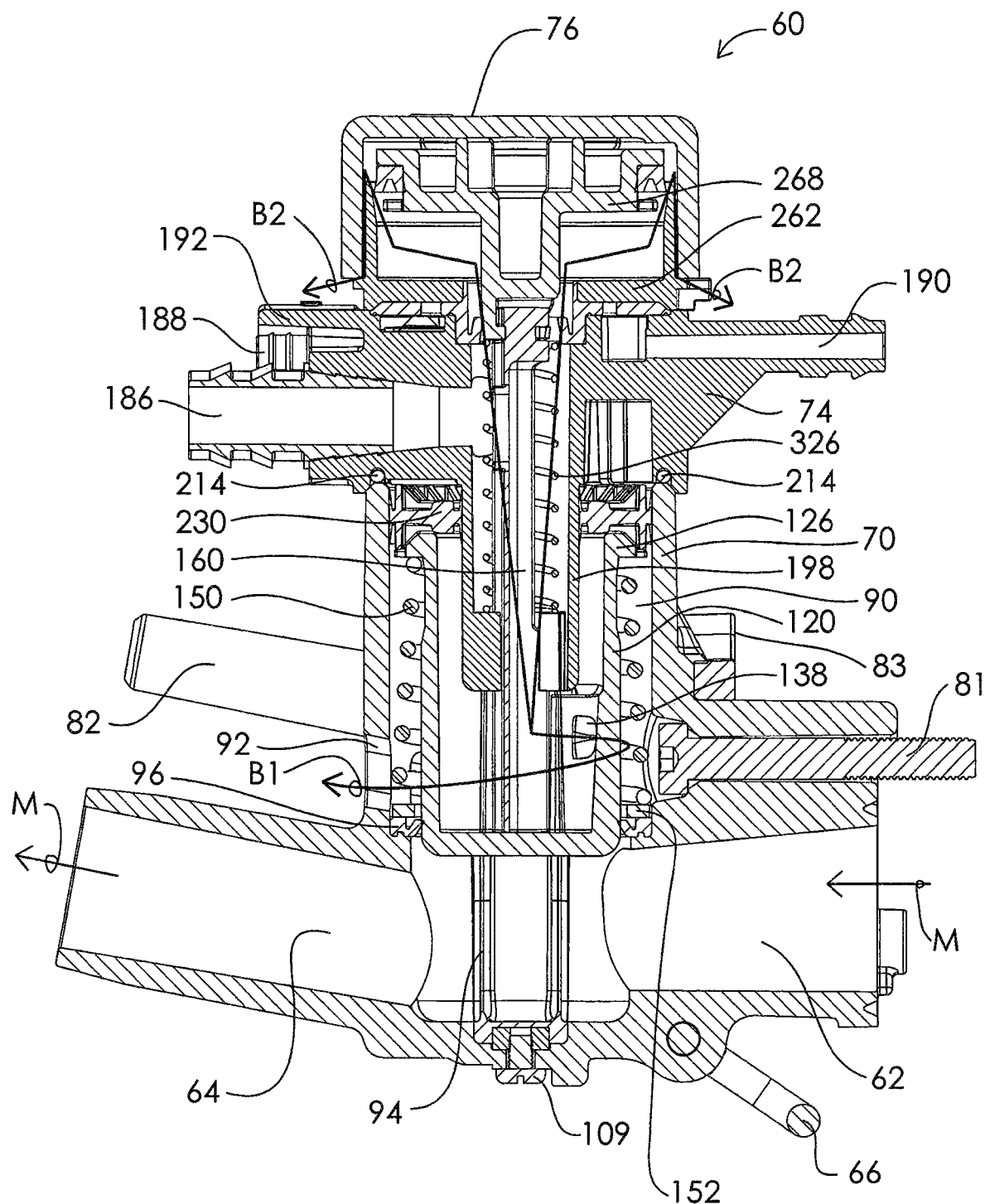
FIG. 9C is a side cross sectional view of the milker unit safety valve of FIG. 9A in the milking position and illustrating bleed paths.
Figure 9D:
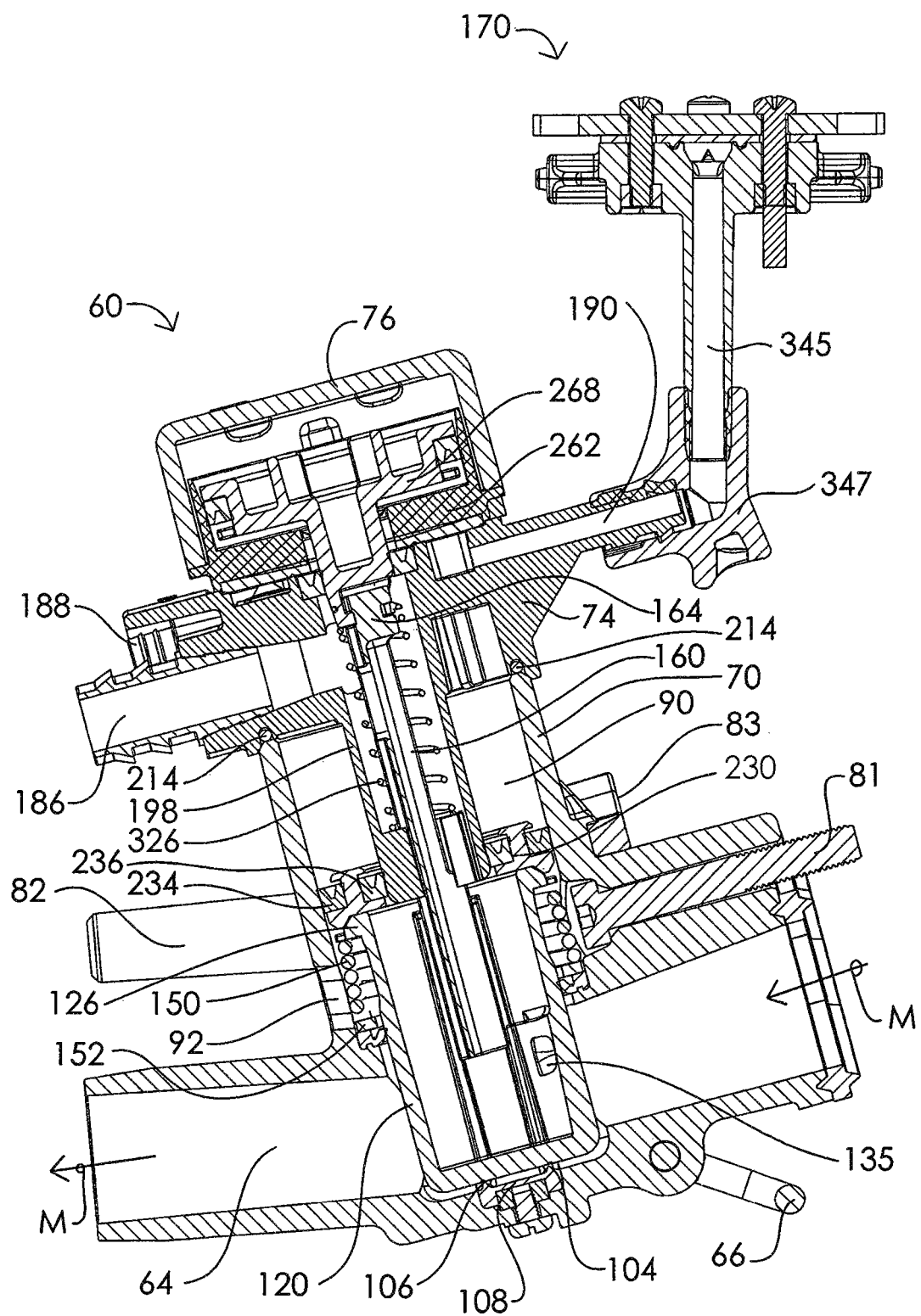
FIG. 9D is a partial side cross sectional view of the milker unit safety valve of FIG. 9A in a backflushing and dipping position in accordance with the present invention.
Figure 9E:
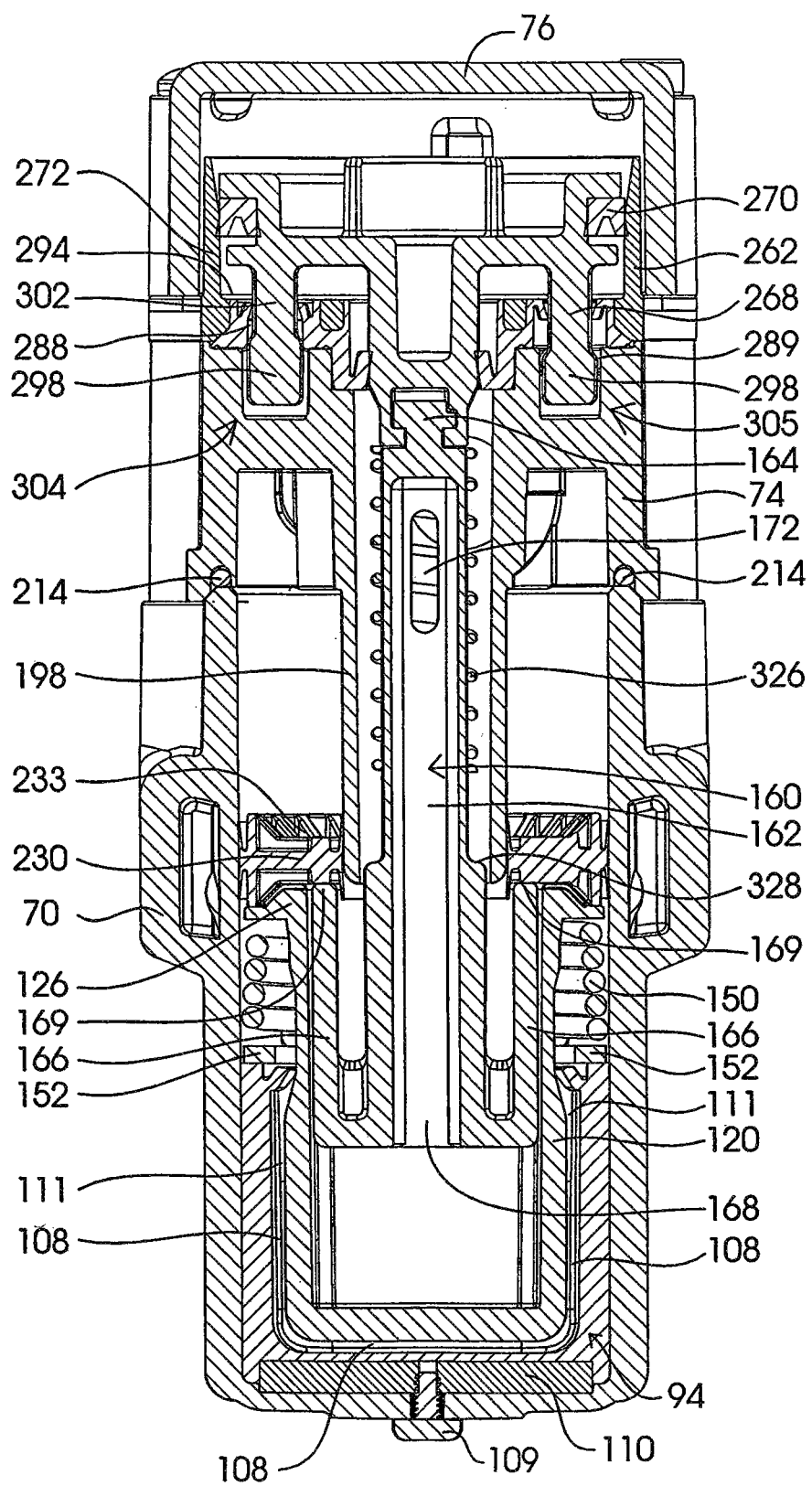
FIG. 9E is a side cross sectional view of the safety valve of FIG. 9A in a backflush and dipping position.
Figure 10B:
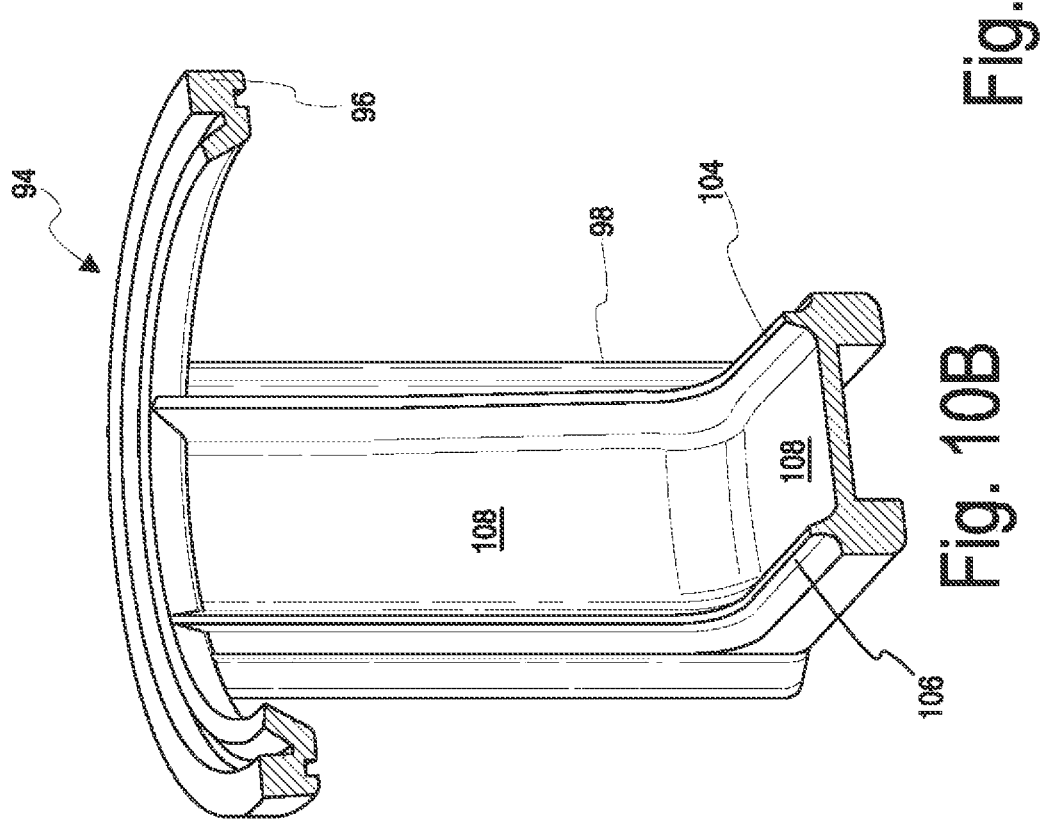
FIG. 10B is a cross sectional perspective view of the seal insert taken along 10B-10B in FIG. 10A.

Referring to FIGS. 9A-E, disposed in the lower housing 70 chamber 90, is the backflush piston 120. The backflush piston 120 is sized and shaped to move up and down (in the illustrated orientation) between a milking position (FIGS. 9A and C) and a backflushing position (FIGS. 9B, 9D and 9E). The backflushing piston 120 operates during both backflushing and dipping operations, so its name and lower position are to be understood as generic terms for a piston and a closed position, respectively. As seen in FIGS. 11A to 11C, the backflush piston 120 is substantially cylindrically shaped, but it can have other cross-sectional shapes to ensure that it is inserted into the chamber 90 with the proper orientation, for example. Also preferably, the backflush piston 120 is closed at its lower end 122, open at its upper end 124, and has a flange 126 extending radially outwardly from its upper end 124. The flange 126 has gaps 128 to permit cleaning solution to flow past for enhanced cleaning of the seal.

Essentially, the backflush piston 120 is used to divide the chamber 90 and seal the portion above from the portion below and to at least partially define a flow path for backflushing fluids into the milker unit 40. Also, the backflush piston 120 is in the backflushing position when applying teat dip and when backflushing, but not when the safety valve 60 is self-cleaning.

As best seen in FIGS. 11A to 11C, the backflush piston 120 has an exterior shape that includes an annular necked-down portion 130 adjacent to the flange 126. The necked-down portion 130 preferably has an outside diameter that is smaller than the outside diameter of the lower portion of the backflush piston 120, and extends at least partially around the backflush piston 120.

The exterior surface of the backflush piston 120 further includes two piston by-pass vents 134 on opposite sides of the backflush piston 120. The piston by-pass vents 134 are essentially indented portions arranged transversely to the milk flow path from the milk inlet 62 to the milk outlet 64, and are positioned high enough on the backflush piston 120 so that a lower portion of the backflush piston 120 can mate and seal with the upper ring-shaped portion 96 of the seal insert 94 when in the milking position, and mate and seal with upstream and downstream flanges 104 and 106 of the lower u-shaped portion of the seal insert 94. The by-pass vents 134 do not seal with the upper ring-shaped portion 96 when in the backflush piston 120 is in the backflush position. This arrangement provides a vent for the chamber 90 to bleed off differential pressure.

Next, the backflush piston 120 includes one or more (preferably two laterally spaced) holes 138 oriented radially to the backflush piston 120. The holes 138 are formed or machined into the backflush piston 120 so that they are directed toward the milk inlet 62 when the backflush piston 120 is in the backflushing (lowered) position (FIGS. 9B and 9D), and are above the upper ring-shaped portion 96 of the seal insert 94 when the backflushing piston 120 is in a milking (raised) position (FIG. 9A). With this arrangement, the holes 138 are sealed from the milk supply by the upper-ring shaped portion 96 of the seal insert 94.

As best seen in FIG. 11C, inside the backflush piston 120, and adjacent to, but not blocking the holes 138, are two longitudinally oriented and inwardly extending flow vanes 142 that ensure that the backflush fluids flow through the holes 138 in a desired direction. The flow direction is typically selected based on the shape and/or configuration of the milker collection bowl 44 of the milker unit 40. This arrangement permits the backflush piston 120 to be part of a backflush fluid conduit that extends through the safety valve 60.

Also formed on the interior surface of the backflush piston 120 are two pairs of longitudinally and inwardly extending key ribs 144 (FIGS. 11A and 11C). Each pair of key ribs 144 is disposed opposite the other. When the backflush piston 120 is disposed in the lower housing 70, the key ribs 144 are arranged on interior sides of the backflush piston 120 that are transverse to the direction of milk flow, and slidably engage an upwardly extending connector 160, described below.

Disposed in the lower housing 70 chamber 90 between the seal insert's 94 interior surface and an underside of the flange 126 of the backflush piston 120, is a piston return spring 150. The piston return spring 150 acts between the flange 126 of the backflush piston 120 and the upper ring-shaped portion 96 of the seal insert 94. Preferably, a metal ring 152 is positioned between the piston return spring 150 and the top of the upper ring-shaped portion 96 of the seal insert 94 to transfer spring loads without undue pressure or abrasion on the seal insert 94.

The piston return spring 150 is arranged to bias the backflush piston 120 upward toward the milking position (FIGS. 9A and 9C). The piston return spring 150 can be made of metal, plastic or other material, and preferably has just enough force that can move the backflush piston 120 over friction with the seal insert 94, but can be overcome by pressurized air to move the backflush piston 120 downward. The piston return spring 150 and the other springs described herein can be any type of biasing device.

To compress the piston return spring 150 and move the backflush piston 120 toward the backflush position (FIGS. 9B and 9D), compressed gas, such as air, is fed into the safety valve 60, via an air inlet 184, which applies pressure to a backflush operation plate 230 (described in detail below) that, in turn, applies pressure to the backflush piston 120. The piston return spring 150 is designed to yield to the pressure exerted by the compressed pressurized air/gas, but to also quickly return the backflushing piston 120 to the milking position (FIGS. 9A and 9C).

Also as stated, the backflush operation plate 230 transmits air pressure to the backflush piston 120, when the pressurized gas is vented or removed by the piston spring 150. One embodiment of a backflush operation plate 230 in accordance with the present invention is illustrated in FIGS. 12A and 12B has a central opening 231 positioned around a central shaft 198 of the upper housing 74. The backflush operation plate 230 is essentially a disk defining a recess 238 for receiving the lip 239 of the top of the backflush piston 120 so that the backflush piston flange 126 is in bearing contact with a lower rim 242 of the backflush operation plate 230.

An outer u-cup seal 234 (FIGS. 12A and 12B) fits on a mating seat 244 of the backflush operation plate 230. Alternatively, the u-cup seal 234 could be replaced with a seal formed integrally with the backflush operation plate 230. The outer u-cup seal 234 extends radially outwardly from the outer diameter of the backflush operation plate 230 for sliding and sealing engagement with the inner surface of the lower housing 70. An inner stem seal 236 is disposed in an inner annular recess 246 on the backflush operation plate 230 and extends inwardly to be in sliding and sealing engagement with the upper housing central shaft 198.

When in the milking position, pressurized air can flow from the air inlet 184 of the upper housing 74 to force the backflush operation plate 230 downward against the force of the piston return spring 150, and move the backflush piston 120 into the backflushing position (FIGS. 9B, 9C, and 9D), while also preventing backflush fluids from flowing upward into the upper housing 74.

A second embodiment of a backflush operation plate 230 is illustrated in FIGS. 9A, 9B, 12C and 12D, and has a central opening 231 and a recess 238 for receiving the lip 239 of the backflush piston 120. Reinforcing ribs 233 are formed above and below a wall 232.

This embodiment of the backflush operation plate 230 includes integrally molded seals 235 and 237 around the outer annular surface and an integrally molded seal 239 and 241 around the inner annular surface. This design is less costly, requires fewer parts, and is easier to assemble and replace.

The upper seals 235 and 239 seal air pressure to move the backflush piston 120 into a backflush position. The lower seals 237 and 241 wipe dirt and debris from mating surfaces when moving to the backflushing position, and seal out water during a self-cleaning cycle.

Figure 13:
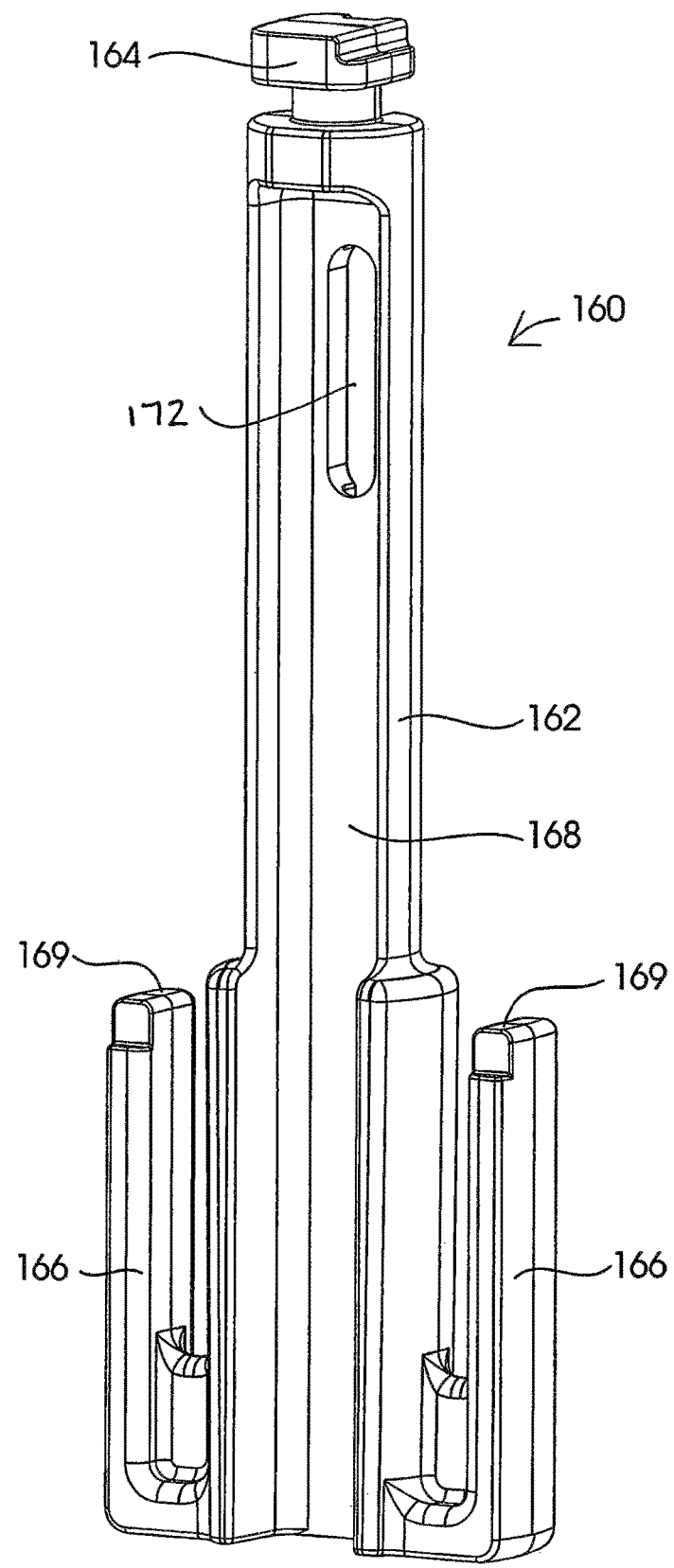
FIG. 13 is a perspective view of a safety valve piston connector in accordance with the present invention.

Extending though the central opening 231 of the backflush operation plate 230, is a central shaft 198 of the upper housing 74 (described in detail below). Extending through the central shaft 162, is a connector 162 that engages the backflush piston 120 with the dip valve piston 268. As illustrated in FIG. 13, the connector 160 includes a central shaft 162, a shaft key 164 at the top of the central shaft 162, and a pair of tabs 166. The shaft key 164 joins to the dip valve piston 268 and the shaft tabs 166 to slidably fit into the piston connection rib pairs 144 formed on the inside of the backflush piston 120. This allows for differential movement between the dip valve piston 268 and the backflush piston 120. The bottom of the connector 160 bears on the inside of the lower end 122 of the backflush piston 120.

When pressurized air is applied to move the backflush piston 120 downward, the connector 160 is not pulled down because of their sliding relationship, as described above. Instead, the backflush operation plate 230 continues to move down even after the backflush piston 120 engages and slightly compresses the seal insert flanges 104 and 106 to close off the milk passage. This additional downward movement results in the backflush operation plate 230 engaging the tops 169 of the connector tabs 166 to force the connector 160 downward. When the connector 160 moves downward, the dip valve piston 268 is pulled down to open the dip valve piston 268 due to the fixed connection between the two to release dip.

The sequence of the differential movement between the backflush piston 120 and the dip valve piston 268 ensures that the backflush piston 120 has sealed off the milk line before any possibility of the dip valve piston 268 opening. In addition, the backflush piston 120 requires a relatively large movement to close off the milk passage, but the dip valve piston 268 needs to move only a relatively small amount to open. For example, the backflush piston 120 moves about 0.75 inches, and the dip valve piston 268 moves about 0.15 inches. This differential movement is not absolutely necessary, but it reduces the overall height of the safety valve 60, and provides to above-described safety factors.

The connector tabs 166 upper portions are spaced radially apart from the central shaft 198 so that when the connector 160 is in a milking position, the tabs 166 will not engage the central shaft 198 of the upper housing 74.

When dipping and backflushing operations are finished, air pressure applied to the backflush operation plate 230 is released, and the dip valve spring 326 (explained in more detail below) urges the dip valve piston 268 (upward as seen in the figures). Due to their sliding relationship, the connector 160 does not pull the backflush piston 120 back up. Instead, the sliding relationship between the connector 160 and the backflush piston 120 leaves only the piston return spring 150 to urge the backflushing piston 120 back to a milking position, and when the backflush piston 120 approaches the top of its movement, it can engage the connector 160 to provide a redundant force against the dip valve piston 268.

The central shaft 162 of the connector 160 defines a longitudinal channel 168 through which backflushing fluid flows down, into the backflush piston 120, and out the backflush piston 120 holes 138. A lower end of the longitudinal channel 168 also mates with the flow vanes 142 in the backflush piston 120 to define a backflush fluid conduit for flow efficiency.

The central shaft 162 also defines a slot 172 in an upper portion of the central shaft 162 through which cleaning fluid flows during backflushing and self-cleaning.

The connector 160 extends upward, out of the lower housing 70, and into the upper housing 74 for connection to components described below.

Upper Housing

As depicted in FIGS. 9A through 14A, for example, the upper housing 74 preferably includes connecting shafts 180, two air inlets 184, 185, a backflush inlet 186, a teat dip inlet 188, a teat dip outlet 190, and a guard 192 for protecting the inlets from damage.

The air inlet 184 enters the upper housing 74 and turns downward (FIG. 14B) to operate the safety valve 60 by acting on the backflush operation plate 230, and it is connected via a hose or other suitable fluid communication device to valve 611 and outlet 615 on the valve block 610 (FIGS. 6A to 6D). Air through the air inlet 185 enters the upper housing 74, turns upward and through an umbrella valve 253a (FIG. 14D) to "slug" dip and other fluids through the safety valve 60, related dip delivery tubes, and chambers. The air inlet 185 is in communication with the air chase outlet 446 on the dosage valve 84. The backflush inlet 186 is in fluid communication with valve block outlet 637 on the valve block 610 to feed backflush fluid, water, and air to the safety valve 60. The backflush inlet 186 enters the upper housing 74 and the flow is diverted into two paths. One flow path turns upward and enters through umbrella valve 253b to clean the dip components. The other flow path extends into the central shaft 198 and then flows down to clean the safety valve 60 and milker unit 40. The dip inlet 188 is in communication with the dosage valve outlet 438, and enters the upper housing 74 where it turns up through umbrella valve 253c. The rest of the dip flow path is described below.

Generally, the interior of the upper housing 74 defines a longitudinally extending air conduit in the hollow central shaft 198, a backflush chamber 200, a dip inlet chamber 204, and a dip outlet chamber 206. A transverse wall 210 divides the upper housing 74 and at least partially forms some of the chambers 200, 204, 206.

Like the lower housing 70, the upper housing 74 is preferably made of the same translucent plastic described above for the upper housing 74, and for the same reasons. The upper housing 74 is sized and shaped to mate with and be connected to the lower housing 70, preferably using screws 78, bolts, and/or bushings, but they can also be formed integrally with one another. A ring seal 214 is provided in an annular recess formed in the lower end of the upper housing 74 to seal the interface between the lower housing 70 and the upper housing 74.

Figure 14B:
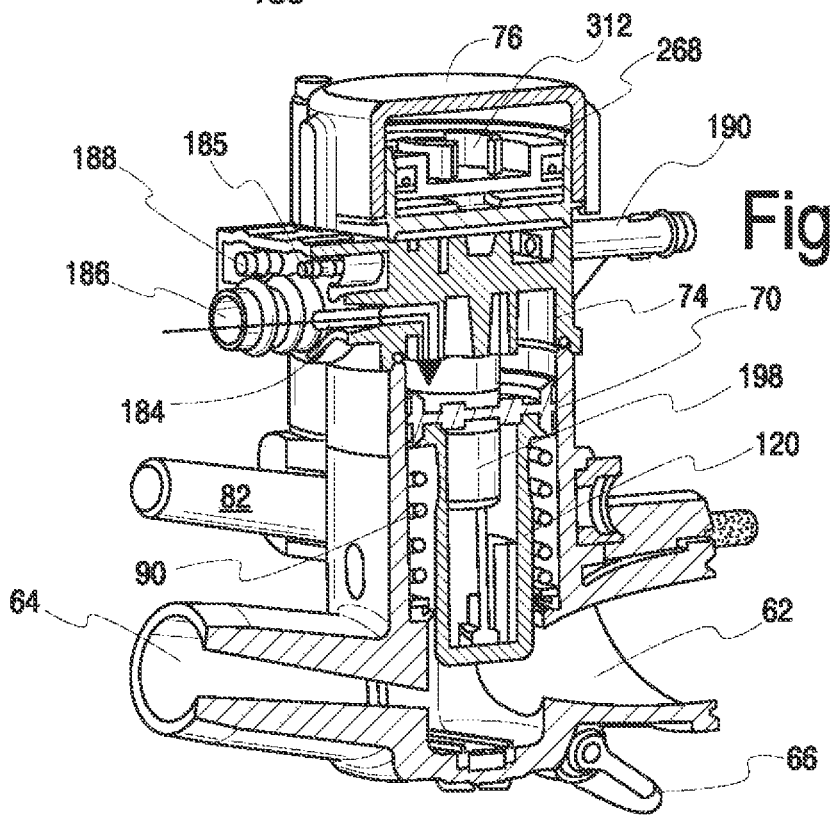
FIG. 14B is a cross sectional perspective view of the safety valve and illustrating an air conduit through which pressurized air operates the backflush piston and the dip piston, in accordance with the present invention.

As best seen in FIG. 14B, the first air inlet 184 communicates with the air conduit in the central shaft 198 to feed compressed air against the backflush operation plate 230 and into the lower housing 70 to force the backflush piston 120 into the backflushing position (FIG. 9B).

As depicted in FIGS. 14C and 14D, the second air inlet 185 is in communication with the dip inlet chamber 204 via a hole 218 to provide pressurized air from the dosage valve 84 outlet 446 that purges cleaning fluids from the safety valve 60 and any related hoses, lines, and dip manifold, liner mouth piece (lipped portion in liner head), and dip channels.

The backflush inlet 186 extends radially inwardly to the upper housing 74 and communicates with the central shaft 198 and the longitudinal channel 168 in the connector 160 (see FIG. 13) to supply backflush fluid to the backflush piston 120, and out of the backflush piston holes 138. Preferably, the backflush inlet 186 is arranged asymmetrically (slightly tangential) to the central shaft 198 to allow for adequate connection space for all of the hoses and to generate some beneficial cleaning turbulence when the safety valve 60 is cleaning itself.

Figure 14F:
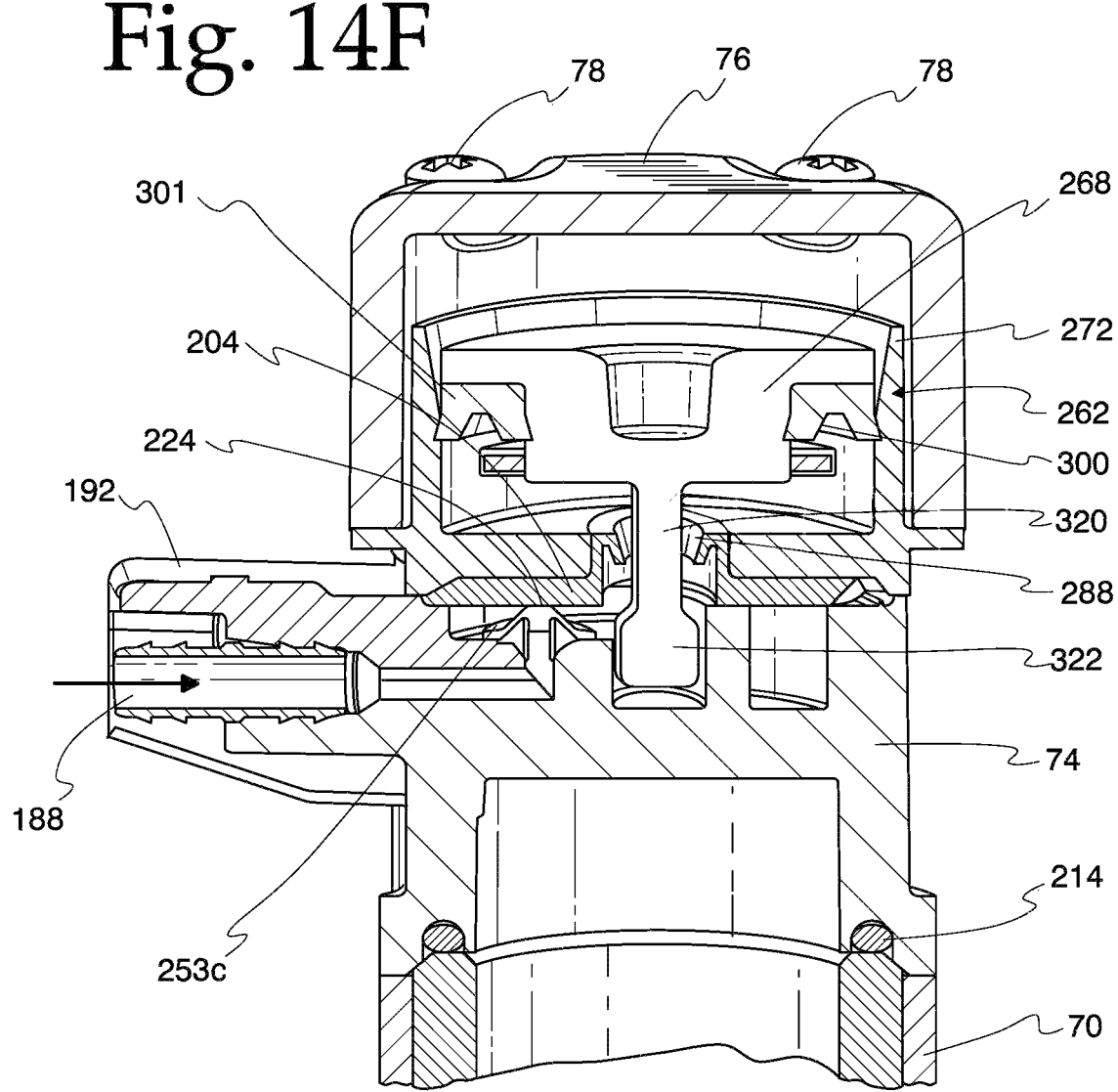
FIG. 14F is a cross sectional side view of the upper housing and some related components in a dip position.

As seen in FIG. 14F, the dip inlet 188 extends into the upper housing 74 and turns upwardly through a third opening 224 into the dip inlet chamber 204.

As described above, there is a backflush operation plate 230 that acts to move the backflush piston 120 down. The backflush operation plate 230 is disposed in the lower housing 70, but slides on the central shaft 198 of the upper housing 74 because the central shaft 198 extends downward into the lower housing 70.

Should the safety valve 60 only be used for backflushing or washing animal teats, there is only a need for the above-described items, and the cap 76 mates with the upper housing 74 and the safety valve 60 functions to seal and backflush the milker unit 40. If teat dip application functions are desired, the items described below are included.

Dip Valve Components

When teat dipping is used as an option, FIGS. 14E, 14F, 15, 16A, 16B, 16C, and 16D for example, show that the safety valve 60 have in its upper housing 74 dip valve components that include; the dip inlet 188, the dip outlet 190, the dip inlet chamber 204, the dip outlet chamber 208, as well as the elements described below. The dip inlet 188 is connected by a hose to be in fluid communication with the dosage valve outlet 438, and the dip outlet 190 is connected to a dip delivery channel (described below). The safety valve 60 includes a top plate 262, a top plate seal 264, a dip valve piston 268 disposed in the top plate 262 for sliding movement between a dip position (down as viewed in FIG. 14F and a milking position (up as viewed in FIG. 9A), and a dip piston seal 270.

Figure 17:
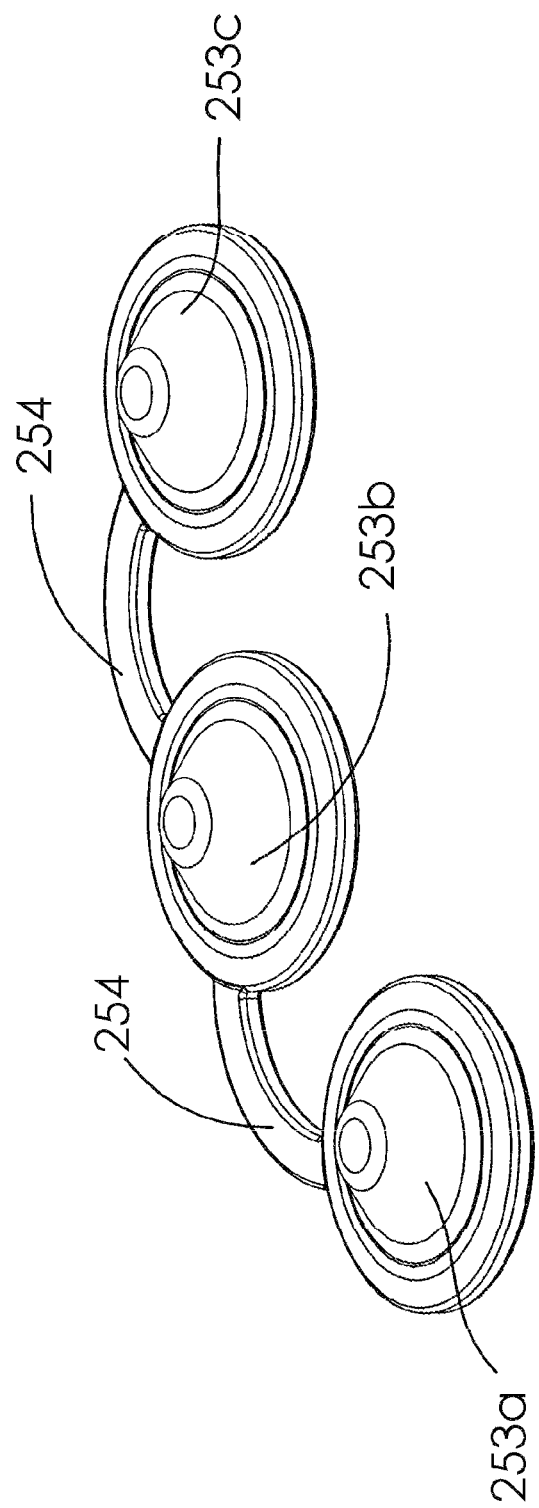
FIG. 17 is a perspective view of an umbrella valve for use in a safety valve in accordance with the present invention.

The backflush inlet 186, the dip inlet 188, and the second air inlet 185 are each closed with flexible valves 253a, 253b and 253c that are preferably an "umbrella valve" made of silicone, and connected together at 254 for ease of manufacture and installation. (See: FIG. 17) The valves 253a-c are one-way valves that are opened by air, water, or dip pressure to allow air, water, or dip to enter, but the valves 253a-c restrict flow in the opposition direction because the valves 253a-c are resilient and close when there is no dip, air or water pressure to keep them open. The valves essentially function as suction cups when no pressure is there to open them. Also, pressure from other fluids entering other valves contributes to keeping the valves 253a-c closed.

As depicted in FIGS. 16A to 16D, the top plate 262 includes a cylindrical cup portion 272 with a transverse bottom wall 273 for slidably receiving the dip valve piston 268. The top plate 262 also includes fastening tabs 274 through which screws 78 can extend to fasten the top plate 262 to the top of the upper safety valve housing 74. The top plate 262 includes an outer annular seat 276 on which the cap 76 is positioned. The top plate 262 can be made of any suitable material including Radel R5000, other plastic or stainless steel. The materials used for the various parts of the safety valve 60 are preferably the same or at least have similar properties such as coefficient of thermal expansion and chemical resistance.

The top plate 262 and the top plate seal 264 are preferably formed together to reduce expense, avoid an assembly step, and to ensure alignment of the various holes. Alternatively, aligning these parts can be done with two seal alignment pins extending downward from the top plate 262 that are preferably of a different shape and/or orientation and/or spacing from one another and other functional components. Regardless of which method is used, the seals 324 and 325 must match with holes 288 and 289 in the bottom wall 273.

In the bottom wall 273 of the top plate 262 there is an upstream dip opening 288, a downstream dip opening 289, and a central opening 290 through which the connector 160 extends for connection to the dip valve piston 268.

Inside the cylindrical cup portion 272 of the top plate 262 and the top surface 294 of the bottom wall 273 defines a dip flow channel 296 with the bottom on the dip valve piston 268. An additional recess can be formed in any of these surfaces to help control dip flow, but the space between the dip valve piston 268 and the top surface 294 of the bottom wall 273 is adequate between 312 and top 262. The dip flow channel 296 can be any shape that provides efficient flow characteristics for dip, with the dip flow channel 296 extending between the dip openings 288 and 289. Dip flows up through the upstream dip opening 288, across and down through the downstream dip opening 289.

The dip valve piston 268 is depicted in FIGS. 9F, 14C, 14F and 15, and is sized to be slidably disposed in the top plate 262 cylindrical cup portion 272, and includes a head 298 defining an outer annular seal recess 300 with a seal 301, a central connector post 302 extending downward, a downwardly extending upstream dip valve pin 304, a downwardly extending downstream dip valve pin 305, a number of notches 308 that provides better rinsing of u-cup, and a grab point for assembly, an upper recess portion 310, and a bifurcated post 312 that extends upward above the surface of the head 298 to form a stop. The post 312 is also preferably bifurcated for improved fluid flow for cleaning.

The central connector post 302 of the dip valve piston 268 is hollow and includes at its lower end a receptacle 316 that mates with the connector 160 preferably in a snap relationship. The receptacle 316 is open at one side and to receive the top end of the connector 160 by engaging a connector slot 318.

A dip valve spring 326 (FIG. 9E) is disposed in the central shaft 198 of the upper housing 74 and is prevented from extending downward and out of the central shaft 198 by one or more spring seats 328. The dip valve spring 326 is also positioned around the central shaft 162 of the connector 160 to bias the connector 160 and the dip valve piston 268 (upward) toward a milking position.

The backflush piston return spring 150 biases the backflush piston 120 upward and the dip valve spring 326 biases the dip valve piston 268 upward despite the use of the connector 160 joining these two pistons 150, 268. The force of two springs 150, 326 is not necessary to move the pistons 150, 268 upward, but they provide a redundancy that ensures safe operation of the safety valve 60.

The dip valve pins 304, 305 each include a stem 320 and a valve head 322. The valve heads 322 are sized and shaped to substantially close and seal the dip openings 288 and 289 (with seals 324 and 325) in the bottom wall 273 of the top plate 262 when the dip valve piston 268 is in the milking (or closed) position (FIGS. 9A and 9C).

The dip openings 288 and 289 are sealed when the dip valve piston 268 is closed. On opposite sides of these seals, there may be differential pressures that could cause dip to seep past the seals 324 and 325. Accordingly, a vent between the dip openings 288 and 289 and seals 324 and 325 is provided for the desired block-bleed-block feature that ensures safe operation of the invention.

To provide a suitable vent, there is a skirt 277 extending downward from the bottom wall 273 of the top plate 262. The plate seal 264 is disposed within the skirt 277. Formed in both the plate seal 264 and/or the skirt 277 are two slotted vents 282 that extend radially outwardly and vent/bleed to atmosphere at vent holes 279. The slotted vents 282 and vent holes 279 are positioned between the upstream dip opening 288 and the downstream dip opening 289 to provide a block-bleed-block arrangement.

Figure 9F:
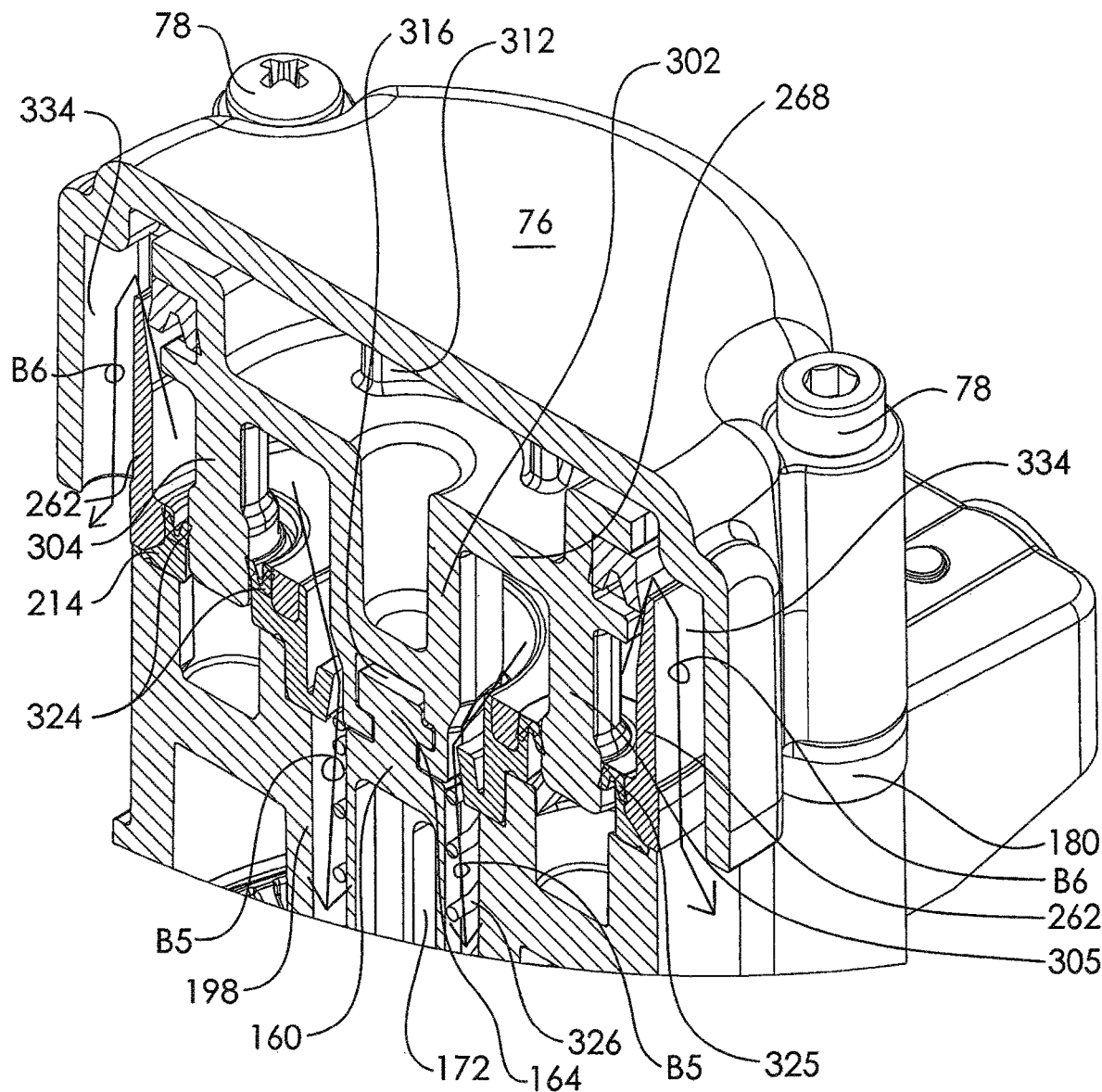
FIG. 9F is a cross sectional perspective view of the safety valve of FIG. 9A in a milk and dip block position and illustrating "bleed" paths in accordance with the present invention.
Figure 9H:
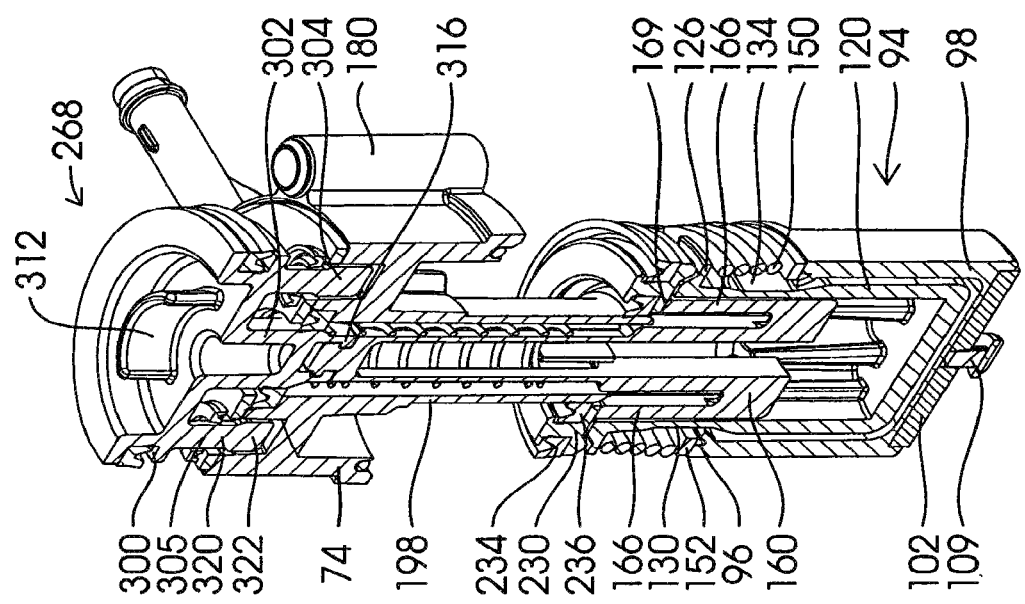
FIG. 9H is the safety valve of FIG. 9A in the backflushing position with the housing removed.
Figure 9G:
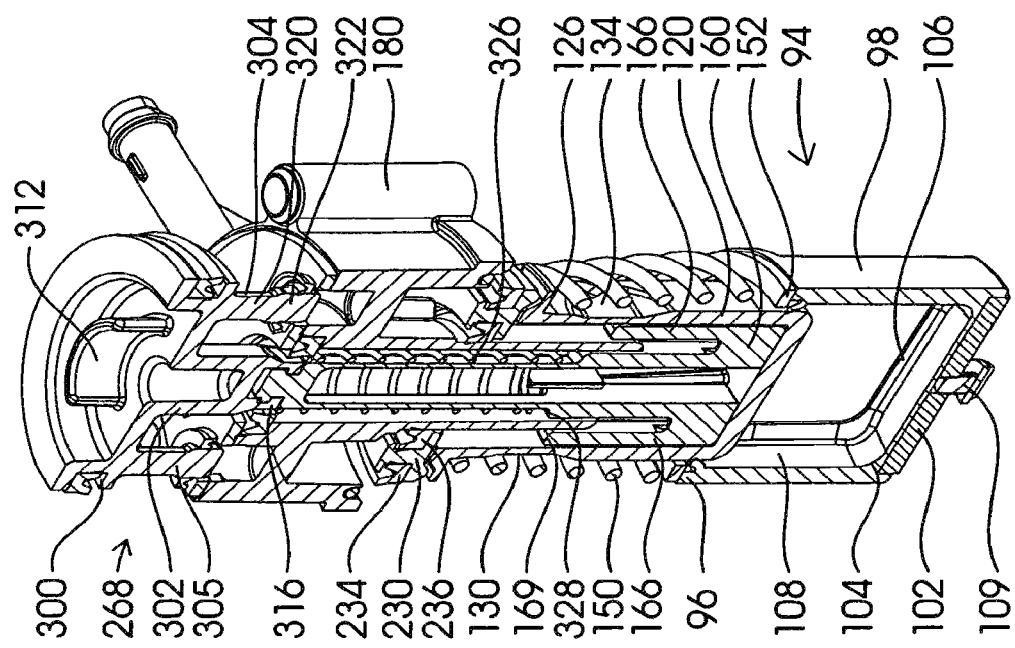
FIG. 9G is the safety valve of FIG. 9A in the milking position and with the housing removed.

As seen in FIG. 9F, two dip hole seals 324 and 325 enhance the seal between the dip openings 288 and 289 and the dip valve heads 322, and provide initial and secondary seals or "blocks" In between the seals 324 and 325, the top plate 262 is vented in two places. The first vent is B5 that passes down and past the dip piston post 302 to vent/bleed the top plate 262 out of the lower housing vents 92 described above. The second vent is B6 that vents upward and out of the cap 76 vents 334. Thus, the blocks 324 and 325 are spaced apart with two bleeds B5 and B6 disposed in between to provide important block-bleed-block functions.

When the dip valve piston 268 is in the dipping position (FIG. 14F), the dip valve heads 322 move downward and no longer seal the dip openings 288 and 289 because the stems 320 of the dip valve pins 304 are smaller than the dip openings 288 and define annular openings through which dip flows. Dip flows up through the upstream dip openings 288, across to the other side, and down through the downstream dip opening 289.

Safety Valve Cap

Figure 18:
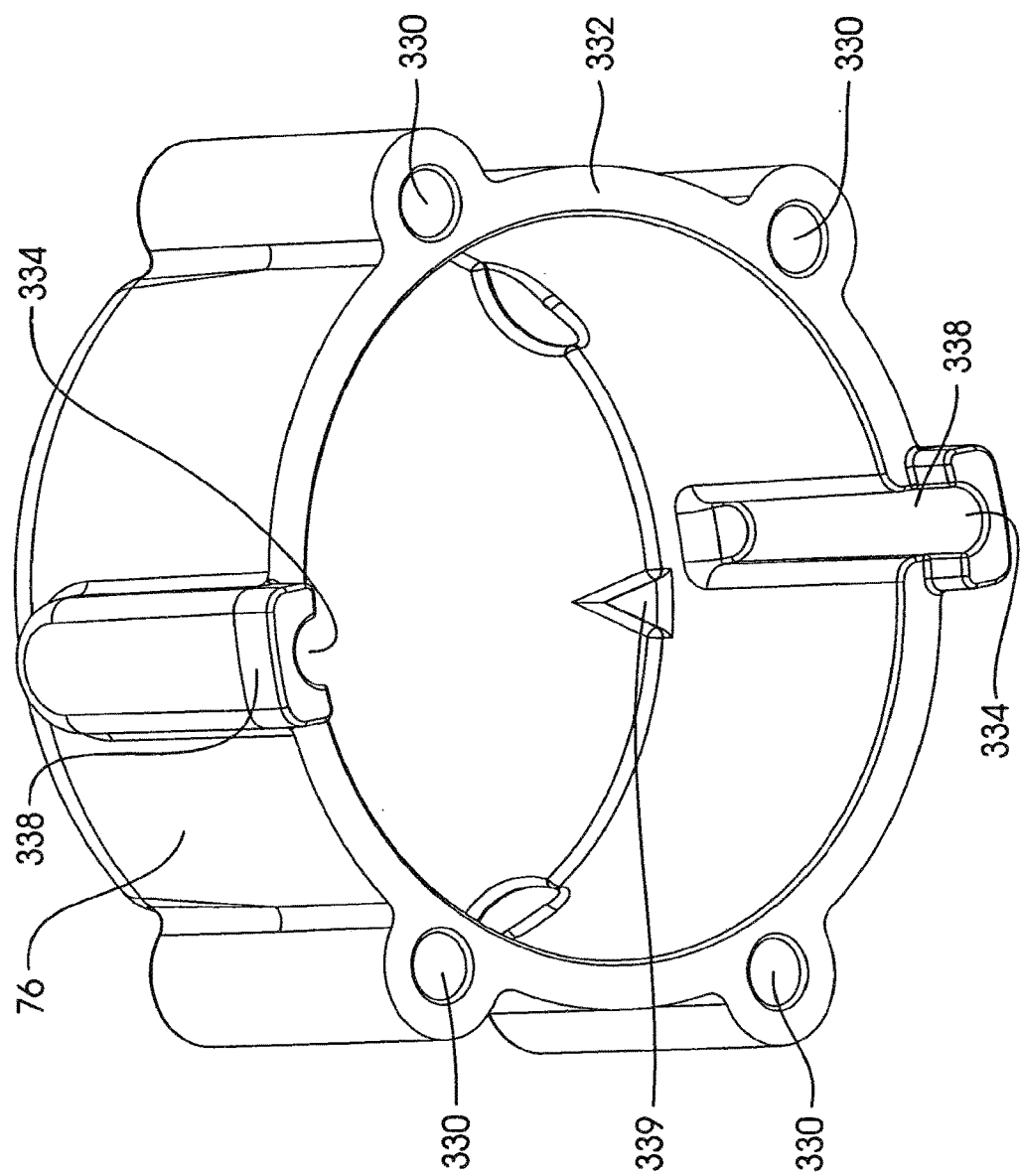
FIG. 18 is a perspective view of a safety valve cap in accordance with the present invention.

The cap 76 of the safety valve 60 is best depicted in FIG. 18. The cap 76 is cup-shaped with four screw holes 330 for securing the cap 76 to the other portions of the safety valve 60. Preferably, the cap 76 is made of a translucent plastic, such as Radel R5000 for the reasons stated above.

The cap 76 also includes a pair of cap vents 334 that are formed by gaps 336 in the cap 76 and vent hoods 338. The vent hoods 338 extend downwardly from the cap 76 and ensure that the cap 76 is vented to atmospheric pressure.

A bottom edge 332 of the cap 76 rests on the top plate 262 of the dip safety valve 260 when present or onto the upper housing 74 when the dip safety valve 260 is not included. No seal is needed between the bottom edge 332 of the cap 76. The cap 76 preferably includes an interior key 339 (FIG. 18) that mates with a key-way on the upper housing 74 to ensure proper alignment and orientation of the vents 334.

Safety Valve Operation

As stated above, the safety valve 60 must move between a milking position (FIG. 9A) and a backflushing position (FIG. 9B) to prevent contamination of the milk supply by the teat dip or backflushing fluids. Due to pressure differentials on opposite sides of the safety valve 60, it is desirable to do more than simply seal off chemical, air, or other fluid lines from the milk supply. With the present invention, the pressure differential on each end of the safety valve 60 is avoided with vents exposed to atmospheric pressure to "bleed" off any pressure differential that may cause unwanted seepage past a seal. In this manner, pressures on each side of the safety valve 60 are isolated from one another and seepage of chemicals, air, and other fluids into the long milk tube and milk supply is prevented. Generally, seals are provided in pairs with a vent to atmosphere disposed between the seals of each pair. This arrangement provides a "block-bleed-block" function to ensure that fluid that seeps past one seal cannot seep past the other seal.

As seen in FIG. 9C, to achieve the "block-bleed-block" function when the safety valve 60 is in the milking position (FIGS. 9A and 9C), a block is formed by the seal insert 94, and specifically by the upper ring-shaped part 96 of the seal insert 94. The upper ring-shaped part 96 seals an annular gap between the interior surface of the chamber 90 and a lower cylindrical portion of the backflush piston 120.

The bleed function in the milking position (FIGS. 9A and 9C) is performed by two different paths between the safety valve chamber 90 and the atmosphere outside of the safety valve 60 and the milker unit 40. It is only necessary to have one such "bleed" path, but the illustrated embodiment provides a bleed redundancy for added safety.

The first bleed path is illustrated in FIG. 9C and is designated as B1. This first bleed path B1 is a path from the chamber 90 through backflush piston holes 138, and through holes 92 in the lower housing 70. The second bleed path B2 is from the chamber 90 of lower housing 70 through a space between the central connector post 302 of the dip safety valve piston 268 and central opening 290 of the top plate 262, through the cylinder 272 of the top plate 262, past the outer annular seat 276 of the dip valve piston 268, up into an interior portion of the safety valve cap 76, and out cap vents 334. The second line of "block" function is performed by seals in the valve block 610 that controls the flow of backflushing fluids, air, water and teat dip into the safety valve 60. Also, the valve block 110 includes a block-bleed-block feature, as described above as a redundant safety feature.

As seen in FIGS. 9B, 9D, and 9E, the safety valve 60 is in the backflushing position with the backflush piston 120 in its lowermost position with a lower surface of the backflush piston 120 engaging the u-shaped 98 portion of the seal insert 94. More specifically, the lower surface of the backflush piston 120 is in contact with the upstream flange 104 and the downstream flange 106 of the u-shaped 98 portion of the seal insert 94. This arrangement provides a double block between the safety valve 60, milk inlet 62, and milk outlet 64.

Between the upstream flange 104 and the downstream flange 106 is the web 108 of the seal insert 94. The web 108 is spaced apart from the lower surface of the backflush piston 120 to define part of a "bleed" path B3 (FIG. 9E) that by-passes the upper portion of the backflush valve 120 and the upper ring-shaped portion 96 of the seal insert 94 through the piston by-pass vents 134, and through the holes 92 in the lower housing 70. This block-bleed-block arrangement prevents backflushing fluid and teat dip from entering the milk supply because any seepage past either seal will drain through the gap 111, which is a bleed path. (FIG. 9E).

The teat dip block-bleed-block function is performed by the upstream dip valve pin 304 in connection with a dip opening 288 in the top plate 262, and the corresponding dip hole seal 324 of the top plate seal 264. A second block is formed by the downstream dip valve pin 305 in connection with a dip opening 288 in the top plate 262 and the corresponding dip hole seal 324 of the top plate seal 264.

In this arrangement, there are at least two bleed paths. Bleed path B5 in FIG. 9F is defined by a space between the dip valve piston 268 and the interior portion of the top plate 262 cylindrical cup portion 272. B5 is further defined by a space between the dip piston central connector post 302 and the central opening 290 of the top plate 262, the lower housing chamber 90, and the three openings 220, 222, and 224.

Another bleed path B6 (FIG. 9F) is defined by the space between the dip valve piston 268 and the interior portion of the top plate cylindrical cup portion 272, upward into the cap 76 and out of the cap vent hoods 338.

Yet another bleed path is formed in the valve block housing 613 by the spool 621, so that differential pressure cannot pass the valves and into any of the feed lines to the safety valve 120.

When it is desired to apply teat dip, the dip safety valve 260 is operated by compressed gas such as air or other suitable fluid, mechanical device or electrical device to move the dip valve piston 268 downward against the force of the dip valve return spring 326 so that the dip valve pins 304 and 305 no longer seal the dip valve holes 288, 289.

As seen in FIGS. 14A and 14E, teat dip is pushed through the dip inlet 188 in the upper housing 74. The dip flows under pressure through the dip inlet chamber 204, up through upstream dip hole 288, through the flow channel 238, through the downstream dip hole 289, through the dip outlet chamber 208, out through the dip outlet 190, through tube 345 joined to the dip outlet 190 with an elbow 580 and toward the dip manifold 170.

When backflushing fluid (such as wash chemicals, rinse chemicals, water, and/or air) are to be pumped from the safety valve 60 upstream into the milker unit 40, the following operation takes place. It should be understood that during a backflush operation, the milker unit 40 will not be upright as illustrated in most of the drawings. Instead, the milker unit 40 will be upside down or at some generally downward angle, and hanging from a detacher mechanism as in FIG. 4B. This position aids in draining backflush liquids from the milker unit 40 in addition to a final "air slug" that is pumped through the safety valve 60 and the milker unit 40.

Backflushing fluid enters the upper housing 74 backflush inlet 186, down through the central stem 168, down through the backflush piston 120, out of the holes 138 in the backflush piston 120 and "upstream" through the milk inlet 62 and into the milker unit 40. The safety valve components as described define a backflush fluid conduit extending through the safety valve 60 between the backflush fluid inlet 186 and the milk inlet 62.

When desired to clean and rinse the safety valve 60, there can be alternating pulses of air and water for any desired number of sequences after the backflushing piston 120 returns to the milking position. Preferably, there are more than one pulse of both air and water to provide agitation, and efficient and thorough cleaning. Water used in rinsing the safety valve 60 also lubricates the seals for less friction and resistance in moving the various pistons and valves. For this reason, it is also desirable to wash or rinse the safety valve 60 prior to start-up.

Also, it is preferred to clean the safety valve 60 with the backflush piston 120 in its milking position because some milk may enter the bleed area next to the backflush piston 120 when the backflush piston 120 is in the upper position.

This will clean backflush chemicals, teat dips, and residual milk from the safety valve 60.

This process is done automatically by blowing water and air through the safety valve 60 before attaching the milker unit 40 to another animal.

FIGS. 22 through 25 are Control Operation charts that illustrate a sequence of all the various elements that take place in a typical single cycle of the safety valve 60. FIGS. 22, 23, and 24 are each a portion of a complete backflush and dip application cycle. FIG. 22 is a dipping and backflushing portion of the cycle, FIG. 23 identifies additional steps in the backflush operation, and FIG. 24 shows the steps of a dosing valve recharged in preparation for the next dipping procedure. (The abbreviation "BF" in the charts refers to backflush.) From the end of milking, closing off the milk line, dipping a cow, backflushing the milker unit, and self-cleaning of the safety valve, to being ready for a next milking operation is about forty-five seconds, in the preferred embodiment. FIG. 25 illustrates steps in the system 20 operation and the function the each step serves.

Dip Manifold

A teat dip manifold 170 is preferably included to separate the dip dose into four substantially equal quantities. The dip manifold 170 also isolates vacuum in each liner head 172 from vacuum in other liner heads 172 (See FIGS. 19A-E). Preferably, a four quarter milker unit system includes a backflushing safety valve 60 pre-assembled to the milker unit 40. When adding the dipping function to an existing system, the dip manifold 170 can be secured to a four quarter milker unit 40 with an air divider 174, which is part of a liner securing device or it can be loosely attached in any convenient location. In the embodiment of FIG. 1A, the manifold 834 is mounted on the milker unit collection bowl 844.

Two manifold designs are shown in FIGS. 19A-E and 19F-H respectively The primary functions in both embodiments are to prevent air flow from one teat cup 48 to the other during milking, and provide even distribution of dip to all teats, and to distribute substantially even volumes of dip to each teat.

The manifold 540 depicted in FIGS. 19A-E includes a base 542, a cover 544, alignment pins 546 in the base 542, four outlets 550, one inlet 552, a bladder seal 554, and outlet guards 556.

The base 542 and cover 544 are preferably molded from plastic, but could be any suitable material. They are assembled by aligning the alignment pins 546 of the base 542 with recesses in the cover 544. The base 542 and the cover 544 are joined by welding, adhesive, or mechanical fastener.

Figure 19A:
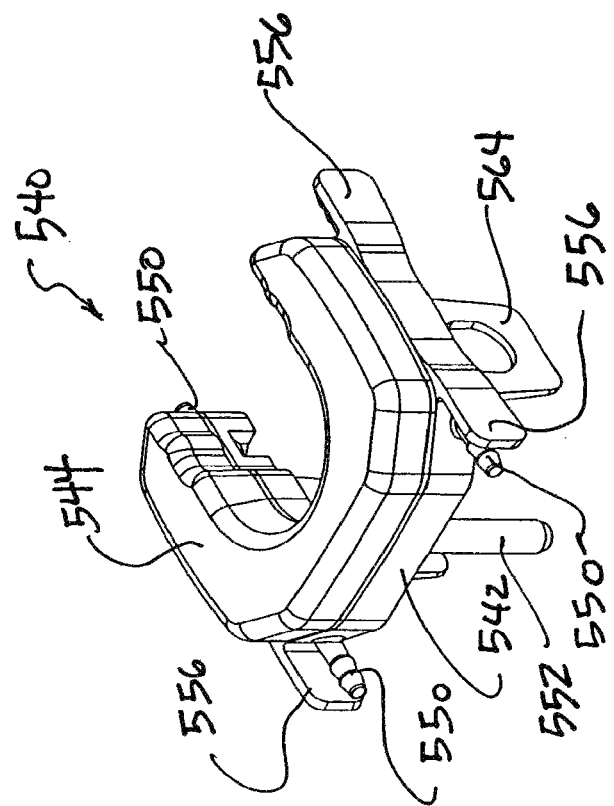
FIG. 19A is a perspective view of a dip manifold in accordance with the present invention.
Figure 19B:
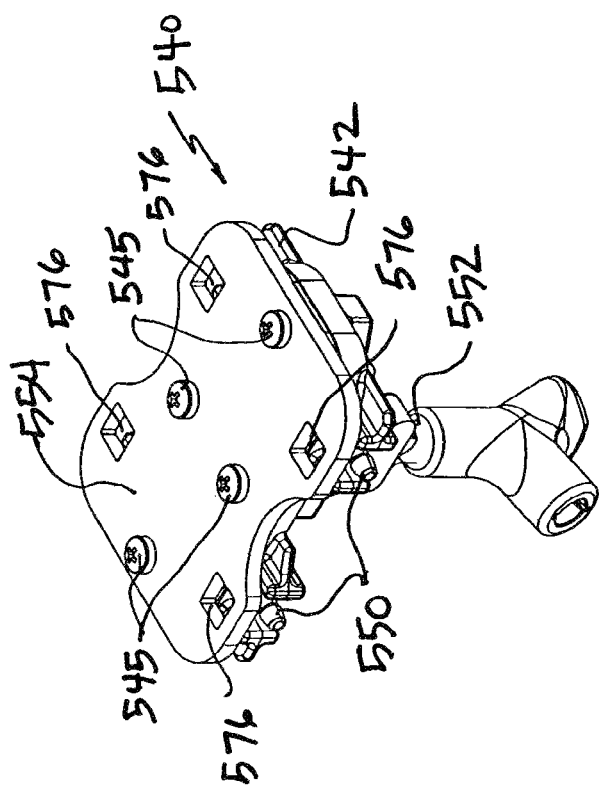
FIG. 19B is the dip manifold of FIG. 19A with the cover removed to show a diaphragm valve in accordance with the present invention.
Figures 19C, 19D:
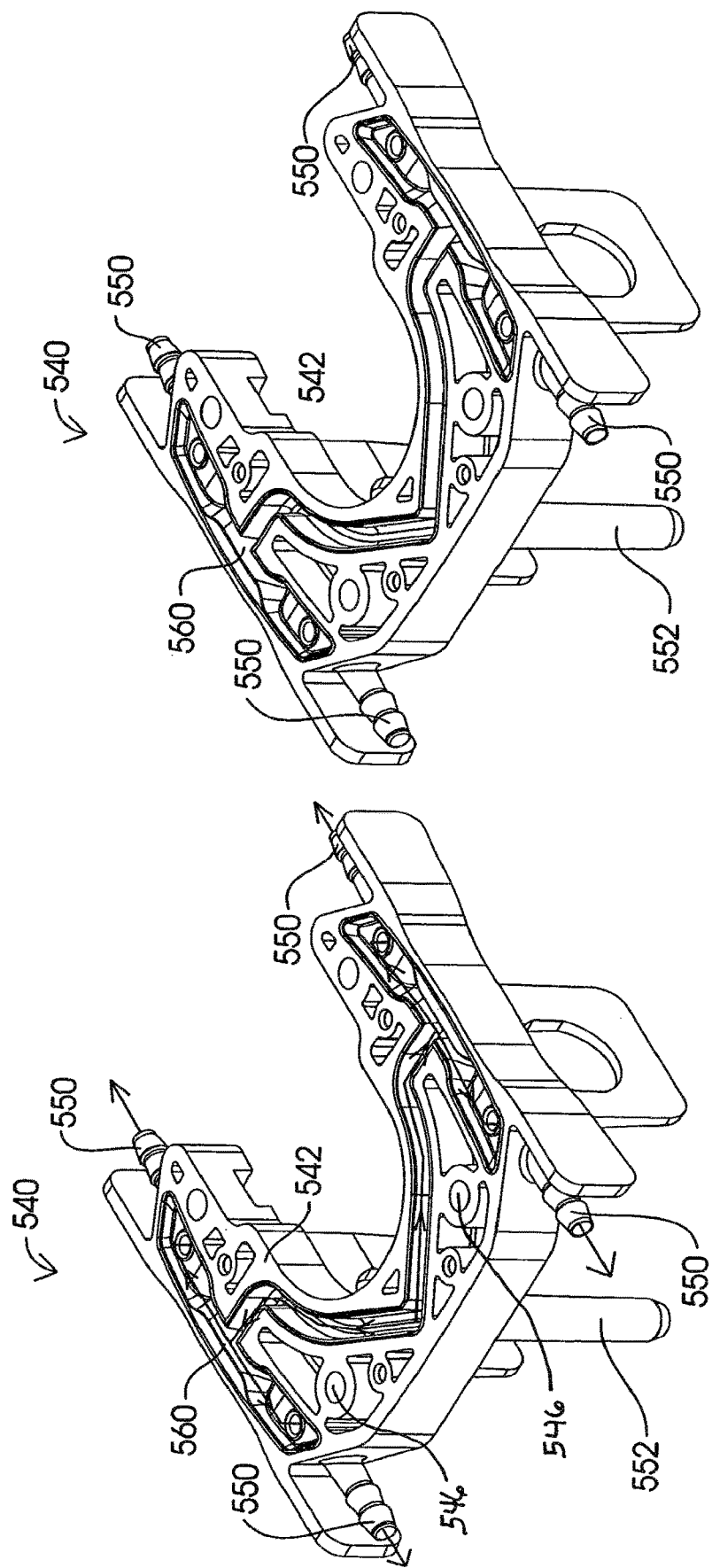
FIG. 19C is the dip manifold of FIG. 19B with the diaphragm valve removed to show dip flow paths through the dip manifold.
FIG. 19D is the drawing of FIG. 19C with the flow paths removed.
Figure 19E:
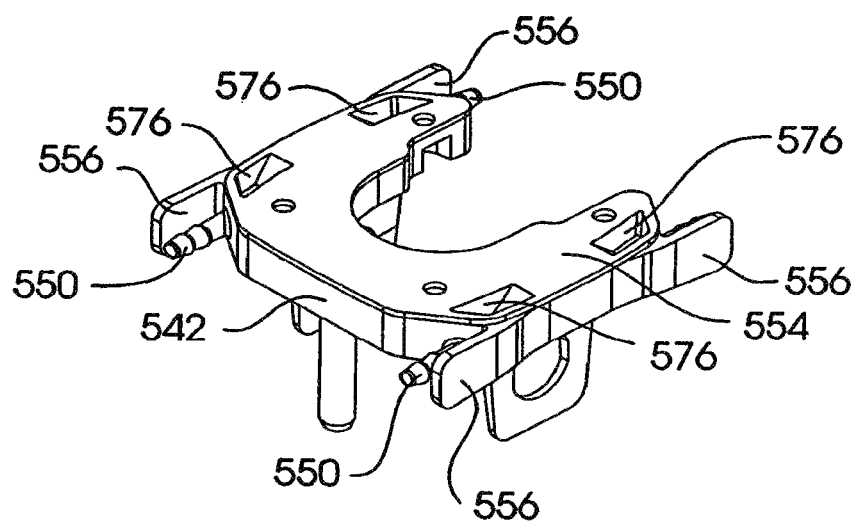
FIG. 19E is a perspective view of an alternate embodiment of a dip manifold in accordance with the present invention with a cover removed to illustrate a diaphragm valve.

As seen in FIGS. 19A through 19E, the base 542 includes a manifold channel 560 in fluid communication between the inlet 552 and the four outlets 550. The manifold channel 560 in FIGS. 19C and 19D is preferably bifurcated adjacent to the inlet 552 to divert dip flow to each side of the manifold 540, and then bifurcated again at each side of the manifold 540 for a total of four substantially equal doses of dip to flow through corresponding outlets 550.

Figure 19G:
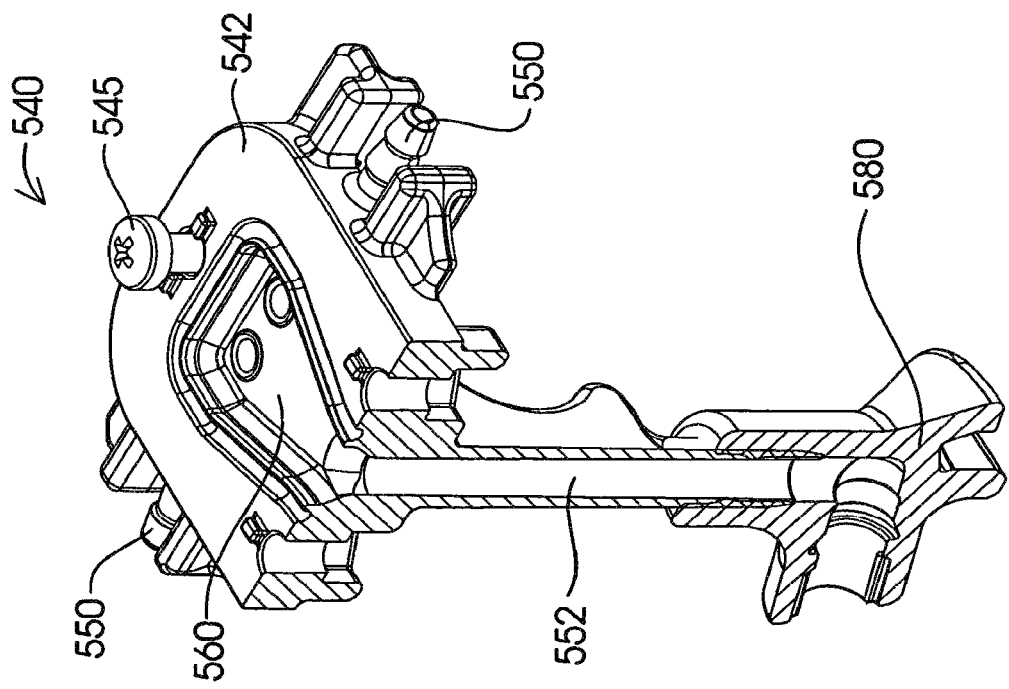
FIG. 19G is the dip manifold of FIG. 19F with the flow paths removed.
Figure 19F:
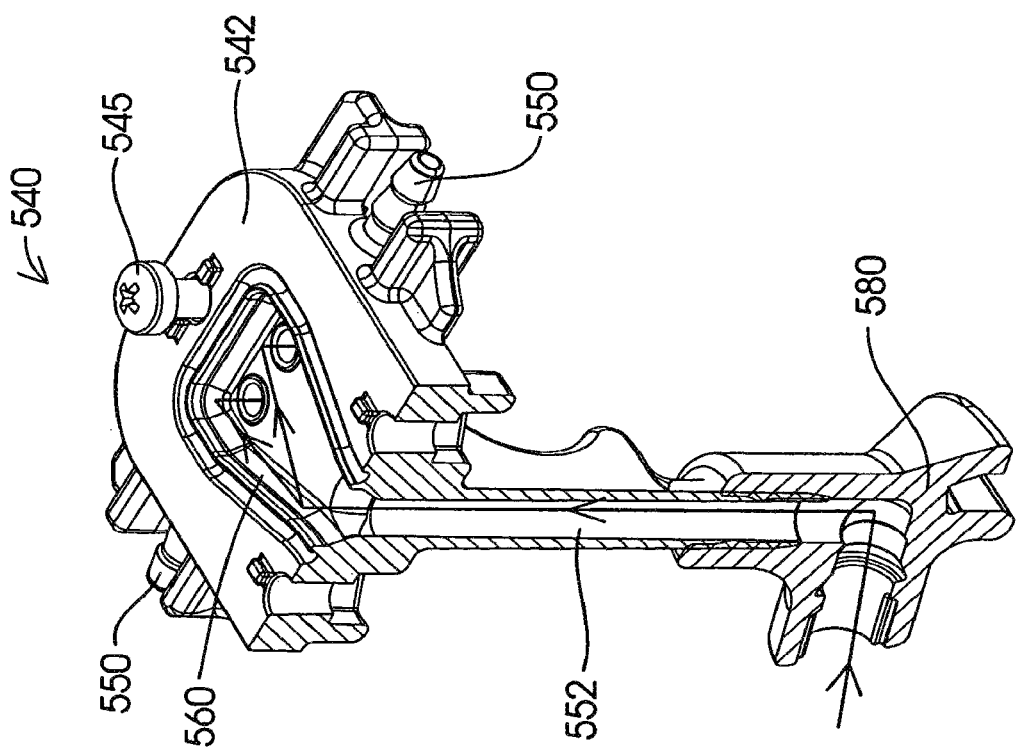
FIG. 19F is a cross section of the dip manifold with the diaphragm valve removed to illustrate dip flow paths.
Figure 19H:
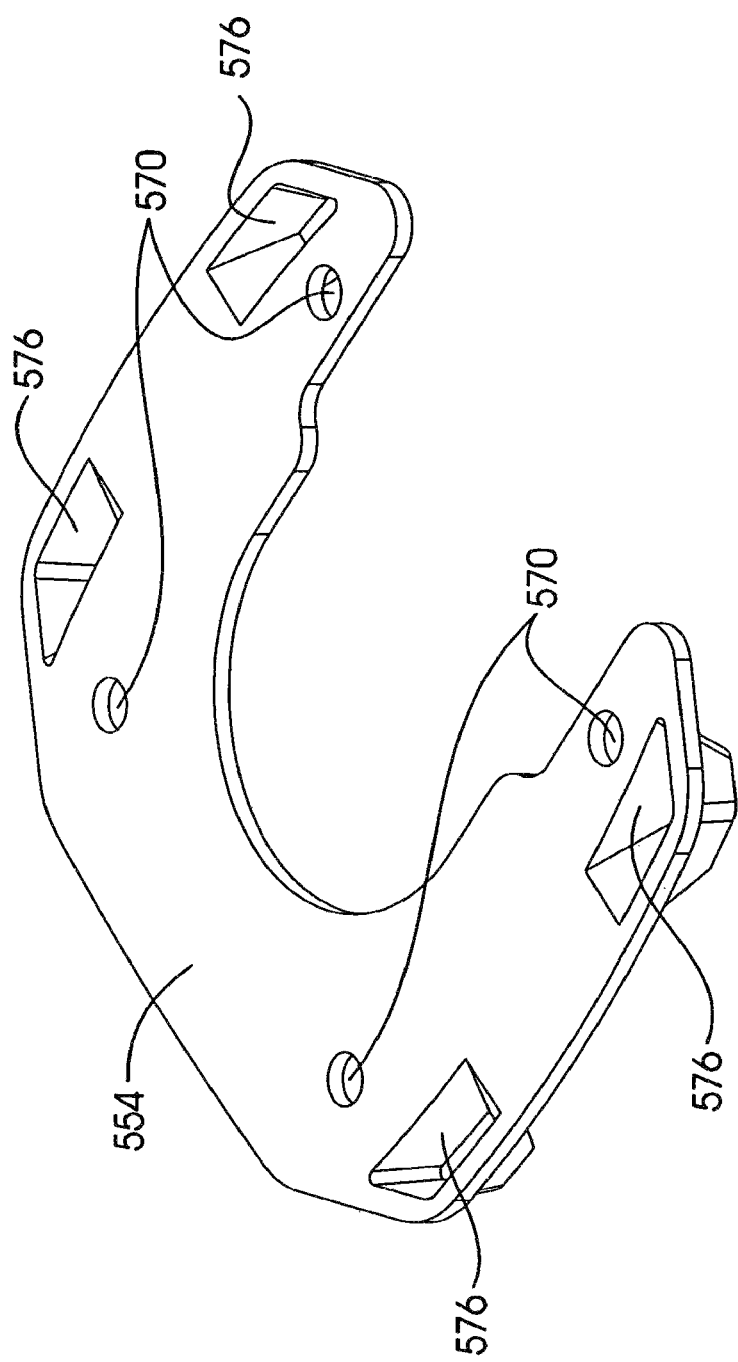
FIG. 19H is a diaphragm valve for use in the dip manifold.

The alternate manifold channel 560 illustrated in FIGS. 19F and 19G is also bifurcated adjacent to the inlet 552, but in this embodiment, there is no other bifurcation in the flow channel 560. Other flow channel designs are also possible.

The base 542 further includes mounting tabs 564 (FIG. 14) that are used to join the manifold 540 to any suitable location. Other mounting methods are also possible.

The manifold 540 also includes the flexible bladder 554 made of silicone or other elastomer, and disposed between the base 542 and the cover 544 to seal the interface between the two, but to also serve as a check valve for individual outlets 550. The bladder 554 includes alignment holes 570 to ensure proper alignment with the base 542 and cover 544 during assembly, and is joined to the base 542 with screws 545 or other suitable fasteners.

The bladder 554 includes flexible vacuum isolation diaphragm seals 576 each of which is disposed in the channel 550 adjacent to a corresponding outlet 550 so that flow through the outlet 550 is possible in only one direction. This arrangement of bladder vacuum isolation diaphragm seals 576 adjacent to the outlets 550 blocks pressure differentials in individual dip outlets 550 from adversely affecting dip flow through other dip channels 550.

The manifold 540 depicted in FIGS. 19A through 19E has four independent diaphragm seals 576 that each seal a separate outlet 550. The manifold 540 depicted in FIGS. 19F and 19G has two independently operating diaphragm seals 576 that each seal a pair of outlets 550. In both embodiments, the seal channel 560 is sized and shaped to receive a matching diaphragm seal 576, which are preferably formed as embossments on the bladder 554.

Each of the two vacuum isolation diaphragm seals 576 includes a pair of dip outlets to prevent pressure differentials between pairs of dip outlets 550 from affecting dip flow through neighboring pairs of dip outlets 550.

Dip flows into the manifold 540, through the inlet 552, the manifold channel 560, and urges the diaphragm seals 576 upward against their natural bias toward a closed position. Once the diaphragm seals 576 are open, dip flows out individual outlets 550.

The base dip inlet 552, preferably has joined to or molded integrally with it, a widened portion 580 to provide a gripping surface when attaching and detaching a hose, for example.

Shell for Internal Dip Channel

Figure 15:
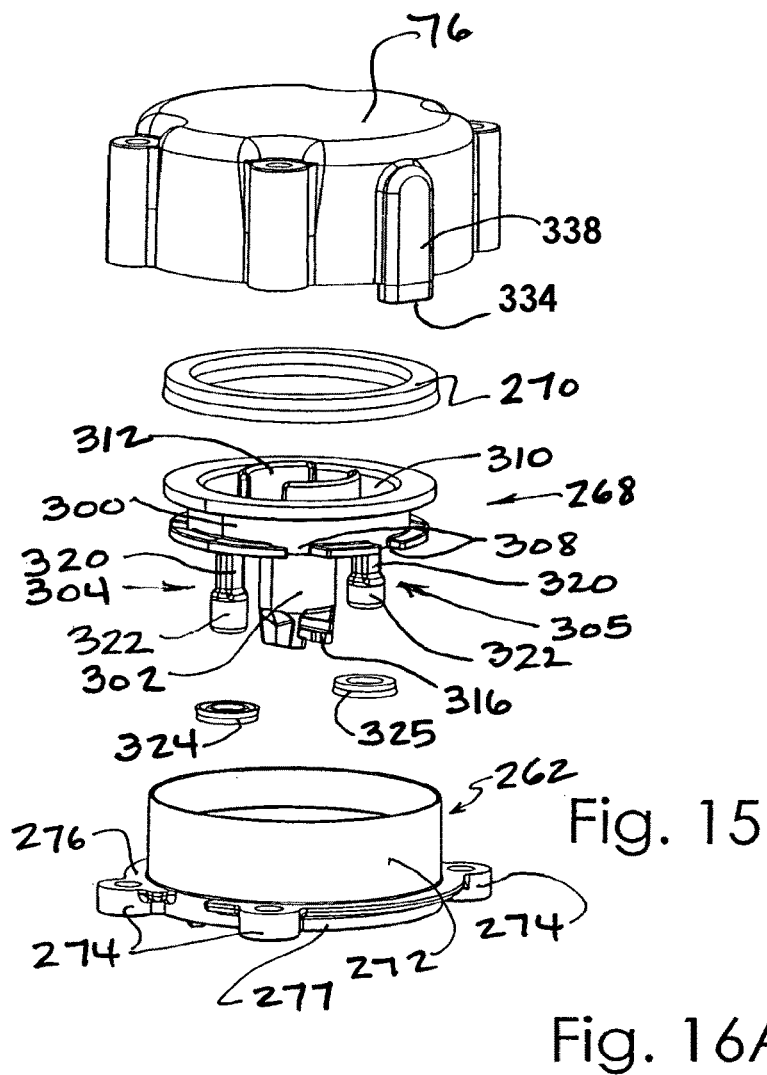
FIG. 15 is an exploded perspective view of a dip valve and top plate in accordance with the present invention.
Figure 16A:
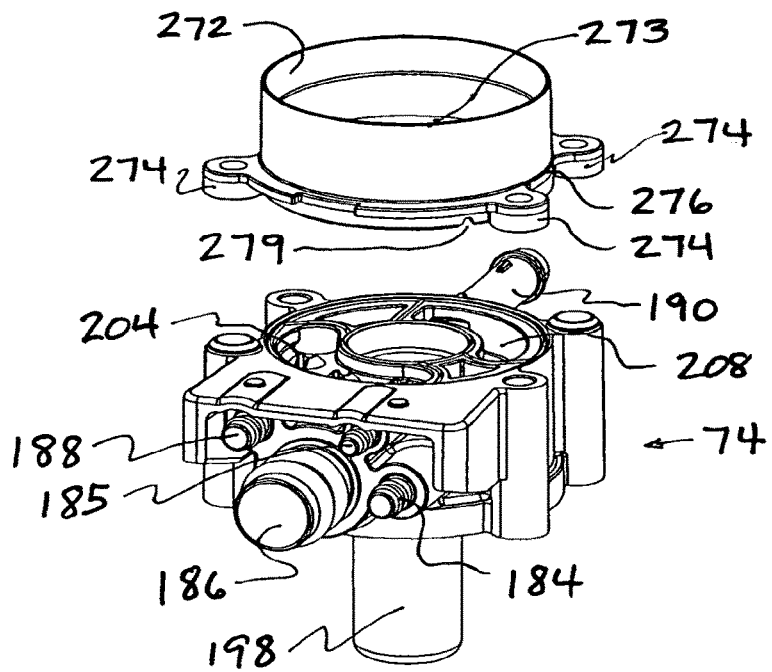
FIG. 16A is an exploded perspective view of a top plate, and dip inlet and outlet chambers in the upper housing, of the present invention.
Figure 16D:
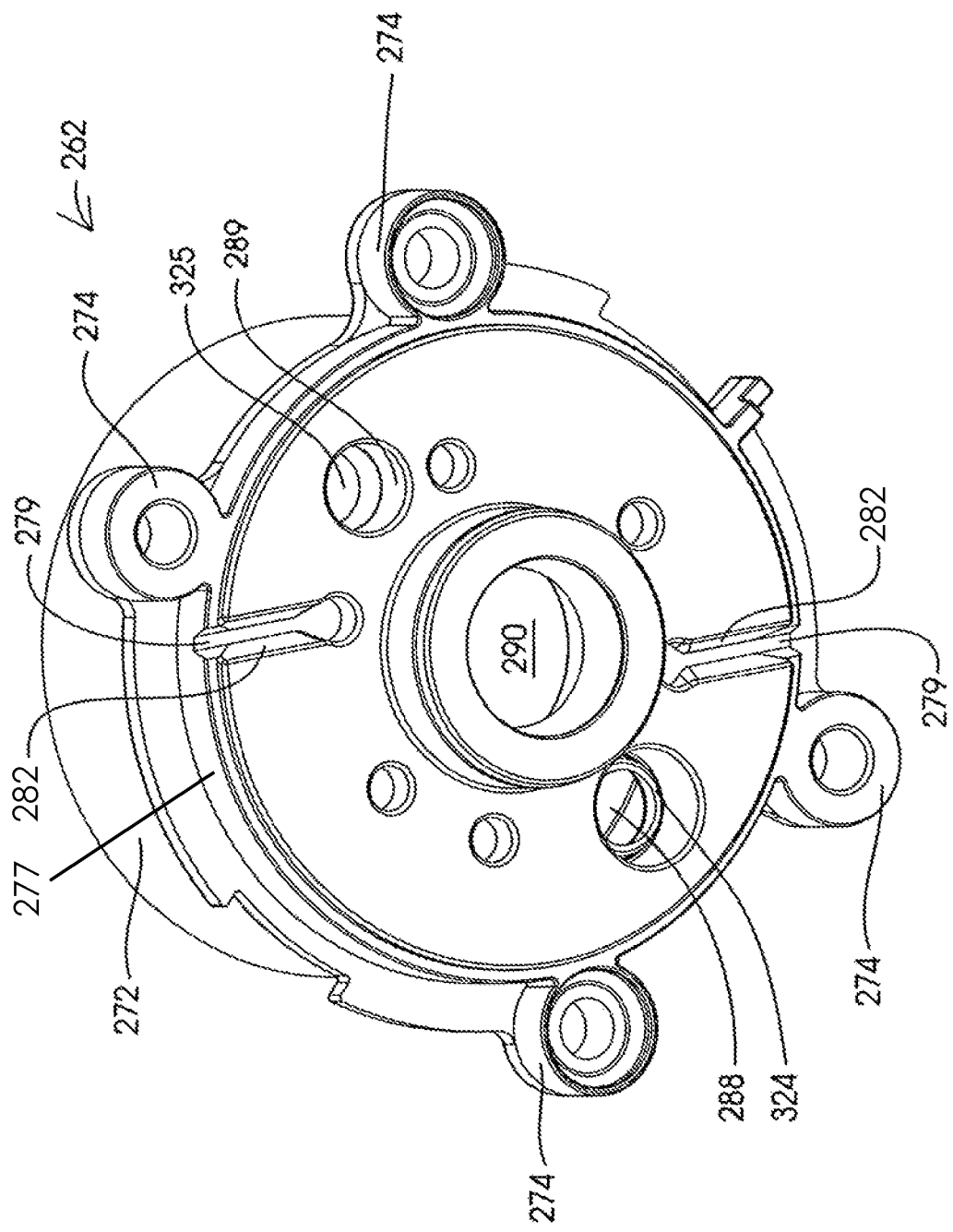
FIG. 16D is a perspective view of the underside of the top plate.

Illustrated in FIG. 15 is an external teat dip delivery tube for delivering dip to the liner is to pass the dip tube up along the inside of the teat cup 48.

Illustrated in FIGS. 16 to 19 is an internal teat dip delivery tube 190 that is disposed inside of a teat cup 48. The delivery tube 190 can be secured to the interior wall of the teat cup 48 or it may simply extend through the teat cup 48 with no connections.

Figure 20A:
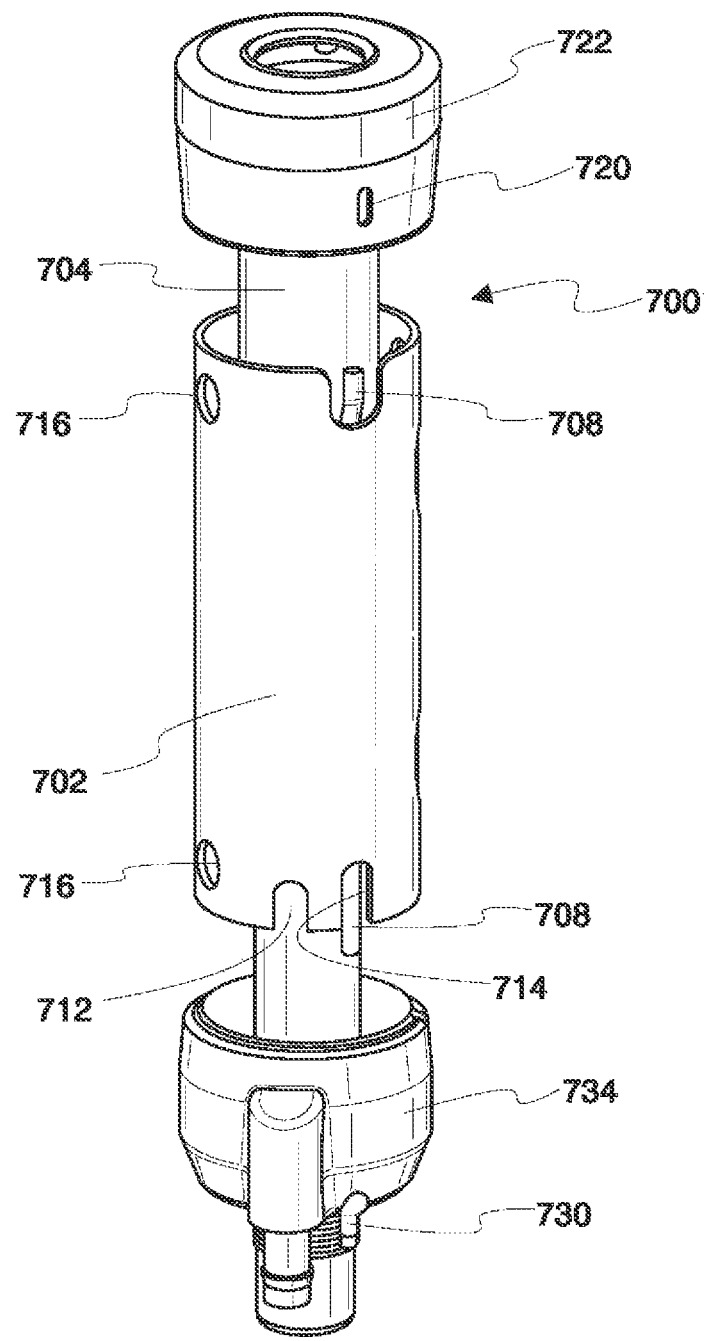
FIG. 20A is an exploded perspective view of a teat cup assembly with an internal dip channel for delivering dip, in accordance with the present invention.
Figure 20B:
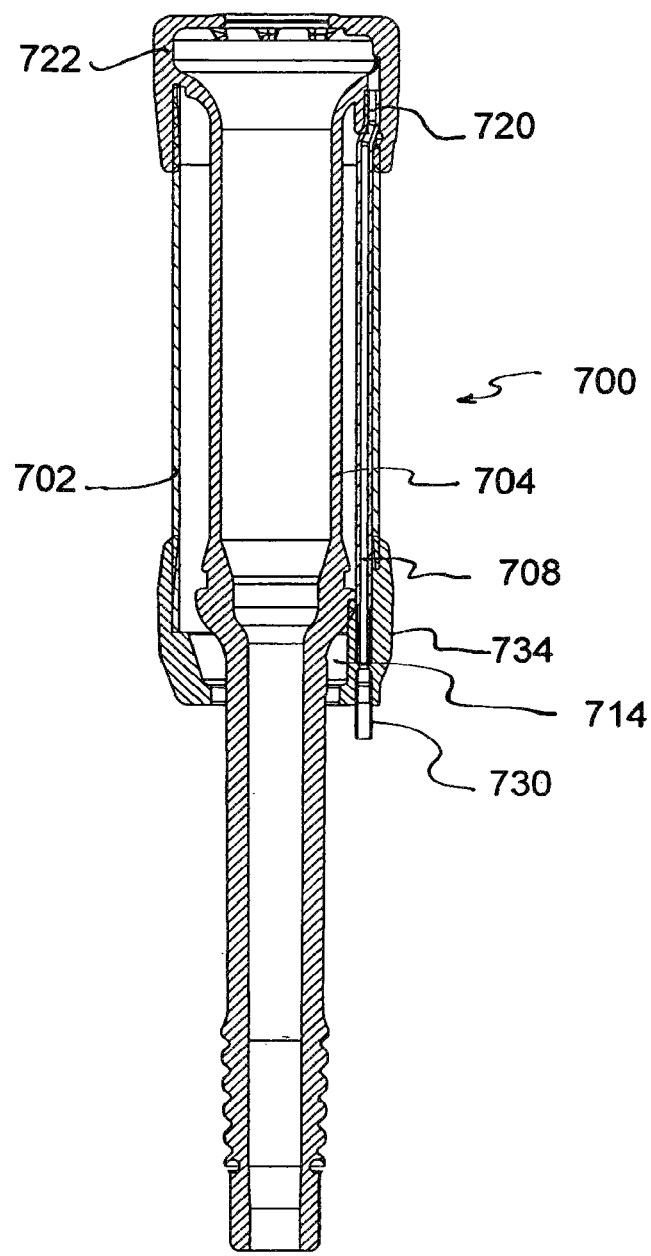
FIG. 20B is a cross sectional view of the teat cup assembly of FIG. 20A.

Depicted in FIGS. 20A and 20B, are teat cup assemblies 700 for use with the present invention or separately with other dip delivery systems. The teat cup assemblies generally include a shell 702 and liner 704. The liner 704 can be the type disclosed in application Ser. No. 12/157,924 which is incorporated herein by reference. The shell 702 is preferably a stainless sleeve with a TPR (thermal plastic rubber) bottom end or cap 734. Stainless is preferred for the shell 702, but molded (clear, translucent or opaque) plastic or other materials can be used, making it a very simple molded part that could include a dip channel 708 within the shell 702. This embodiment of the teat cup assembly is preferred because it is easier to manufacture, since the cap will be a simple injection molded piece with no welding required. Nonetheless, other teat cup assemblies can be used with the other components of the present invention.

The shell 702 is a simple tube. The only welding will be to tack weld the dip delivery channel 708 onto the inside, as illustrated or outside in an alternate embodiment described below. The dip delivery channel is well protected from top to bottom, making the teat cup assembly 700 very robust. The dip channel 708 connects a liner fitting 720 to transmit dip to an internal dome in the liner. In FIG. 20A, the liner fitting 720 extends outside of the liner head 722, and in FIG. 20B, the liner fitting 720 is inside the liner head 722. These two options provide different assembly methods and visibility while assembling the parts.

Positive keying of the liner 704 to the shell 702 is provided by two slots 712 and 714, one for the dip tube connection and one to force proper alignment, enabling the dip channel 708 connection. Additional holes 716 will be used as snaps to help hold the liner head 722 onto the shell 702 as cows may step on it.

A nipple 730 on the bottom of the shell 702 connects to a dip delivery tube or a connection using individual fittings pressed into bosses within the TPR can be used to provide flexibility from cow abuse with reduced breakage. The shell 702 is snapped into the cap 734 to provide a solid one-piece feel, making liner 704 change as easy as with a single piece shell 702.

With the dip channel 708 on the inside, a triangular, square or manipulated round liner is preferred, so the liner 704 will not collapse and contact the internal dip channel 708.

Shells for External Dip Channel

Figure 20D:
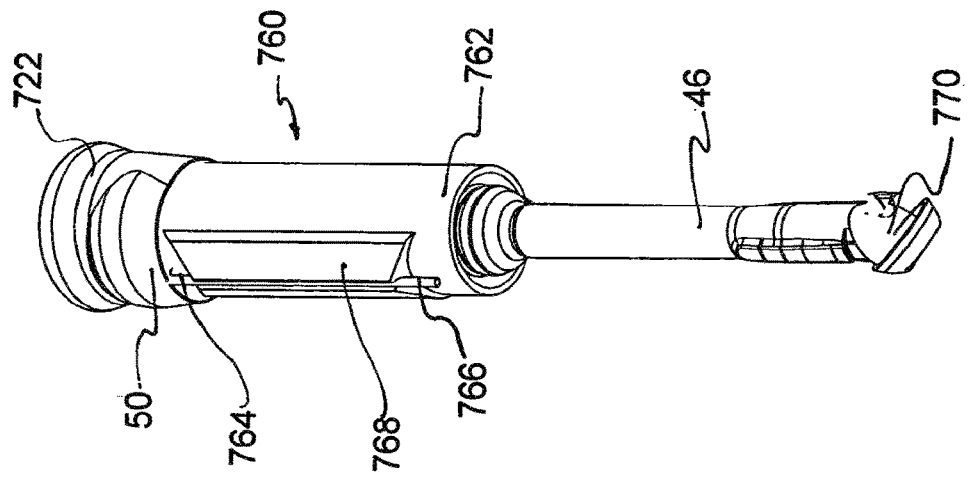
FIG. 20D is a perspective view of another alternate embodiment of a teat cup assembly and dip channel for delivering dip, in accordance with the present invention.
Figure 20C:
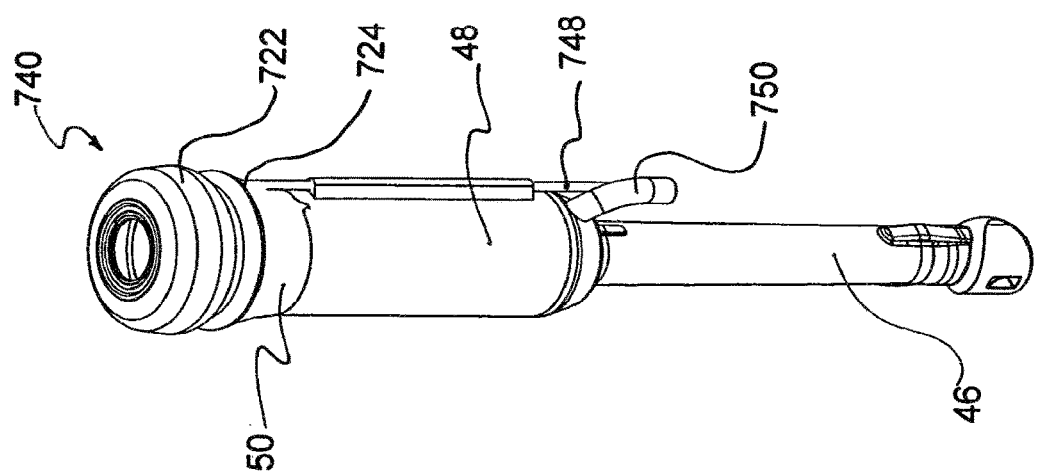
FIG. 20C is a side view of an alternate teat cup assembly with an external dip channel for delivering dip, in accordance with the present invention.

FIG. 20C illustrates one embodiment for a dip passage 748 on the outside of the shell 48. The dip passage 748 connects to the liner 704 when the liner 704 is assembled to the shell 48 in the proper orientation. The dip passage 748 connects to a liner fitting 724 in a manner similar to the embodiments of FIGS. 20A and 20B.

FIG. 20D illustrates another embodiment for a dip passage 766 on the outside of a shell 742. The dip passage 766 connects to the liner 704 when the liner 704 is assembled to the shell 48 in the proper orientation. The dip passage 766 connects to a liner fitting 764 in a manner similar to the embodiments of FIGS. 20A and 20B. The external dip passage 766 is protected by a rubber, silicone, or other material joined to the shell. The short milk tube 46 can be integral with the liner 704, and the short milk tube 46 preferably terminates at a knob 770 that connects to a milk collection bowl.

Shell Liners

Figure 21A:
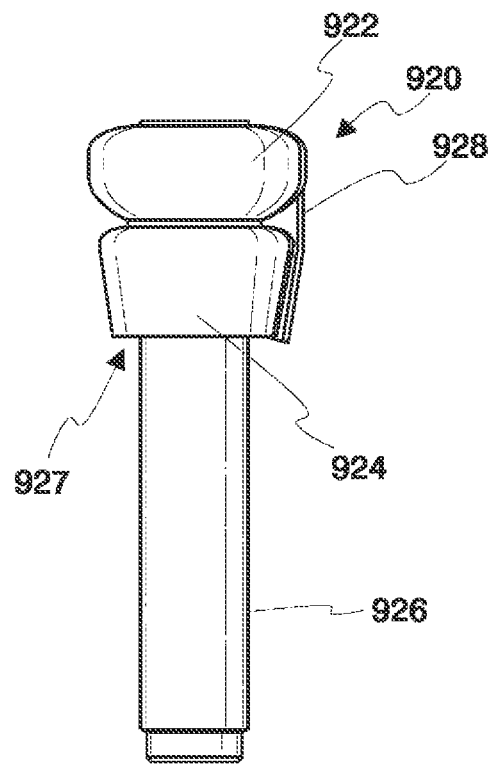
FIG. 21A is a side elevational view of a milker liner in accordance with the present invention.
Figure 21B:
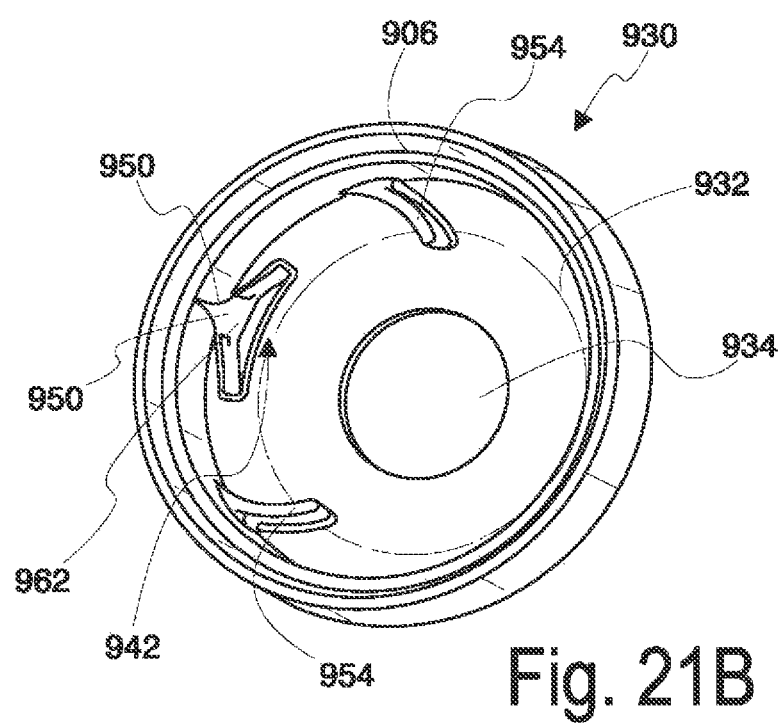
FIG. 21B is a perspective view of a milker liner dome chamber in accordance with the present invention.
Figure 21C:
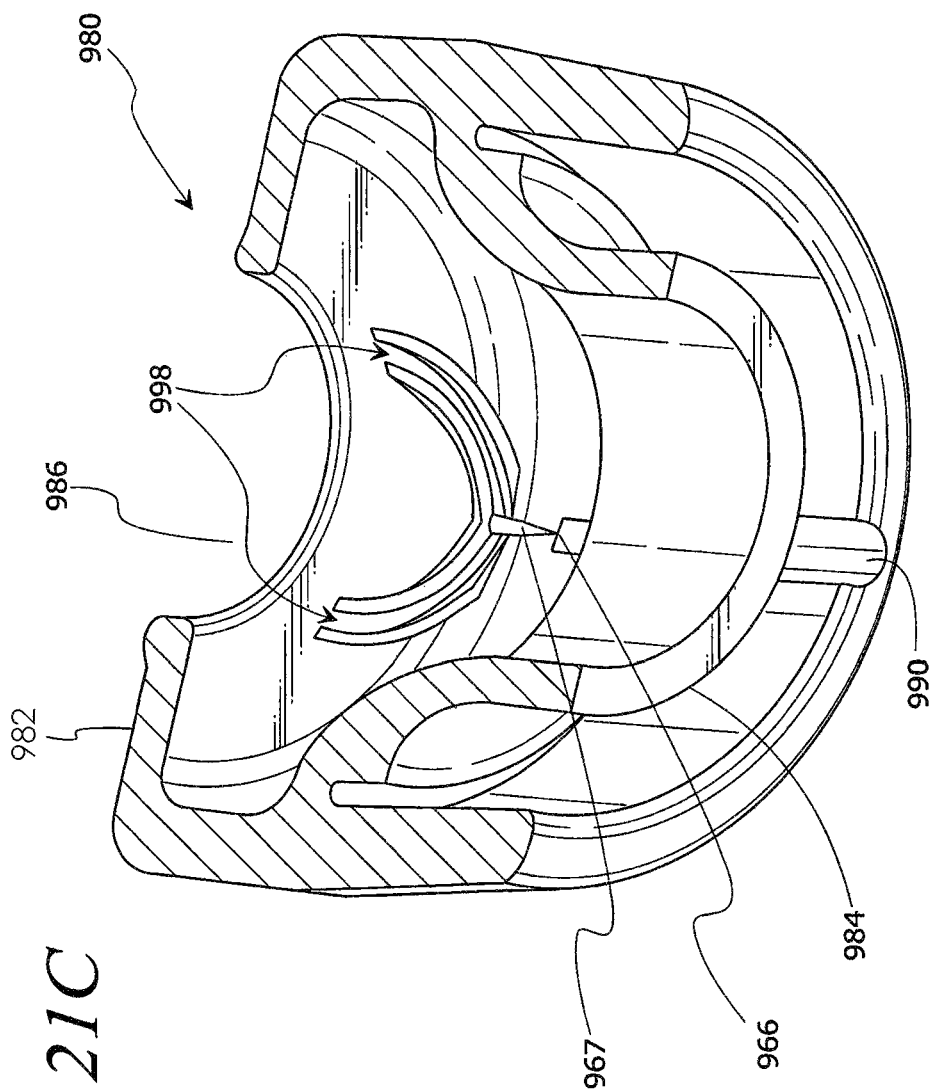
FIG. 21C is a partial perspective cross-sectional view of a milker unit liner in accordance with the present invention.

As stated earlier, preferred shell liners for use in the present invention are disclosed in U.S. application Ser. No. 12/215,706, which is incorporated herein by reference. FIGS. 21A, 21B, and 21C depict representative examples of a shell liner 920, from that application.

In FIG. 21A, there is depicted a milker unit liner 920 in accordance with the present invention. The liner 920 includes a dome 922, a skirt 924, a barrel 926, and a delivery channel 928. The skirt 924 extends downward from the dome 922 and is spaced away from the barrel 926 to define a recess 927.

The liner 920 is sized and shaped to fit into a conventional outer shell or "teat cup" (not illustrated) so that the top of the teat cup fits in the recess 927 between the skirt 924 and the barrel 926, but other shell types and alignment aids can be used. This relationship secures the liner 920 to the teat cup and forms a seal for the vacuum. The liner barrel 926 may have any cross-sectional shape including round, triangular, and square, or any other shape. Alternatively, a liner can comprise a separate dome and barrel that are connected to each other directly or indirectly using a teat cup or the other suitable device. The present invention is directed to a dome 922 having an inner surface to which flow diverters are joined regardless of the type, size, or shape of barrel. The liner 920 can be made of rubber, silicone, or other suitable materials.

The delivery channel 928 can be formed integrally with the other liner components or attached after the liner 920 is formed. The delivery channel 928 may be any of the design types described above, or it can be a separate component so long as it is attached to the liner 920 to act as a conduit for teat dip or cleaning fluids being introduced into the dome 930 from the safety valve 60.

FIG. 21B illustrates an embodiment of a liner dome 930 in accordance with the present invention, and that is removed from the other liner components and inverted to show an inner surface 932. This dome 930 includes a teat opening 934, and an annular recess 936 for mating with the top of a teat cup (not illustrated).

The liner dome 930 further includes a teat dip distribution structure having an inlet 966 (not depicted in FIG. 21B, but see FIG. 21C), a first flow diverter which is illustrated in this embodiment as a flow bifurcating vane 942, and a second flow diverter which is illustrated as a pair of ridges 944. The inlet 966 is preferably an opening that is the same diameter as the delivery channel 928, but it can be any size or shape to obtain satisfactory flow characteristics or simply provide ease of manufacturing. The inlet 966 could also include a nozzle in the form of a slit, for example, that is either molded into the dome 930 during manufacture or cut into the dome 930 after molding. A slit shape acts as a one-way valve to inhibit the flow of milk, teat dip 967 (FIG. 21C), cleaning fluid, and debris from flowing in the wrong direction through the inlet 966.

The inlet 966 can also be a simple opening in the dome 930, and a delivery tube may be used in combination with the inlet 966 so that the delivery tube defines the flow characteristics or a valve and the inlet 966 simply provides an opening through which teat dip passes into the dome 930. Regardless of its shape or size, the inlet 966 is preferably joined to the dome 922 by being formed integrally in the liner dome 922, but the inlet 966 can be joined to the dome 922 in any other suitable manner.

The inlet 966 is connected via the delivery channel 928 to a teat dip source and/or a backflushing source (not illustrated). In this manner, teat dip 967 (FIG. 21C) is provided through the inlet 966 under pressure from a pump, air pressure or other suitable device.

If left to flow directly toward a teat, most of the dip would be applied to the side of the teat closest to the inlet 966, with some flow possibly reaching other sides of the teat if the dosage quantity is high enough. It is unlikely in practice that dip would reach all teat sides and even less likely that teat dip application would be uniform as preferred.

To redirect the inward and radial flow, the flow bifurcating vane 942 is disposed adjacent to the inlet 966 and in a flow path defined by the inlet 966. The flow bifurcating vane 942 is shaped to split and redirect the upward flow from the inlet 966 into a substantially annular flow path or pattern around the periphery of the dome inner surface 902. As depicted, the flow bifurcating vane 942 splits the flow substantially evenly in each direction to define a pair of flow paths, but if other inlets are used or other conditions warrant, the flow could be split in other proportions or simply redirected in a desired flow path.

The inlet 966 preferably defines two ramped and arcuate surfaces 920 on which the teat dip flows as it is being redirected. In this embodiment, a raised central portion 922 is used to confine the flow so that teat dip is not flowing directly toward the teat. In alternate embodiments, it is possible to permit some of the flow to be applied directly to the teat without being substantially redirected. In such embodiments, the central portion 922 may include openings, slots or ramps through or over which teat dip can flow. It is even permissible for some of the dip to flow over the bifurcating vane 912 and directly toward the teat. Further, the arcuate surfaces 950 can be shaped so that teat dip flow is not directed around the periphery, but instead through a flow pattern or radius that is smaller than the dome chamber's 902 periphery.

The flow ridges 954 preferably have arcuate shapes and contact surfaces that are joined to the inner surface 902 of the dome 930 and arranged in the flow path. The flow ridges 954 are shaped and sized to redirect the peripheral teat dip flow inward toward a cow's teat. In a preferred embodiment, the flow ridges 954 have a height dimension that redirects all the teat dip flowing from the flow bifurcating vane 942. In alternate embodiments, the height of the flow ridges 954 could be reduced to permit some of the flow to by-pass the flow ridges 954 and flow to the part of the inner surface 902 opposite the flow bifurcating vane 912 or to other flow diverters (as described below). Further, the flow ridges 914 are depicted as being symmetrical, but they could be different sizes, shapes, positions, or orientations to provide asymmetric flow, if desired.

Most types of teat dip that would be flowing through the dome 930 have an inherent surface tension that helps establish a desired flow characteristic by remaining adjacent to the dome 930 surface and to the cow's teat so that the dip will cover areas of the teat that are not in the direct flow path defined by the flow diverters.

The flow diverters of the present invention are joined to the inner surface of the dome by being molded integrally with the dome, or they may be joined to the inner surface of the dome with glue or any other suitable means.

FIG. 21C is an alternate embodiment of the present invention illustrating a cross-section of an upper portion of a liner 980 having a dome 982, a barrel 984, and a teat opening 986. A delivery channel 990 is formed integrally with the dome 992. A hose, pipe, or tube (not illustrated) can be joined to the delivery channel 990 as a conduit between a source of teat dip and the delivery tube 990, as described above. The delivery channel 990 has at its upper end an inlet 966 that may be the same diameter of the delivery channel 990 or in the form of a nozzle or slit that is either molded into the liner 980 or cut after the liner 980 is molded. Other types of dip applicators can be used in the invention, but a dome with flow diverters is preferred.

Figure 21D:
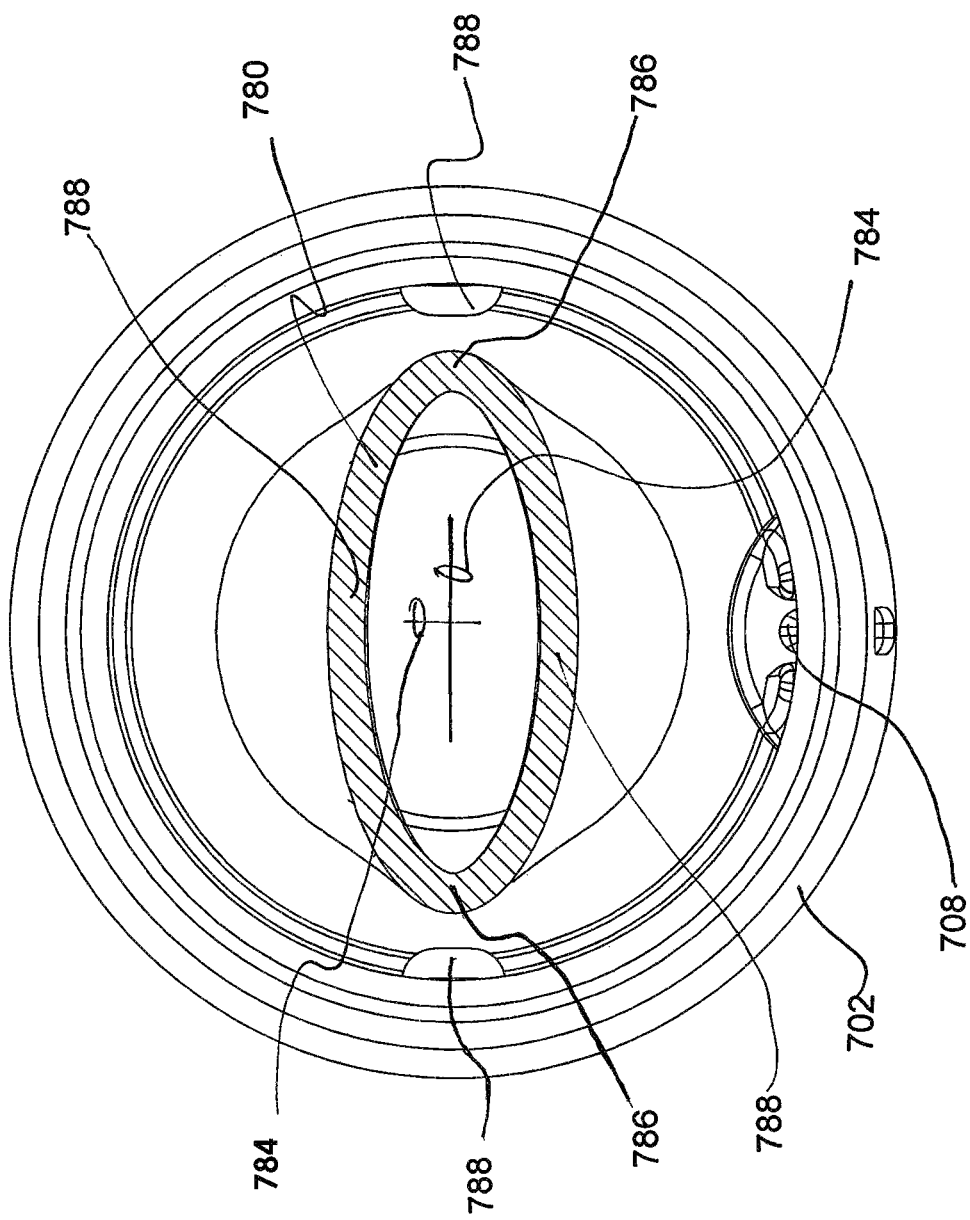
FIG. 21D is a cross section of a liner and a teat cup of the present invention.

Illustrated in FIG. 21D, is a cross section of a shell 702 with an internal dip delivery channel 708 and with the liner barrel 780 collapsed. Without special precautions, a liner barrel can collapse, make contact with the dip delivery channel 708, and cause premature wear and failure of the liner. With the dip channel 708 on the inside, a triangular, square or manipulated round liner is preferred to control the shape orientation of the collapsed barrel, so the liner 704 will not collapse and contact the internal dip channel 708.

The liner barrel 780 in FIG. 21D is formed, machined or molded with slight variations in wall thickness, such as a relatively thin wall at portions 786 and relatively thick at portions 788, to control collapse of the liner barrel 780 into an oval shape around a longitudinal axis 784 that is perpendicular to a transverse axis 786 on which the dip delivery channel 708 is disposed. This arrangement ensures that the liner barrel 780 does not contact the dip delivery channel 708. Attachment nubs 788 are shown in the head of the liner to secure it to the shell 702.

Preferably, the difference in wall thickness for the two portions 786, 788 is only from about 0.005 inches to about 0.010 inches, and is created by increasing thickness at portion 788. An elliptically machined mold can be used to create this difference.

The present invention can have many benefits, including but not limited to, one or more of the following: automate the dipping process to increase operator efficiency and reduce operator fatigue; provide safe, individual disinfection of the teats to reduce pathogenic organisms on the teat; prevent transfer of infection from animal to animal, and thus improvement of udder health of the entire herd; reduce or minimize chemical consumption (as opposed to spray or other automated dipping systems); improve uniformity of teat dip application; prevent chemical contamination of the milk and of the downstream milk system lines; reduce water consumption during backflushing of the milker unit; and be retrofitted to nearly any available milking unit.

The above detailed description is provided for understanding the embodiments described and, unless otherwise stated, is not intended to limit the following claims.

The invention claimed is:

1. A safety valve for a dairy system component, the safety valve comprising:
   a cup defining:
      a first valve seat,
      a second valve seat, and
      a third valve seat; and
   a valve piston slidably disposed at least partially in the cup to move the safety valve between: a closed position, in which the first valve seat and the second valve seat are closed, and the third valve seat is open to a vent; and an open position, in which the first valve seat and the second valve seat are open to a fluid flow channel between the first valve seat and the second valve seat, and the third valve seat is closed to the vent.

2. The safety valve of claim 1, wherein the first valve seat and the second valve seat are at least partially defined by openings in a closed end of the cup, and the third valve seat is at least partially defined by an open end portion of the cup.

3. The safety valve of claim 1, wherein:
   the valve piston includes a first valve head disposed to engage the first valve seat when the safety valve is in the closed position, a second valve head disposed to engage the second valve seat when the safety valve is in the closed position, and a third valve surface spaced apart from the third valve seat when the third valve seat is open to the vent.

4. The safety valve of claim 1, wherein:
   the third valve seat is at least partially defined by an interior surface of the cup.

5. The safety valve of claim 1, wherein:
   the cup includes a closed end defining the first valve seat and the second valve seat, and an open end portion defining at least a portion of the third valve seat; and
   the valve piston includes a first valve head disposed at least partially outside of the cup when the safety valve is in the open position, a second valve head disposed at least partially outside of the cup when the safety valve is in the open position, and an exterior surface that slidably engages the third valve seat when the safety valve is in the open position.

6. The safety valve of claim 1, wherein:
the cup includes a closed end defining the first valve seat and the second valve seat, and an open end portion at least partially defining the third valve seat; and
the valve piston includes a first valve element spaced apart from the first valve seat when the safety valve is in the open position, a second valve element spaced apart from the second valve seat when the safety valve is in the open position, and a third valve element disposed to engage the third valve seat and substantially close the cup open end portion when the safety valve is in the open position.

7. The safety valve of claim 1, wherein:
the cup includes a closed end defining the first valve seat and the second valve seat, and an open end portion of reduced wall thickness defining at least a portion of the third valve seat; and
the valve piston includes a first valve element disposed to engage the first valve seat when the safety valve is in the closed position, and a third valve element disposed to be spaced apart from the open end portion to open the third valve to the vent.

8. The safety valve of claim 1, and further comprising:
a housing defining an inlet chamber in fluid communication with the first valve seat, and an outlet chamber in fluid communication with the second valve seat when the safety valve is in the open position.

9. The safety valve of claim 1, and further comprising:
an actuator operatively engaged with the valve piston.

10. The safety valve of claim 1, wherein:
the cup includes a closed end defining the first valve seat, the second valve seat, and an actuator opening; and an open end portion defining at least a portion of the third valve seat; and
the safety valve further comprises:
a valve actuator extending through the actuator opening and operatively engaged with the valve piston.

11. The safety valve of claim 1, wherein the third valve seat is closed to the vent when the safety valve is between the closed position and the open position.

12. The safety valve of claim 1, wherein the valve piston includes a first valve element disposed to open and close the first valve seat, a second valve element disposed to open and close the second valve seat, and a third valve element disposed to open and close the third valve seat, and wherein the second valve element and the third valve element are disposed so that the second valve seat and the third valve seat are open when the safety valve is between the closed position and the open position.

13. The safety valve of claim 1, wherein the cup defines at least a portion of a flow path between the first valve seat and the second valve seat when the safety valve is in the open position.

14. The safety valve of claim 1, wherein the cup includes a side wall that has an upper end portion of reduced wall thickness that at least partially defines the vent when the valve piston is in the closed position.

15. The safety valve of claim 1, wherein the cup includes a wall that has an upper end portion of reduced wall thickness, and the valve piston includes a sealing surface that is spaced apart from the upper end portion when the third valve seat is open to the vent, and the sealing surface is engaged with the third valve seat when the third valve seat is closed to the vent.

16. The safety valve of claim 1, wherein the cup further defines a fourth valve seat that is open to a second vent when the valve piston is in the closed position.

17. The safety valve of claim 1, further defines a fourth valve seat that is open to a second vent when the valve piston is in the closed position, wherein the valve piston includes an outer annular seal slidably engaged with the third valve seat when the third valve seat is closed to the vent, and spaced apart from the third valve seat when the third valve seat is open to the vent, and an inner annular seal slidably engaged with the fourth valve seat when the fourth valve seat is closed to the second vent and spaced apart from the fourth valve seat when the fourth valve seat is closed to the second vent.

18. The safety valve of claim 1, wherein the valve piston includes an annular seal slidably engaged with the third valve seat to close the third valve seat from the vent, and spaced apart from the third valve seat to open the third valve seat to the vent, and the cup and valve piston are proportioned so that the first valve seat and the third valve seat are closed when the safety valve is between the closed position and the open position.

19. The safety valve of claim 1, wherein the valve piston includes an annular surface, and the annular surface is slidably disposed in the cup to move between the safety valve closed position; and a third valve element is spaced apart from the third valve seat in an open position when the safety valve is in the closed position.

* * * * *